United States Patent
Phillips

[19]

[11] Patent Number: 6,152,254
[45] Date of Patent: Nov. 28, 2000

[54] FEEDBACK AND SERVO CONTROL FOR ELECTRIC POWER STEERING SYSTEM WITH HYDRAULIC TRANSMISSION

[75] Inventor: Edward H. Phillips, Troy, Mich.

[73] Assignee: Techco Corporation, Southfield, Mich.

[21] Appl. No.: 09/179,152

[22] Filed: Oct. 26, 1998

Related U.S. Application Data

[60] Provisional application No. 60/090,311, Jun. 23, 1998.

[51] Int. Cl.⁷ ........................................................ B62D 5/99
[52] U.S. Cl. .............................. 180/422; 180/421; 701/42
[58] Field of Search ................................... 180/421, 422, 180/423; 701/41, 42

[56] References Cited

U.S. PATENT DOCUMENTS

| | | | |
|---|---|---|---|
| 4,509,611 | 4/1985 | Kade et al. | 180/79.1 |
| 4,653,601 | 3/1987 | Nakamura et al. | 180/79.1 |
| 4,715,461 | 12/1987 | Shimizu | 180/79.1 |
| 4,724,810 | 2/1988 | Poirer et al. | 123/339 |
| 4,753,310 | 6/1988 | Hashimoto | 180/422 |
| 4,828,065 | 5/1989 | Ishihara et al. | 180/422 |
| 4,855,655 | 8/1989 | Shimizu | 388/820 |
| 4,926,956 | 5/1990 | Duffy | 180/422 |
| 4,946,001 | 8/1990 | Taniguchi et al. | 180/79.1 |
| 5,029,660 | 7/1991 | Raad et al. | 180/422 |
| 5,076,381 | 12/1991 | Daido et al. | 180/79.1 |
| 5,151,860 | 9/1992 | Taniguchi et al. | 364/424.05 |
| 5,198,981 | 3/1993 | Collier-Hallman et al. | 364/424.05 |
| 5,202,830 | 4/1993 | Tsurumiya et al. | 364/424.05 |
| 5,224,564 | 7/1993 | Duffy | 180/422 |
| 5,257,828 | 11/1993 | Miller et al. | 180/79.1 |
| 5,259,473 | 11/1993 | Nishimoto | 180/79.1 |
| 5,307,892 | 5/1994 | Phillips | 180/79.1 |

(List continued on next page.)

FOREIGN PATENT DOCUMENTS

| | | |
|---|---|---|
| 4-353189 | 12/1982 | Japan . |
| 5-279706 | 11/1993 | Japan . |
| 5-282782 | 11/1993 | Japan . |

*Primary Examiner*—J. J. Swann
*Assistant Examiner*—L. Lum
*Attorney, Agent, or Firm*—Gifford, Krass, Groh, Sprinkle, Anderson & Citowski, P.C.

[57] ABSTRACT

A vehicle power steering system 10 achieves a substantially linear control relationship between an applied steering torque input $T_s$ and a resulting steering force output, that is, a powered assist to vehicle steering. The system 10 includes a reversible fluid pump 24 driven by an electric motor 26. A pair of fluid lines 20 and 22 supply pressurized fluid from the pump 24 and to the left and right ports 56 and 58 of a power cylinder 18. A pair of pressure transducers 54 and 55 sense the fluid pressures $LP_p$ and $RP_p$ in the lines 20 and 22. The pressure transducers 54 and 55 are connected to an electronic control 32 which establishes an internal closed servo control loop 322 or 342 over the powered assist to vehicle steering provided by the power cylinder 18, for example, over actuation of the motor 26. The system 10 is preferably regenerative and includes a variety of safety features which prevent system runaway and allow unencumbered manual steering in case of failure of the system. The system 10 is also arranged for continuous rejuvenation of its hydraulic fluid, and the structure providing such rejuvenation can be employed in a wide variety of other systems. The electronic control 32 employs the measured fluid pressures $LP_p$ and $RP_p$ to counteract a hydromechanical resonance occurring predominantly between the moment of inertia of the motor 26 and a system spring rate consisting primarily of the vehicle steering load stiffness. The system 10 substantially eliminates stability problems in EPS systems, for example, a well-recognized low frequency stability control problem which has typically not been overcome in prior EPS systems. The system 10 provides full time independent verification of instant values of steering boost, substantially eliminating prior concerns relating to auto-steer. The system 10 also eliminates concerns in prior EPS systems such as mechanical over constraint, Coulomb friction, wear and backlash.

31 Claims, 13 Drawing Sheets

U.S. PATENT DOCUMENTS

| | | | |
|---|---|---|---|
| 5,473,231 | 12/1995 | McLaughlin et al. | 318/433 |
| 5,473,539 | 12/1995 | Shimizu et al. | 364/424.05 |
| 5,505,275 | 4/1996 | Phillips | 180/132 |
| 5,544,715 | 8/1996 | Phillips | 180/417 |
| 5,725,023 | 3/1998 | Padula | 137/596.17 |
| 5,732,373 | 3/1998 | Endo | 701/42 |
| 5,845,222 | 12/1998 | Yamamoto et al. | 701/41 |
| 5,931,256 | 8/1999 | Langkamp | 180/422 |
| 5,936,379 | 8/1999 | Matsuoka | 318/810 |
| 5,953,978 | 9/1999 | Bohner et al. | 91/363 A |

FEEDBACK AND SERVO CONTROL FOR ELECTRIC POWER STEERING SYSTEM WITH HYDRAULIC TRANSMISSION

CROSS-REFERENCE TO RELATED APPLICATIONS

This application claims priority from Provisional U.S. Patent Application Ser. No. 60/090,311, entitled "Feedback and Servo Control for Electric Power Steering system with Hydraulic Transmission", filed Jun. 23, 1998.

BACKGROUND OF THE INVENTION

I. Field of the Invention

The present invention relates generally to power steering systems for vehicles, and more particularly to electrically powered steering systems which include an electric drive motor for providing a powered assist to the steering gear of the host vehicle.

II. Description of the Prior Art

A variety of electrically powered steering systems (known commonly as electric power steering systems or "EPS systems") have been proposed for providing a powered assist to the steering of a motor vehicle. Conventional rack-and-pinion steering systems include a primary pinion/rack gear mesh interface for coupling the steering wheel of the vehicle to the steering system. EPS systems include an electric drive motor having a rotating element which is additionally mechanically or hydraulically coupled to the rack of the steering gear. EPS systems are said to provide fuel efficiency enhancement amounting to between about 2½ and 5 percent; this enhancement is usually on the lower end of this range for relatively larger vehicles. EPS systems are also said to incorporate software which is easily programmable to provide selected steering characteristics for any particular vehicular application. However, despite overall industry developmental commitments to date on the order of a billion dollars (U.S.), no EPS system is currently offered for sale in a mass produced automobile in the United States. There are a variety of reasons why EPS systems are not provided on automobiles in this country. One reason is that EPS systems are generally subject to an "auto-steer" problem, in which an unintended steering event is possible. Another reason is that EPS systems generally provide unsatisfactory tactile feedback (or "feel") during use; colloquially, EPS systems simply "feel funny" in operation. The art generally does not satisfactorily indicate the source or sources of these tactile feedback problems. Another drawback to the use of EPS systems is the difficulty (as yet unmet) of imposing speed reduction means between the motor and the steering linkage of the vehicle without also imposing either or both of mechanical over constraint and mechanical backlash between the motor and steering linkage.

It is believed herein that the auto-steer problem occurs because the drive motor of such systems is directly linked to the host vehicle's steering linkage and both the magnitude and the direction of steering boost are determined in an open-loop manner. Moreover, prior EPS systems appear to lack even minimal safety feedback information, such as full time independent verification that instant values of the actual assistive force have been properly generated. Errors in the proper generation of the assistive force are not sensed by the driver and remain uncorrected by the system. Other complaints about prior EPS systems include "motor cogging," lack of return ability and poor steering response to small input signals.

Several methods are known for coupling the drive motor of an EPS system to the steering linkage of the host vehicle. One method entails the use of a drive motor having a hollow rotor in which the rack shaft of a rack-and-pinion steering gear is concentrically disposed. The drive motor and rack shaft are connected by a ball screw and ball nut assembly, the ball screw being positioned on the rack in place of the conventional power cylinder, and the ball nut being engaged with the ball screw and supporting one end of the rotor. The other end of the rotor is supported by a thrust bearing. Other methods for coupling the drive motor to the steering linkage include coupling the drive motor to a second gear rack, via a gear train and a second pinion/rack gear mesh interface generally similar to the primary pinion/rack gear mesh interface utilized for coupling the steering wheel to the steering system, or coupling the drive motor directly to the steering shaft via a gear train. The ball screw/ball nut configuration is problematic because it couples the motor torque into the rack along with the desired axial thrust. This torque is quite sufficient to overcome the preload of the rack into the pinion so additional rotational constraint must be applied to the rack. This causes an over constraint in the gear mesh interface relationship between the pinion and the rack which results in stick-slip tactile characteristics felt at the steering wheel.

Similarly, adding a second pinion/rack gear mesh interface provides over constraint between either pinion/rack gear mesh with similar deleterious results. If the second pinion/rack gear mesh is loaded by a yoke mechanism there is additional Coulomb friction which effects return ability. Coupling the drive motor directly to the steering shaft via a gear train is limited to vehicles with very light steering loads because of wear limitations in the primary pinion/rack gear mesh. With either gear train, backlash becomes a tactile issue because it can be felt at the steering wheel. And if such a gear train were loaded sufficiently to eliminate the backlash, sufficient coulomb friction would be added as to eliminate any semblance of on-center feel.

It is obvious that all such electromechanical assemblies should comprise a clutch for decoupling the reflected inertia of the rotating elements of the electric drive motor from the steering system in the event of an otherwise orderly shutdown which would result from any system failure. Apparently however, most EPS systems under consideration today are being specified without a clutch for reasons of economy. This is unfortunate because the resulting increase in steering effort will certainly become a safety issue in the event of such system shutdowns.

Generally, other than in providing an obvious solution to the electric drive motor decoupling issue, such mechanical problems can be overcome in an EPS system by providing a fluid coupling between the electric drive motor and the rack of the steering gear in which the selective supply of pressurized fluid to the ports of a power cylinder is carried out by a reversibly driven fluid pump, rather than by a mechanical gear or leadscrew reduction means of the type described above. In this case, the ports of the fluid pump are connected to the ports of the power cylinder by first and second fluid lines. In such a system, bulk cavitation is precluded in either side of the power cylinder otherwise subject to an absolute pressure value below atmospheric pressure by replenishment fluid flowing through either of a pair of check valves disposed in a suction line connected to a reservoir and connected one each to the first and second fluid lines. Since systems configured in this manner advantageously eliminate the four-way control valves conventionally associated with EHPS systems, they should be considered to be true EPS systems.

In addition, many previously known power steering systems, including EPS systems, have significant tactile problems at very low frequencies, in particular, on the general order of 1 Hz. This includes system resonance which is apparently ignored within the art but can readily be recognized by a driver sensing an "over-center" type of instability wherein the driver must either anticipate lateral vehicle motion, or tightly grip the steering wheel in order to maintain precise control of vehicle tracking.

One attempt to address some of these problems is provided in U.S. Pat. No. 5,473,539 (Shimizu et al., Dec. 5, 1995). That patent discloses an electrically operated power steering apparatus in a motor vehicle having a steering system. The apparatus comprises a steering torque detector for detecting a manual steering torque applied to the steering system, an electric motor for generating an assistive torque to be transmitted as a steering assistive force to the steering system, and an actual assistive torque detector which detects an actual assistive steering torque which is actually transmitted from the electric motor to the steering system. The apparatus also comprises a controller which generates a target value for the assistive torque to be generated by the electric motor, and which generates a control signal based on the difference between the actual assistive steering torque detected by the actual assistive torque detector and the target value, the control signal then being used to energize the electric motor.

In a first embodiment, the patent discloses an actual assistive torque detector 22 coupling the nut 11a of a ball screw mechanism 11 to a rack shaft 7 of the steering system, the assistive torque of the electric motor 10 being applied to the rack shaft 7 through the ball screw mechanism 11. The patent indicates that the actual assistive torque detector 22 may be a pressure sensor comprising a resistance wire strain gage. In a second embodiment, the detector 22 is replaced with an actual assistive torque estimator which estimates an actual assistive torque from the voltage across the electric motor and the current through it. Because the detector 22 and the estimator provide quantitative information about the magnitude of the actual assistive torque, quantitative information which is necessary for the rest of the disclosed parts of the system to act in the manner described in the patent, the detector 22 and estimator do more than merely "detect" or respond to the presence or absence of an actual assistive torque; instead, they actually measure or estimate its value. A third embodiment in the patent attempts to give the driver of the vehicle a comfortable feel of steering action by providing a high- and/or a low pass filter in the actual assistive torque detector. The disclosed purpose of such filters is to reduce the purported noise from harmonics which are generated in the system upon differentiation for conversion from a rotational angular speed into a rotational angular acceleration, such that the estimator takes into account the inertial torque and the viscosity torque with respect to the motor torque within the system, based on the motor current and the rotational angular speed.

This patent appears to reflect a belief throughout the automotive industry that the issue of poor tactile feedback can and should be addressed by increasingly complicated software control schemes wherein the applied steering boost is made to model the input steering effort. Such efforts, however, have lead to enormous development expenditures without commensurate results; the art appears to provide no guidance as to actually solving the low frequency problems described above.

The related problem of steering shudder was addressed by the method and apparatus for enhancing stability in servo systems disclosed in U.S. Pat. No. 5,544,715 (E. H. Phillips, Aug. 13, 1996). The whole of that patent is expressly incorporated by reference herein. The patent discloses the use of series damping devices to form compliant couplings having series damping characteristics, used either for mounting hydro-mechanically driven actuators, or for coupling them to load elements which they position. The series damping absorbed sufficient energy to provide adequate gain and phase margins for the feedback characteristics of systems utilizing such actuators, so as to substantially prevent the occurrence of high frequency shudder. Of particular interest are the general steering system characteristics described in the specification of the '715 patent and depicted in the block diagram shown in FIG. 3 of that patent. The '715 patent discloses mechanical devices and methods for achieving servo control of the open-loop feedback characteristics present in general steering systems.

Many prior EPS systems appear to experience only marginally stable control and suffer a resultant amplification of external disturbances to them. While general techniques for achieving servo control in other systems are discussed in a variety of textbooks, the application of such techniques to EPS systems would require a knowledge (presently unpossessed in the art) of precisely where undesired resonances arise in EPS systems. More particularly, an introduction to servo control which can easily be understood by a novice in this field can be found in a "crib" text book by DiStefano, Stubberud, and Williams entitled *Schaum's Outline of Theory and Problems of Feedback and Control Systems* and published by the McGraw-Hill Book Company. As pointed out in that book, any servo system having a closed feedback loop can oscillate via self excitation at any frequency whereat unity gain in an opened feedback loop coincides with an odd multiple of 180∞ phase shift of that opened feedback loop's phase angle. The prior EPS systems mentioned above appear to be characterized by the near confluence of these conditions, with the resulting marginally stable control and amplification of external disturbances mentioned above.

The block diagram shown in FIG. 3 of the '715 patent is both complex and complicated, and discloses several feedback paths inherent in a variety of steering systems. However, block diagrams like that shown in FIG. 3 of the '715 patent can be reduced via appropriate algebraic manipulation to substantially simpler diagrams like that shown in FIG. 4 of the '715 patent. By such algebraic manipulation, all of the forward gain factors can be considered as being comprised within a single forward gain block "G", while all of the feedback gain factors can be considered as being comprised within a single feedback gain block "H".

The closed loop gain ratio O/I of a system whose analysis is reduced in this manner can be determined by the formula:

$$O/I = G/(1+GH)$$

wherein O is a particular output value of the system, I is a particular input value for the system, G is the forward gain value and H is the feedback gain value. It should be readily apparent that the closed loop gain ratio O/I becomes unstable at any frequency or frequencies where the open loop gain GH attains a value of minus 1, that is, where the absolute value of GH has a value of 1 and its phase angle is equal to an odd multiple of 180 degrees; the denominator of the ratio rapidly approaches zero, so that the gain rapidly approaches infinity. Similarly, the closed loop gain ratio O/I is at best only marginally stable at any frequency or frequencies where the open loop gain GH attains a value which is close to (but not equal to) minus 1. Failure to counteract or otherwise address any particular resonance associated with an open loop gain GH value close to minus 1 would result in such a system having marginal stability. Unfortunately, one such shortcoming appears to be typical of prior EPS systems, since it appears that the art as a whole has failed to recognize or correctly analyze the source of the resonance which causes the low frequency stability control problems mentioned above.

It would be highly advantageous to provide methods and apparatus for substantially eliminating stability problems in EPS systems, and, in particular, for substantially eliminating the low frequency stability control problems mentioned above. It would also be highly advantageous to provide full time independent verification of instant values of steering boost in EPS systems in order to substantially eliminate concerns relating to auto-steer. It would be particularly advantageous for such a system to achieve a substantially linear control relationship between an applied steering torque input and a resulting steering force output, and thereby achieve an optimum tactile relationship between a vehicle, the vehicle driver and the steering system of the vehicle. It would be further advantageous for such a system to operate in a regenerative manner and enjoy all of the benefits of a regenerative system. And, it would be still further advantageous to provide means for decoupling the reflected inertia of the electric drive motor in the event of any system failure.

SUMMARY OF THE INVENTION

These and other objects are achieved in an EPS system having fluid coupling means between the drive motor and steering gear according to the present invention, in which the selective supply of pressurized fluid to the ports of a power cylinder is carried out by a reversibly driven fluid pump. As mentioned above, such an arrangement eliminates symptoms of objectionable mechanical over constraints, Coulomb friction, wear and backlash. In particular, the EPS system of the present invention derives a feedback signal from a generated pressure signal, a pressure signal which represents the fluid pressure delivered to either port of the power cylinder, and uses the derived feedback signal in a feedback manner so as to provide servo control over the steering force output of the system, that is, over the powered assist to vehicle steering supplied by the power cylinder. Such control is implemented, for example, over the electric motor which drives the fluid pump.

The present invention resides, in part, in the recognition that the various problems mentioned above with regard to EPS systems are feedback control issues which are better addressed via appropriate hardware and servo control, rather than by more complex software control as has been done in prior EPS systems. The present invention also resides, in part, in the recognition that the reflected moment of inertia of the drive motor of such systems is in resonance with the series combination of various spring-like elements included in the steering load path. More particularly, it is believed herein that a primary reason for such tactile feedback problems is a low frequency resonance between the reflected moment of inertia of such a system's drive motor and the spring-like steering load itself. As may be more clearly understood with reference to the block diagram shown in FIG. 3 of the '715 patent and the associated discussion in the specification of that patent, the most compliant one of these spring-like elements (and therefore the dominant one of them) is generally formed by system compliance beyond the dirigible wheels. Depending upon vehicle speed, this compliance is formed by a parallel relationship between tire sidewall stiffness and tire patch loading characteristics. For most non-zero vehicle speeds, the dominant system compliance (movement) is related to the product of centrifugal force and caster offset. The EPS system of the present invention simply treats whichever combination yields such compliance as a spring, and generates a servo-controlled hydraulic pressure $P_p$ in a stable manner for providing a powered assist to steering the host vehicle.

The power steering system of the present invention includes a primary applied steering torque sensor that generates an applied steering torque signal $V_{TT}$ and supplies that signal to an electronic control means. The electronic control means processes that signal and utilizes it in an internal feedback loop comprising the electric motor and fluid pump for selectively generating the pressurized fluid. The electronic control means compensates the applied steering torque signal $V_{TT}$, obtains tachometer feedback information (in a manner described in more detail below) and subtracts such tachometer feedback information from the compensated torque signal, yielding an internal feedback loop input signal $V_i$. The electronic control means further obtains a pressure-dependent internal loop feedback signal $V_f$ (again, in a manner described in more detail below) and subtracts the internal loop feedback signal $V_f$ from the internal feedback loop input signal $V_i$, yielding an error signal $V_e$. The electronic control means then determines an internal control gain value ICG dependent upon the instant applied steering torque signal $V_{TT}$, the speed of the host vehicle and other desirable parameters, and multiplies the error signal $V_e$ by the internal control gain value ICG to yield an internal error signal $V_{es}$. The electronic control means amplifies the internal error signal $V_{es}$ to yield an internal drive signal $V_d$, which the electronic control means uses to operate an electric motor directly coupled to the fluid pump. The ports of the fluid pump are directly coupled to either port of the power cylinder. First and second pressure transducers generate pressure signals $LP_p$ and $RP_p$, corresponding to a vehicle left or right turn, respectively, which are indicative of the pressure value attained by the fluid pump. A higher valued one of the pressure signals $LP_p$ or $RP_p$ is multiplied by a feedback factor comprising the inverse of the internal control gain value ICG to form the internal, pressure-dependent loop feedback signal $V_f$ which is fed back for subtraction from $V_i$ to yield the error signal $V_e$.

The power steering system of the present invention thus yields an instantly controlled pressure $P_p$ (either $LP_p$ or $RP_p$) which is linearly related to the product of the instant applied steering torque signal $V_{TT}$ and the instant control gain value ICG. In this manner the power steering system of the present invention isolates the electric motor within its own internal feedback loop. The input to the internal loop is linearly related to the applied steering torque signal $V_{TT}$ generated by the applied steering torque sensor, and the output is the pressure $LP_p$ or $RP_p$ measured by one of the pressure transducers. The internal loop functions such that the moment of inertia of the rotor of the electric motor is effectively decoupled from the overall control loop. This generates an optimum tactile relationship between a vehicle, the vehicle's driver and the steering system of the vehicle.

It is highly preferred that the power steering system of the present invention include a redundant applied steering torque sensor. Such a redundant sensor prevents system runaway in case the primary applied steering torque sensor should fail in such a way as to give a fixed, non-zero value to the applied steering torque $T_s$. Since an indication of merely the magnitude of the applied steering torque might be adequate for this purpose, the redundant applied steering torque sensor could be the sensor disclosed in co-pending Provisional U.S. Patent Application Ser. No. 60/070,732 entitled "Adjustable, Preloaded Transducer, Especially in a Sensor for Measuring Applied Steering Torque" (E. H. Phillips, filed Jan. 7, 1998). The whole of that application is expressly incorporated by reference herein. Preferably, however, the redundant applied steering torque sensor is constructed in the same manner as, and operates on the same principle as, the primary applied steering torque sensor.

Also preferably, the electronic control means and electric motor in the system of the present invention are capable of handling regenerative electric power so as to enable the recovery of power returned to the system whenever the steering load actively centers the power cylinder. This requires the fluid pump to function as a fluid motor as well. The electric motor and the fluid pump are preferably combined into a single power pack. The system of the present invention also includes a conventional fluid reservoir, and it is preferred that each port of the power cylinder is protected from bulk cavitation by a check valve directly coupled to the fluid reservoir.

The first and second pressure transducers are conveniently coupled directly to the ports of the pump and provide left and right output pressure signals $LP_p$ and $RP_p$, respectively, from which a pressure-dependent feedback loop signal $V_f$ is derived. During normal operation, the lower pressure pump port is directly connected to the reservoir, while both pump ports are directly connected to respective ports of the power cylinder. If desired, a third pressure sensor can be coupled to the higher pressure port as a redundant output pressure check. Should the system fail or become inoperative, both ports of the fluid pump are coupled to the reservoir to ease manual steering of the vehicle. Other redundant measures of various system parameters can be provided to further enhance the safety of the system.

As described above, the electric motor drives the pump so as to provide pressure to either port of the power cylinder in a directionally servo controlled manner with reference to the tachometer feedback information and the pressure-dependent loop feedback signal $V_f$. One control problem arising from the use of conventional pressure transducers for this purpose is the need to calibrate them. Advantageously, the system of the present invention sets a signal representative of the pressure value measured by one of the pressure transducers to a zero value when a signal representative of the pressure value measured by the other of the pressure transducers achieves a value greater than a selected threshold value. Thus, each of the first and second pressure transducers, as well as the system, is adaptively calibrated with respect to zero steering assist as required for a straight steering mode of operation. This is fully accomplished after the vehicle has negotiated just a single left turn and a single right turn.

Preferably, the lines and fittings connecting the fluid pump, power cylinder, fluid reservoir and check valves are configured such that there is a fresh flow of reservoir fluid into the lower pressure side of the power cylinder whenever the steering load actively centers the power cylinder. This permits the system to be purged by elevating the dirigible wheels and mechanically pivoting them back and forth until only air- and foam-free fluid remains in the system.

In a first aspect, then, the present invention is directed to an improvement in a power steering system for a vehicle having dirigible wheels, a power cylinder having left and right ports and adapted to supply a powered assist to steering the dirigible wheels of the vehicle upon the supply of a pressurized fluid to one of the left and right ports, a reversible fluid pump having first and second ports, an electric motor operatively connected to and capable of reversibly driving the fluid pump, a first fluid line connecting the first port of the fluid pump to the left port of the power cylinder, a second fluid line connecting the second port of the fluid pump to the right port of the power cylinder, a pair of check valves disposed in a suction line connected to a reservoir and connected one each to the first and second fluid lines, and a primary applied steering torque sensor which generates a signal $V_{TT}$ in response to at least an applied steering torque $T_s$; the improvement wherein the power steering system further comprises a first pressure transducer sensing the fluid pressure $LP_p$ in the first fluid line; a second pressure transducer sensing the fluid pressure $RP_p$ in the second fluid line; and an electronic control means to which the first and second pressure transducers and the primary applied steering torque sensor are operatively connected, and which controls actuation of the electric motor; wherein the electronic control means establishes servo control over the powered assist to steering supplied by the power cylinder in dependence upon the fluid pressure $LP_p$ or $RP_p$ sensed by one of the first and second pressure transducers.

The electronic control means of the system establishes closed loop servo control over the electric motor in dependence upon the fluid pressure $LP_p$ or $RP_p$ sensed by the one of the first and second pressure transducers, in particular, in dependence upon the higher fluid pressure, and achieves a substantially linear relationship between the applied steering torque $T_s$ and the powered assist to steering supplied by the power cylinder. Preferably, the electronic control means generates an error signal $V_e$ in response to at least the generation of the signal $V_{TT}$ by the primary applied steering torque sensor, the error signal $V_e$ being dependent upon the fluid pressure $LP_p$ or $RP_p$ sensed by one of the first and second pressure transducers. The electronic control means determines an internal control loop gain value ICG as a function of at least vehicle speed, the internal control loop gain value ICG being further related to the signal $V_{TT}$ generated by the primary applied steering torque sensor, multiplies the error signal $V_e$ by the internal control loop gain value ICG to generate an internal error signal $V_{es}$ which is amplified to form an internal drive signal $V_d$ and causes the electric motor to drive the fluid pump in a manner which generates the fluid pressure $LP_p$ or $RP_p$ sensed by the one of the first and second pressure transducers in accordance with internal error signal $V_{es}$. More preferably, the electronic control means 32 generates the error signal $V_e$ by compensating the signal $V_{TT}$ generated by the primary applied steering torque sensor to yield a compensated steering torque signal $V_c$, subtracting from the compensated steering torque signal $V_c$ a tachometer feedback signal $V_t$, (representative of steering movement of the dirigible wheels) to yield an input signal $V_i$, obtaining a pressure-dependent loop feedback signal $V_f$ and subtracting the feedback signal $V_f$ from the input signal $V_i$ to yield the error signal $V_e$.

It should be clear that, in this aspect of the invention (as well as in the second, third and fifth aspects of the invention described below) no target value for any system parameter is ever established at all for control purposes. Even in the fourth aspect of the invention, no target value of motor torque is ever established. This is completely unlike the system disclosed in the Shimizu et al. '539 patent.

The power steering system of this aspect of the present invention preferably further comprises an actuation speed measuring means operatively connected to the electronic control means for providing the tachometer signal $V_t$ representative of steering movement of the dirigible wheels. The electronic control means subtracts the tachometer feedback signal $V_t$ so provided from the compensated steering torque signal $V_c$ during control of actuation of the electric motor. The actuation speed measuring means can conveniently comprise a tachometer for measuring the rotational speed of at least one of the vehicle steering wheel and the electric motor.

The power steering system of the present invention preferably comprises redundant measures for confirming proper operation of the system, its component elements and the electronic control means. For example, the system preferably comprises a redundant applied steering torque sensor which is connected to the electronic control means and which generates a redundant signal in response to the applied steering torque $T_s$. The electronic control means then terminates the powered assist provided by the system when the redundant signal from the redundant applied steering torque sensor fails to correlate with the signal $V_{TT}$ from the primary applied steering torque sensor.

Similarly, the power steering system of the present invention preferably further comprises a means for providing a redundant measure of the higher fluid pressure $LP_p$ or $RP_p$ in the first and second fluid lines. The electronic control means then terminates the powered assist provided by the system when the redundant measure of the higher fluid pressure fails to correlate with the fluid pressure $LP_p$ or $RP_p$ sensed by the higher one of the first and second pressure transducers. The means for providing a redundant measure of the fluid pressures $LP_p$ and $RP_p$ in the first and second fluid lines conveniently comprises a third pressure transducer selectively connected to that one of the first and second fluid lines having a higher pressure than the other. More preferably, the electronic control means calculates an expected fluid pressure as a function of the signal $V_{TT}$ generated by the primary applied steering torque sensor; compares the higher of the fluid pressures $LP_p$ or $RP_p$ in the first and second fluid lines, and the redundant measure of the fluid pressures $LP_p$ and $RP_p$ provided by the means for providing the same, to the expected fluid pressure; and terminates the powered assist provided by the system when either the higher of the fluid pressures $LP_p$ or $RP_p$ in the first and second fluid lines or the redundant measure of the fluid pressure fails to correlate with the expected fluid pressure calculated by the electronic control means. It is important to note that this calculation of an expected fluid pressure is not used as a target for controlling the electric motor, but only for indicating when the system is not operating properly.

The power steering system of the present invention preferably also comprises a fluid reservoir and a two-position, three-way valve for fluidly connecting the one of the first fluid line and the second fluid line having lower fluid pressure to the fluid reservoir. The three-way valve is operable to connect the second fluid line to the fluid reservoir when the fluid pressure $LP_p$ in the first fluid line is greater than the fluid pressure $RP_p$ in the second fluid line, and to connect the first fluid line to the fluid reservoir when the fluid pressure $RP_p$ in the second fluid line is greater than the fluid pressure $LP_p$ in the first fluid line. The system is preferably further configured with the first and second fluid check valves disposed in a suction line connected to the fluid reservoir directly in fluid communication with the ports of the power cylinder. The check valves are oriented so as to permit the flow of fluid from the fluid reservoir through the suction line and to the connected left or right port of the power cylinder when the fluid pressure $LP_p$ or $RP_p$ at that left or right port is less than the pressure in the reservoir.

The suction line preferably has a lesser flow impedance (i.e., comprising both resistance and inductance) than the first and second fluid lines, thereby causing the flow of fluid from the fluid reservoir through the suction line and one of the check valves to be returned to the fluid reservoir via the power cylinder, the higher pressure one of the first and second fluid lines, the fluid pump, and finally, through the other of the first and second fluid lines, which is of course, connected to the fluid reservoir via the three-way valve. Utilizing the combination of the check valves and the two-position, three-way valve in this manner, as opposed to utilizing only check valves, eliminates the possibility of system pressure build up in response to fluid expansion at elevated operating temperatures. Further, the selective placement of the check valves and the three-way valve causes continual purging of the system every time the dirigible wheels drive the power cylinder, as when exiting a turn. In addition, this permits a system newly filed with fluid to be purged by elevating the dirigible wheels and mechanically pivoting them back and forth until only air- and foam-free fluid remains in the system as is called for above.

Preferably, the rotating inertia of the electric drive motor is decoupled from the steering system in the event of any system failure via the system additionally placing both of the first and second fluid lines in direct fluid communication with the reservoir. Such communication can be carried out, for example, by a relief valve which is closed in order to prevent such communication when the system is active, but which is spring-biased in a fail-safe manner to its open orientation in order to achieve such communication if the system should fail. ("Fail" includes actual system failure or the intentional termination of the powered assist provided by the system.) The relief valve is preferably a solenoid activated two-position, compound two-way relief valve, each section of which fluidly connects the first and second fluid lines to the reservoir in the fail-safe mode.

The power steering system is preferably a regenerative system similar to that disclosed in co-pending Provisional U.S. Patent Application Ser. No. 60/073,560, entitled "Regenerative Power Steering System Including Solenoid-Actuated Four-Way Cross-Over Valve" (E. H. Phillips, filed Feb. 3, 1998). An advantage of the system of the present invention is that the four-way control valve included in the system disclosed in the '560 Provisional Application and in other EHPS systems can be eliminated. Thus, it is preferred that the system of the present invention is regenerative and alternatively operable in an unassisted straight steering mode, a powered assist mode in which the powered assist is provided by the power cylinder during entry of the vehicle into a turn and an energy regeneration mode which recovers energy while the vehicle exits a turn. The electronic control means controls the electric motor so as to provide a flow of pressurized fluid from one of the first and second fluid pump ports during the powered assist mode of the system, and permit the electric motor to generate energy recovered through the fluid pump from a reversed flow of pressurized fluid during the energy regeneration mode of the system. One advantageous feature of the system is that the fluid pump and the electric motor do not rotate during the straight steering mode of the system. The system includes an electrical energy means for storing and delivering electrical power, such that electrical energy is delivered from the electrical energy means to the electric motor during the powered assist mode of the system, and is stored to the electrical energy means by the electric motor during the energy regeneration mode of the system.

The electronic control means of the system preferably employs the fluid pressures measured by the first and second pressure transducers to counteract a hydromechanical resonance occurring predominantly between the moment of inertia of the electric motor and a system spring rate presented by the steering load stiffness of the host vehicle. More particularly, the electronic control means treats the hydromechanical resonance as a resonance between a mass element predominated by the moment of inertia of the electric motor and a theoretical spring element dominated by tire loading characteristics associated with the tires. The electronic control means then employs the fluid pressures $LP_p$ and $RP_p$ measured by the first and second pressure transducers to control the electric motor so that the fluid pump is not driven in harmony with that hydromechanical resonance. In particular, the electronic control means employs the higher valued fluid pressure $LP_p$ or $RP_p$ within an internal servo control loop comprising the electric motor and fluid pump to control the resulting fluid pressure as a selected function of the torque control signal according to the internal gain value ICG. Thus, the operation of the electric motor is controlled such that the fluid pump is not driven in harmony with that mechanical resonance.

The electronic control means preferably provides for speed sensitive steering by reducing the internal gain value ICG as a selective function of vehicle speed. In addition, the electronic control means preferably provides compensation of at least one of the magnitude of the applied steering torque, the operation of the electric motor, and the fluid pressure measured by one of the first and second pressure transducers. More preferably, the compensation allows for stable operation of both the internal servo control loop and the overall system servo control loop with adequate phase and gain margins over the entire range of vehicle speed and other operational factors, such as a driver abruptly encountering glare ice on an otherwise dry roadway, and the like. In general, such operation requires selective manipulation of the compensation via selective variation of the corner frequencies of poles and/or zeros comprised in the compensation with respect to vehicle speed, in order to adjust for changes in the internal gain value ICG and the spring-like steering load. Preferably, the compensation of the magnitude of the applied steering torque predominantly or exclusively includes at least one pole, while the compensation of the internal servo control loop, between the input signal $V_i$ and the steering force assist ultimately supplied to the dirigible wheels by the system, is predominated by a low-frequency zero followed by at least one pole.

This latter compensation may be carried out either in the forward direction by compensating the internal error signal $V_{es}$, or in the feedback path. It has been found to be preferable to confine the compensation of the internal servo control loop to the feedback path. As will be explained below, this is because all of the perturbing disturbance factors are present in the feedback path but are not yet directly present in the product of the internal gain value ICG and the error signal $V_e$ which forms the internal error signal $V_{es}$.

The electronic control means also preferably employs the fluid pressures $LP_p$ and $RP_p$ measured by the first and second pressure transducers in establishing the internal servo control loop. $V_i$ is derived from the application of an applied steering torque $T_s$ to the steering wheel of the host vehicle. More particularly, the system preferably comprises a tachometer operatively connected to the electronic control means which generates a signal $V_t$ representative of the rotational speed of the electric motor. The electronic control means subtracts $V_t$ from the compensated signal $V_c$ (generated together by the primary applied steering torque sensor and the electronic control means) and employs the resulting difference as the input signal $V_i$ to the internal servo control loop. $V_t$ is equal to $q_m \, s/K_c$, $q_m$ being a rotational position of the electric motor, $K_c$ being a tachometer feedback damping factor and s being the first-order Laplace variable. The Laplace variable s is also referred to as the complex-frequency variable; as explained in detail in chapters 15 through 17 of H. H. Skilling, *Electrical Engineering Circuits* (John Wiley & Sons, Inc., New York, N.Y., 1957), if the functions at issue are linear (as they are here), the first-order Laplace variable reduces to the first order derivative of those functions with respect to time. Herein, $s^2$ refers to the second-order Laplace variable, which similarly reduces to the second order derivative with respect to time. The reciprocals $1/s$ and $1/s^2$ reduce respectively to single and double integration with respect to time.

Once the electronic control means generates the input signal $V_i$ to the internal servo control loop, the electronic control means further generates (and preferably compensates) a signal representative of the fluid pressure $LP_p$ or $RP_p$ measured by the first or second pressure transducer so as to give an internal loop feedback signal $V_f$, and subtracts the internal loop feedback signal $V_f$ from the input signal $V_i$ to the internal servo control loop so as to yield an error signal $V_e$ from which a drive signal $V_d$ for operating the electric motor is derived. The electronic control means further determines an internal control loop gain value ICG as a function of vehicle speed and the signal $V_{TT}$, and operates the electric motor so as to generate a measured fluid pressure $LP_p$ or $RP_p$ in accordance with an internal error signal $V_{es}$ equal to the product of the error signal $V_e$ and the internal control loop gain value ICG. (Alternately, compensation could be applied to that product to yield an internal modified error signal $V_{mes}$ which would be used instead of $V_{es}$.)

As indicated above, the system is always in one of two states associated with either a left or right vehicle turn, in which each of the first and second fluid lines is sequentially coupled to the reservoir. Thus, a particularly advantageous feature of the system is that the electronic control means can obviate a significant drawback of common pressure transducers (in particular, that common pressure transducers possess a non-zero offset voltage at zero pressure, which non-zero offset voltage is subject to drift) by adaptively calibrating the fluid pressure value measured by that pressure transducer to a zero value. In particular, when the fluid pressure $LP_p$ or $RP_p$ measured by one of the first and second pressure transducers is greater than the fluid pressure $RP_p$ or $LP_p$ measured by the other of the second and first pressure transducers and exceeds a predetermined threshold value, the electronic control means calibrates the other of the second and first pressure transducers by assigning a zero value to an internal signal representative of the fluid pressure $RP_p$ or $LP_p$ measured by the other of the second and first pressure transducers.

In a second aspect, the present invention is directed to a particular combination of the elements identified above. More particularly, in this second aspect, the present invention is directed to improvements in a power steering system for a vehicle having dirigible wheels, a power cylinder having left and right ports and adapted to supply a powered assist to steering the dirigible wheels of the vehicle upon the supply of a pressurized fluid to one of the left and right ports, a reversible fluid pump having first and second ports, an electric motor operatively connected to and capable of reversibly driving the fluid pump, a first fluid line connecting the first port of the fluid pump to the left port of the power cylinder, a second fluid line connecting the second port of the fluid pump to the right port of the power cylinder, a pair of check valves disposed in a suction line connected to a reservoir and connected one each to the first and second fluid lines, and a primary applied steering torque sensor which generates a signal $V_{TT}$ in response to at least an applied steering torque $T_s$; the improvements wherein the power steering system further comprises a first pressure transducer sensing the fluid pressure $LP_p$ in the first fluid line; a second pressure transducer sensing the fluid pressure $RP_p$ in the second fluid line; an electronic control means to which the first and second pressure transducers and the primary applied steering torque sensor are operatively connected, and which controls actuation of the electric motor; a redundant applied steering torque sensor which generates a redundant signal in response to the applied steering torque $T_s$ and which is connected to the electronic control means; an actuation speed measuring means operatively connected to the electronic control means for providing a tachometer signal $V_t$ representative of steering movement of the dirigible wheels; means for providing a redundant measure of the fluid pressures $LP_p$ and $RP_p$ in the first and second fluid lines; and a fluid reservoir supplying fluid to the system; wherein the electronic control means establishes servo control over the powered assist to steering supplied by the power cylinder in dependence upon the fluid pressure $LP_p$ or $RP_p$ sensed by one of the first and second pressure transducers; wherein the electronic control means establishes closed loop servo control over the electric motor in dependence upon the fluid pressure $LP_p$ or $RP_p$, sensed by the one of the first and second pressure transducers and achieves a substantially linear relationship between the applied steering torque $T_s$ and the powered assist to steering supplied by the power cylinder; wherein the electronic control means generates an error signal $V_e$ in response to at least the generation of the signal $V_{TT}$ by the primary applied steering torque sensor, the error signal $V_e$ being dependent upon the fluid pressure $LP_p$ or $RP_p$ sensed by one of the first and second pressure transducers; wherein the electronic control means determines an internal control loop gain value ICG as a function of at least vehicle speed, the internal control loop gain value ICG being further related to the signal $V_{TT}$ generated by the primary applied steering torque sensor; and wherein the electronic control means multiplies the error signal $V_e$ by the internal control loop gain value ICG and causes the electric motor to drive the fluid pump in a manner which generates the fluid pressure $LP_p$ or $RP_p$ sensed by the one of the first and second pressure transducers in accordance with the product of the error signal $V_e$ and the internal control loop gain value ICG; wherein the electronic control means generates the error signal $V_e$ by compensating the signal $V_{TT}$ generated by the primary applied steering torque sensor to yield a compensated steering torque signal $V_c$; subtracting from the compensated steering torque signal $V_c$ a tachometer feedback signal $V_t$, representative of steering movement of the dirigible wheels, to yield an input signal $V_i$; obtaining a pressure-dependent internal loop feedback signal $V_f$ and subtracting the feedback signal $V_f$ from the input signal $V_i$ to yield the error signal $V_e$; wherein the electronic control means terminates the powered assist provided by the system when the redundant signal from the redundant applied steering torque sensor fails to correlate with the signal $V_{TT}$ from the primary applied steering torque sensor; wherein the vehicle includes a steering wheel to which the primary applied steering torque sensor is operatively connected, and wherein the actuation speed measuring means comprises a tachometer for measuring the rotational speed of at least one of the steering wheel and the electric motor; wherein the electronic control means terminates the powered assist provided by the system when the redundant measure of the fluid pressures $LP_p$ and $RP_p$ provided by the means for providing the same fails to correlate with the fluid pressure $LP_p$ or $RP_p$ sensed by one of the first and second pressure transducers; wherein the means for providing a redundant measure of the fluid pressures $LP_p$ and $RP_p$ in the first and second fluid lines comprises a third pressure transducer selectively connected to that one of the first and second fluid lines having a higher pressure than the other; wherein the system is regenerative and alternatively operable in an unassisted straight steering mode, a powered assist mode in which the powered assist is provided by the power cylinder during entry of the vehicle into a turn and an energy regeneration mode which recovers energy while the vehicle exits a turn; and wherein the electronic control means controls the electric motor so as to provide a flow of pressurized fluid from one of the first and second fluid pump ports during the powered assist mode of the system, and permit the electric motor to generate energy recovered through the fluid pump from a reversed flow of pressurized fluid during the energy regeneration mode of the system; wherein the vehicle presents a steering load stiffness to the power steering system; wherein the electronic control means employs the fluid pressures measured by the first and second pressure transducers to counteract a hydromechanical resonance occurring predominantly between the moment of inertia of the electric motor and a system spring rate presented by the steering load stiffness; wherein the electronic control means treats the hydromechanical resonance as a resonance between a mass element predominated by the moment of inertia of the electric motor and a theoretical spring element dominated by tire loading characteristics associated with the tires; and wherein the electronic control means employs the fluid pressures measured by the first and second pressure transducers to control the electric motor so that the fluid pump is not driven in harmony with the hydromechanical resonance; wherein the electronic control means provides compensation of at least one of the magnitude of the applied steering torque, the operation of the electric motor, and the fluid pressure $LP_p$ or $RP_p$ measured by one of the first and second pressure transducers, and wherein the compensation of the magnitude of the applied steering torque predominantly or exclusively includes at least one low frequency pole and the compensation of the fluid pressure $LP_p$ or $RP_p$ measured by one of the first and second pressure transducers is predominated by a low-frequency zero followed by one or more higher frequency poles; wherein the vehicle includes a steering wheel, such that the application of an applied steering torque $T_s$ to the steering wheel results in the application by the system of a steering force assist to the dirigible wheels; and wherein the electronic control means employs the fluid pressures $LP_p$ and $RP_p$ measured by the first and second pressure transducers to establish an internal servo control loop between the input signal $V_i$ derived from the application of an applied steering torque $T_s$ to the steering wheel and the steering force assist to the dirigible wheels; wherein when the fluid pressure $LP_p$ or $RP_p$ measured by one of the first and second pressure transducers is greater than the fluid pressure $RP_p$ or $LP_p$ measured by the other of the second and first pressure transducers and exceeds a predetermined threshold value, the electronic control means calibrates the other of the second and first pressure transducers by assigning a zero value to an internal signal representative of the fluid pressure $RP_p$ or $LP_p$ measured by the other of the second and first pressure transducers; and wherein both of the first and second fluid lines are placed in direct fluid communication with the reservoir should the powered assist to steering provided by the system fail.

In a third aspect, the present invention is directed to an improvement in a power steering system for a vehicle having dirigible wheels, a power cylinder having left and right ports and adapted to supply a powered assist to steering the dirigible wheels of the vehicle upon the supply of a pressurized fluid to one of the left and right ports, a reversible fluid pump having first and second ports, an electric motor operatively connected to and capable of reversibly driving the fluid pump, a first fluid line connecting the first port of the fluid pump to the left port of the power cylinder, a second fluid line connecting the second port of the fluid pump to the right port of the power cylinder, a pair of check valves disposed in a suction line connected to a reservoir and connected one each to the first and second fluid lines, and a primary applied steering torque sensor which generates a signal $V_{TT}$ in response to at least an applied steering torque $T_s$; the improvement wherein the power steering system further comprises a two-position, three-way valve fluidly connecting the first fluid line and the second fluid line to the fluid reservoir, the three-way valve being operable to connect the second fluid line to the fluid reservoir when the fluid pressure $LP_p$ in the first fluid line is greater than the fluid pressure $RP_p$ in the second fluid line, and to connect the first fluid line to the fluid reservoir when the fluid pressure $RP_p$ in the second fluid line is greater than the fluid pressure $LP_p$ in the first fluid line; and the pair of check valves disposed in the suction line being directly connected one each to the left and right ports of the power cylinder, oriented so as to permit the flow of fluid from the fluid reservoir through the suction line and to the connected left or right port of the power cylinder when the pressure $LP_p$ or $RP_p$ at that left or right port is less than the pressure in the reservoir; wherein the suction line has a lesser flow impedance than the first and second fluid lines, thereby causing the flow of fluid from the fluid reservoir through the suction line and one of the check valves to be returned to the fluid reservoir through the power cylinder, the higher pressure one of the first and second fluid lines, the fluid pump, the other of the first and second fluid lines, and the three-way valve.

In a fourth aspect, the present invention is directed to an improvement in a power steering system for a vehicle having dirigible wheels, a power cylinder having left and right ports and adapted to supply a powered assist to steering the dirigible wheels of the vehicle upon the supply of a pressurized fluid to one of the left and right ports, a reversible fluid pump having first and second ports, an electric motor operatively connected to and capable of reversibly driving the fluid pump, a first fluid line connecting the first port of the fluid pump to the left port of the power cylinder, a second fluid line connecting the second port of the fluid pump to the right port of the power cylinder, a pair of check valves disposed in a suction line connected to a reservoir and connected one each to the first and second fluid lines, and a primary applied steering torque sensor which generates a signal $V_{TT}$ in response to at least an applied steering torque $T_s$; the improvement wherein the power steering system further comprises electronic control means establishing a desired fluid pressure for one of the first fluid line and the second fluid line in response to at least the generation by the primary applied steering torque sensor of the signal $V_{TT}$ corresponding to an applied steering torque $T_s$; a first pressure transducer operatively connected to the electronic control means and sensing the fluid pressure $LP_p$ in the first fluid line; and a second pressure transducer operatively connected to the electronic control means and sensing the fluid pressure $RP_p$ in the second fluid line; wherein the electric motor is controlled by the electronic control means so as to drive the fluid pump in a manner which urges the fluid pressure $LP_p$ or $RP_p$ in one of the first and second fluid lines towards the desired fluid pressure established by the electronic control means. It should be noted that this is an elementary implementation of the principles of the present invention and, indeed, it is believed that this fourth aspect is not the preferred way to implement the broad principles of the present invention. Accordingly, even though the instant specification provides full support to this fourth aspect of the present invention, such support should be considered as being merely incidental; the practice of the preferred embodiment of the invention as detailed below is likely to fall outside the scope of this fourth aspect of the present invention.

In a fifth and final aspect, the present invention is directed to an improvement in a power steering system for a vehicle having dirigible wheels, a primary applied steering torque sensor which generates a signal $V_{TT}$ in response to an applied steering torque $T_s$, an electric motor for developing a powered assist to steering the dirigible wheels and an electronic control means to which the primary applied steering torque sensor and the electric motor are operatively connected, the electronic control means controlling actuation of the electric motor in dependence upon at least the signal $V_{TT}$ from the primary applied steering torque sensor; the improvement wherein the system further comprises a redundant applied steering torque sensor which generates a redundant signal in response to the applied steering torque $T_s$ and which is connected to the electronic control means, and wherein the electronic control means terminates the powered assist provided by the system when the redundant signal from the redundant applied steering torque sensor fails to correlate with the signal $V_{TT}$ from the primary applied steering torque sensor or with any other parameter of the system, but does not use the redundant signal from the redundant applied steering torque sensor for otherwise controlling any other element or parameter of the system.

The power steering system of the present invention possesses several distinct advantages over prior EPS systems. For example, the system of the present invention provides full time independent verification of the instant values of steering boost, substantially eliminating concerns relating to auto-steer. The system of the present invention also substantially eliminates low frequency stability control problems previously encountered in such systems.

The reversible fluid pump, fluid lines and associated valves altogether taken as a complete system provide an entirely new way to couple (and to decouple in the event of any system failure) the drive motor of an EPS system to the balance of the steering system, such that prior concerns about mechanical over constraint, Coulomb friction, wear and backlash are eliminated.

Advantageously, the steering force output from the system of the present invention is linearly related to the applied steering torque.

Of course, the system of the present invention enjoys all of the advantages of a regenerative system. The power steering system of the present invention possesses high efficiency and recovers a significant portion of the energy returned from the dirigible wheels when the host vehicle exits a turn.

Because of the high efficiency, the system of the present invention draws significantly less current during parking maneuvers than is drawn by typical EHPS systems. More particularly, the ability to handle regenerative power allows the system of the present invention to operate in all four quadrants which permits smooth transition between its powered assist and energy regeneration modes, and to permit good steering control both during operation in each of the modes and during transition between modes. Finally, the system of the present invention allows safe operation of the vehicle during failure of the powered assist provided by the system.

BRIEF DESCRIPTION OF THE DRAWING

A better understanding of the present invention will now be had with reference to the accompanying drawing, wherein like reference characters refer to like parts throughout the several views herein, and in which.

DETAILED DESCRIPTION OF THE PREFERRED EMBODIMENT

Figure 1:
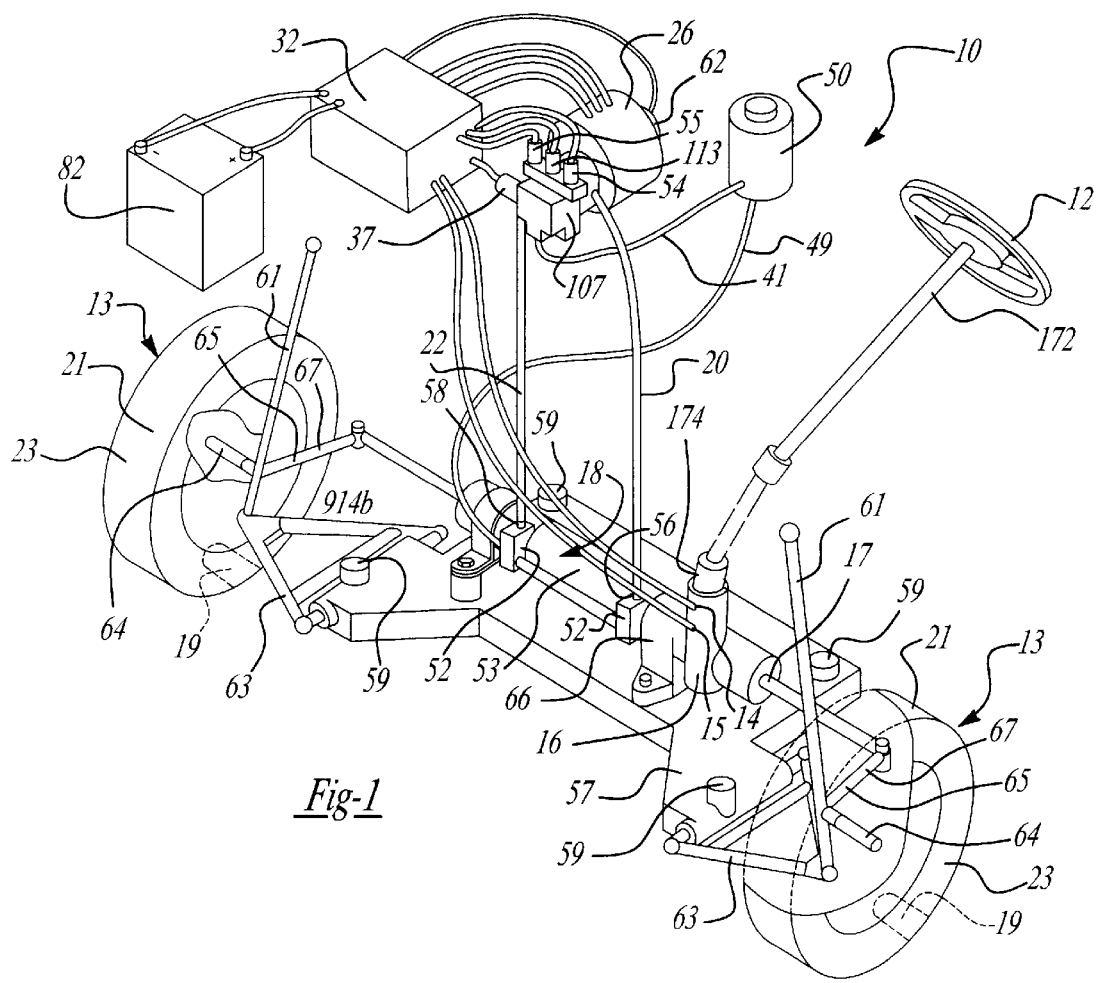
FIG. 1 is a perspective view of a portion of a host vehicle in which the preferred embodiment of the present invention is incorporated.
Figure 2:
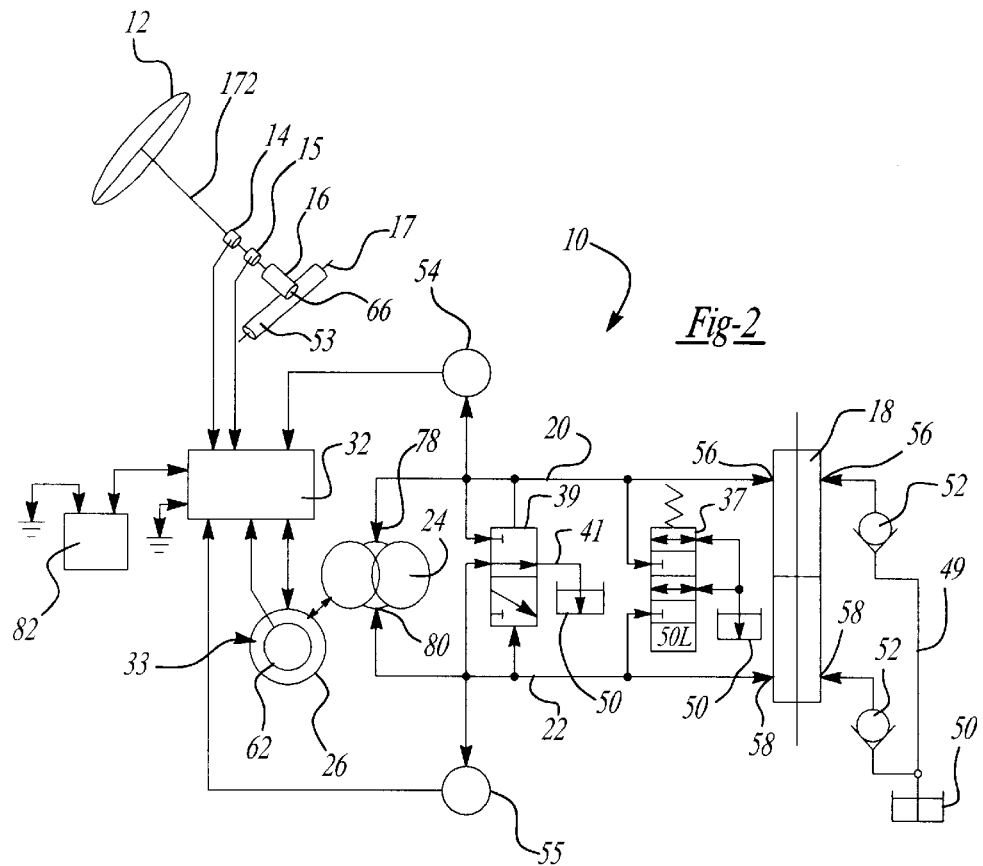
FIG. 2, is a schematic view of the preferred embodiment of the present invention.

With reference first to FIGS. 1 and 2, a vehicular power steering system according to the present invention is thereshown, in perspective and schematically, respectively, in conjunction with various constituents of the host vehicle in which the system 10 is located. More particularly, the system 10 is employed with a steering wheel 12 movable by a driver steering the dirigible (steerable) wheels 13 of the vehicle. The steering wheel 12 is connected to the dirigible wheels 13 by a steering shaft 172 coupled to a suitable steering gear 16, for example, of the rack-and-pinion type, including a pinion shaft (not shown) contained in a steering gear housing 66 and engaged with a gear rack 17. A primary applied steering torque sensor 14 is connected to the steering gear 16 and generates an electrical or electronic signal representative of the magnitude and direction of a steering torque applied to the steering wheel 12.

As is conventional, the application of an applied steering torque $T_s$ to the steering wheel 12 results in the application by the system 10 of an assisted steering force to the dirigible wheels 13. More particularly, the gear rack 17 is partly contained within a housing 53 comprising a power cylinder 18, the housing 53 being fixed to a conventional steering assembly sub-frame 57. The sub-frame 57 includes a plurality of mounts 59 for connecting the steering assembly sub-frame 57 to the vehicle chassis (not shown). The dirigible wheels 13 are rotatably carried on wheel spindles 64 connected to vehicle steering knuckles 65 and vehicle struts 61. The steering knuckles 65 are pivotably connected to the sub-frame 57 by lower control arms 63. A portion 67 of each steering knuckle 65 defines a knuckle arm radius $R_w$ about which the assisted steering force, comprising both mechanically derived steering force and powered assist to steering as respectively provided by the pinion-rack interface and the power cylinder 18.

The power steering system 10 of the present invention first comprises a power cylinder 18 connected to the gear rack 17 arranged to apply an assistive force to longitudinal movement of the gear rack 17. More particularly, the power cylinder 18 has a left port 56 and a right port 58. Upon the supply of a pressurized fluid to one of the left and right ports 56 and 58, the power cylinder 18 assists longitudinal movement of the gear rack 17 by applying an assistive force to it, and thereby is adapted to supply a powered assist to steering the dirigible wheels 13 of the vehicle about the knuckle arm radius $R_w$. Of course, a manual, mechanical steering force derived from the mesh of the pinion and rack is concurrently supplied to the dirigible wheels 13 about the knuckle arm radius $R_w$ through the steering gear 16 as well. The total steering force applied to the dirigible wheels is the sum of the manual steering force and the powered assist provided by the power cylinder 18.

Figure 3:
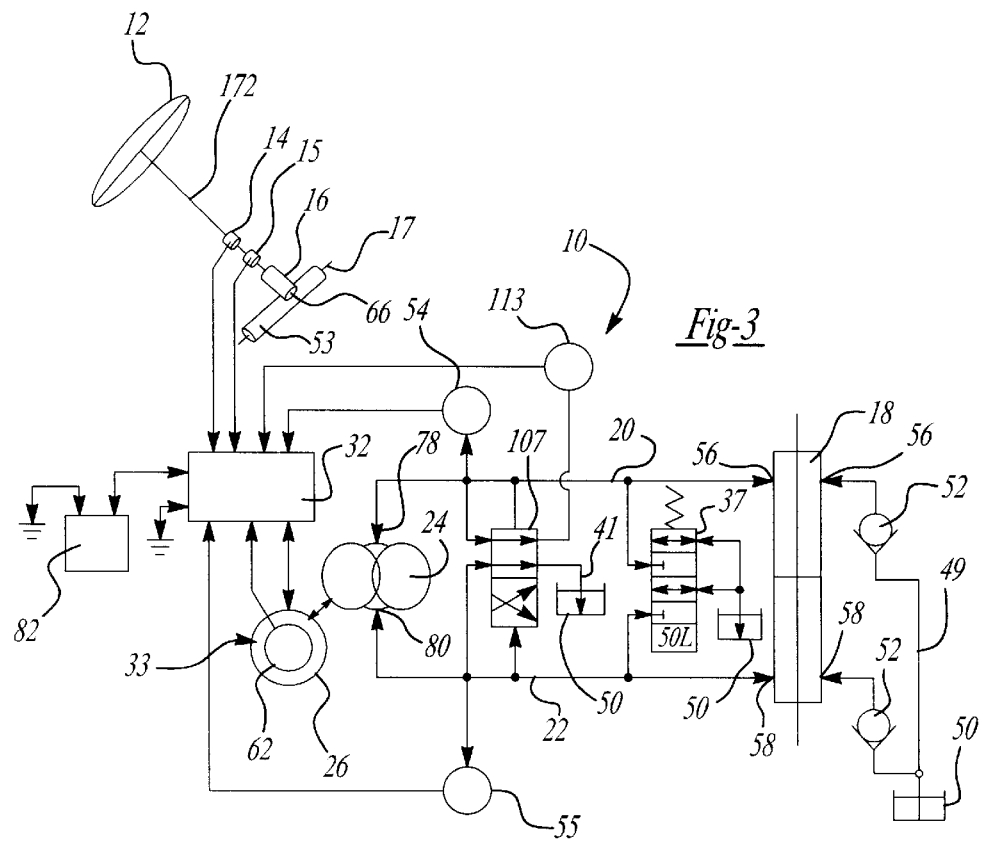
FIG. 3 is a schematic view of the preferred embodiment of the present invention, but with modified hydraulic connections.

The power steering system 10 of the present invention also comprises a means 53 for selectively supplying pressurized fluid to the left and right ports 56 and 58 of the power cylinder 18. The fluid is ultimately supplied from a fluid reservoir 50. To clarify the presentation of the various connections to the reservoir 50, the reservoir 50 is shown in FIGS. 2 and 3 at a plurality of locations. All of these constitute the same reservoir 50, however, not separate reservoirs. Preferably, the fluid supply means 53 is chosen so as to permit the system 10 to be alternatively operated in powered assist, straight steering and energy regeneration modes, such as in the manner disclosed in the co-pending Provisional Application Ser. No. '560.

Thus, the fluid supply means 53 preferably first comprises a reversible fluid pump 24 having a first port 78 and a second port 80. The fluid supply means 53 preferably also comprises a first fluid line 20 connecting one of the ports 78 or 80 of the fluid pump 24, for example, the first port 78 of the fluid pump 24, to the left port 56 of the power cylinder 18. The fluid supply means 53 preferably further comprises a second fluid line 22 connecting the other of the ports 80 or 78, for example, the second port 80 of the fluid pump 24, to the right port 58 of the power cylinder 18. Of course, the designation of one of the ports 78 or 80 and one of the fluid lines 20 or 22 as "first" and the other as "second" is arbitrary, since in a regenerative system fluid will at different times flow both into and out of the fluid pump 24 through both of the ports 78 and 80, and will at different times flow in both directions through the lines 20 and 22.

The power steering system 10 of the present invention next comprises at least a primary applied steering torque sensor 14. The primary applied steering torque sensor 14 is shown in FIG. 1 as being connected to the steering gear housing 66. Alternatively, as shown in FIGS. 2 and 3, the primary applied steering torque sensor 14 can be operatively connected to the steering shaft 172. The system 10 further comprises an electric motor 26 operatively connected to and capable of reversibly driving the fluid pump 24 and an electronic control means 32 which controls actuation of the electric motor 26 in a manner described in more detail below. The electric motor 26 is preferably an induction motor under vector control by the electronic control means 32. Conveniently, the fluid pump 24 and the electric motor 26 comprise the motor pump (24) and motor generator (26) of the power pack (84) disclosed in the co-pending Provisional Application Ser. No. '560, the parenthetical reference numerals referring to the numerals used in Provisional Application Ser. No. '560.

The system 10 further comprises a first pressure transducer 54 sensing the fluid pressure $LP_p$ in the first fluid line 20, and a second pressure transducer 55 sensing the fluid pressure $RP_p$ in the second fluid line 22. The first and second pressure transducers 54 and 55 are operatively connected to the electronic control means 32. While the first and second pressure transducers 54 and 55 can be connected to their respective fluid lines 20 and 22 at any location between the fluid pump 24 and the power cylinder 18, it is preferred that the first and second pressure transducers 54 and 55 be located at taps in the fluid pump 24 at or near the first and second ports 78 and 80 of the fluid pump 24, respectively. The measured pressure accurately indicates the actual pressure $LP_p$ or $RP_p$ in the fluid lines 20 or 22 because there is no load in the fluid lines 20 and 22 between the fluid pump 24 and the power cylinder 18.

As indicated above, the power steering system 10 of the present invention can be characterized in that, in contrast to prior EPS systems, primary control over generation of the assistive steering force is made without any measurement of the torque produced by the drive motor of the system, in this case, the electric motor 26. More particularly, the electronic control means 32 establishes servo control over the powered assist to steering supplied by the power cylinder 18 in dependence upon the fluid pressure $LP_p$ or $RP_p$ sensed by one of the first and second pressure transducers 54 or 55, in particular, that one sensor having the higher pressure. This servo control is described in more detail below with regard to the flow chart disclosed in FIG. 4, and the block diagram disclosed in FIGS. 5A–5C.

The power steering system 10 of the present invention preferably further comprises a variety of additional components which augment the performance, reliability and safety of the system 10. For example, it is highly desirable to have a way to bleed air from the system 10 when fluid is first introduced into it;

to vent or replace fluid from or to the system 10 upon changes in temperature, for example, during operation of the system 10; and to eliminate any foam or bubbles which may occur during operation of the system 10, particularly if the system 10 is operated in alternative modes. These and other objectives can be achieved in the power steering system 10 according to the present invention by including in it, for example, a two-position, three-way valve 39 connecting the first fluid line 20 and the second fluid line 22 to the fluid reservoir 50 via line 41. As shown in FIG. 2, the three-way valve 39 is activated by that one of the lines 20 or 22 having the higher pressure and is operable to connect the line 20 or 22 having the lower fluid pressure to the reservoir; that is, the three-way valve 39 connects the second fluid line 22 to the fluid reservoir 50 when the fluid pressure in the first fluid line 20 is greater than the fluid pressure in the second fluid line 22, and connects the first fluid line 20 to the fluid reservoir 50 when the fluid pressure in the second fluid line 22 is greater than the fluid pressure in the first fluid line 20.

Alternatively, but preferably in addition, the system 10 can further comprise a suction line 49 selectively directly connecting one of the left and right ports 56 and 58 of the power cylinder 18 to the fluid reservoir 50. A pair of check valves 52 are disposed in the suction line 49, connected one each to the left and right ports 56 and 58 of the power cylinder 18. The check valves 52 are oriented so as to permit the flow of fluid from the reservoir 50, through the suction line 49 and to the connected left or right port 56 or 58 of the power cylinder 18, when the fluid pressure $LP_p$ or $RP_p$ at that left or right port 56 or 58 is less than the pressure in the reservoir 50 (that is, when the pressure on either side of the cylinder conventionally defined in the power cylinder 18 is less than the pressure in the reservoir 50). The suction line 49 is larger in diameter than the first and second fluid lines 20 and 22. The suction line 49 therefore has a lesser flow impedance (i.e., comprising both resistance and inductance) than the first and second fluid lines 20 and 22, thereby permitting the described flow of fluid from the fluid reservoir 50 through the suction line 49 to be returned to the fluid reservoir 50 through the three-way valve 39 and the line 41.

It is important to note that this combination of the three-way valve 39, the line 41, the suction line 49 and the check valves 52 can provide for the continuous rejuvenation of fluid in any power steering system of the type employing a pressurized fluid, that is, in conventional power steering systems having a pump driven directly by the vehicle engine, as well as in fluidic systems other than the hybrid type disclosed herein. This can occur every time a host vehicle incorporating any such system recovers from a turn; at least a portion of the fluid entering the expanding low-pressure side of the power cylinder 18 enters via the suction line 49 and one of the check valves 52, and that fluid volume is then returned to the reservoir 50 via the three-way valve 39 and the line 41.

For further safety and reliability, it is highly preferred that the power steering system 10 of the present invention include redundant measures of various operating parameters. Such redundancy serves at least two purposes: it provides a direct check on the proper operation of various individual components of the system 10; and it ensures the rapid termination of the powered assist to steering provided by the system 10, in case one or more individual components should fail, thereby affirmatively preventing runaway within the system 10 and an unintended steering event commonly known in the industry as "auto steer".

Thus, the power steering system 10 of the present invention preferably further comprises a redundant applied steering torque sensor 15 different from the primary applied steering torque sensor 14. "Different from" means that the redundant applied steering torque sensor 15 comprises separate elements from those comprised in the primary applied steering torque sensor 14. While the redundant applied steering torque sensor 15 can act on a different operating principle than does the primary applied steering torque sensor 14, that is, that the primary and redundant applied steering torque sensors 14 and 15 can be of different fundamental types, it is preferred that they are the same type of sensor.

In any event, the electronic control means 32 terminates the powered assist to vehicle steering provided by the system 10 when the redundant signal from the redundant applied steering torque sensor 15 fails to correlate with the signal $V_{TT}$ from the primary applied steering torque sensor 14.

With reference now to FIGS. 1 and 3, the power steering system 10 of the present invention can include an additional or alternative redundant measure of a system parameter (such as assistive pressure) for safety purposes. More particularly, the system 10 further or alternatively comprises a means 35 for providing a redundant measure of the pressures $LP_p$ and $RP_p$ in the first and second fluid lines 20 and 22. This provides a check on the failure of the first and second pressure transducers 54 and 55, and can be employed by the electronic control means 32 to prevent an erroneous voltage provided by a failed pressure transducer from generating an inappropriate error signal and causing system runaway. For example, the means 35 for providing a redundant measure of the pressures in the first and second fluid lines 20 and 22 can comprise a third pressure transducer 113 selectively connected to the one of the first an second fluid lines 20 or 22 having a higher fluid pressure than the other. The required selective connection is carried out in any convenient manner, as shown in FIG. 3 for example, by including a two position four-way valve 107 which selectively connects the third pressure transducer 113 to that one of the first and second fluid lines 20 or 22 which has the higher pressure. This two-position four-way valve 107 replaces the two-position, three-way valve 39 shown in FIG. 2, but still connects the first or second fluid line 20 or 22 having the lower pressure to the reservoir 50, like the three-way valve 39. The two-position, four-way valve 107 is not comparable to the four-way cross-over valve employed in the co-pending Provisional Application Ser. No. '560, however, because it does not selectively connect the fluid pump 24 to the power cylinder 18.

The electronic control means also generates a redundant expected computed value of the of the higher valued pressure $LP_p$ or $RP_p$ in response to either the signal $V_{TT}$ from the primary applied steering torque sensor 14 or the redundant signal from the redundant applied steering torque sensor 15. The redundant expected computed signal, of course, must correspond to the actual signal indicative of the measured value of the higher valued pressure $LP_p$ or $RP_p$ provided by either of the first and second pressure transducers 54 and 55, or the redundant measure of the pressure provided by the third pressure transducer 113. The electronic control means 32 compares each of the respective redundant computed and measured signals, and terminates the powered assist provided by the system 10 when any one of the redundant signals fails to correlate acceptably. A difference between signals corresponding to the same measured quantity may indicate a failure of one of the components of the system 10 measuring that quantity, or, may indicate a more fundamental failure within the system 10, including a failure of the electronic control means 32 itself. In any case, should such a difference between signals corresponding to the same measured quantity occur, the electronic control means terminates the powered assist provided by the system 10.

It is highly desirable that, should the powered assist to steering provided by the system 10 be terminated by the electronic control means 32 in this manner, or should the system 10 otherwise fail, the vehicle can still be steered manually. Isolating the system 10 from the mechanical path of manual steering, however, substantially improves the ease of such manual steering. Without isolation, the vehicle operator would have to apply an additional torque, over and above that required for steering, in order to overcome the hindrance to steering presented by needing to manually drive fluid from the power cylinder 18 through the fluid pump 24, and thereby drive the fluid pump 24 and the electric motor 26 of the system 10. Accordingly, as shown in both FIGS. 2 and 3, it is preferred that the system 10 further comprise a two-position, solenoid-actuated compound two-way relief valve 37 connected to the first and second fluid lines 20 and 22. The two-position relief valve 37 is spring-biased so that, in case of failure of the system 10, both of the first and second fluid lines 20 and 22 are placed in direct fluid communication with the fluid reservoir 50. When positioned in this fail-safe orientation, the two-position relief valve 37 effectively mimics the action of a clutch in decoupling the inertia of the rotating elements of the electric motor 26 and the fluid pump 24 from the remainder of the system 10. However, during normal operation of the system 10, the solenoid positions the relief valve 37 so that such communication through the relief valve 37 is prevented. It is this latter, normal operation position of the relief valve which is shown in FIGS. 2 and 3.

As indicated above, it is also preferred that the power steering system 10 of the present invention be a system which employs the energy regeneration principles of the system shown in co-pending Provisional Application Ser. No. '560. For brevity, the details of the disclosure of that provisional application will not be repeated here. By way of summary, however, such a system is alternatively operable in an unassisted straight steering mode, a powered assist mode in which a powered assist to steering is provided by the power cylinder 18 during entry of the host vehicle into a turn, and an energy regeneration mode which recovers energy while the vehicle exits a turn.

Reference to the Provisional Application Ser. No. '560 should be made for further details about regenerative systems in general. One major difference between the system 10 of the present invention and the system shown in Provisional Application Ser. No. '560, however, is that the present system 10 does not employ differences between the actual and ideal pressure-effort curves to switch the system 10 among the straight steering, powered assist and energy regeneration modes. The system shown in Provisional Application Ser. No. '560 required such switching because it was desirable that the electric motor (26) disclosed in it was not driven in a reverse direction. In the system 10 of the present invention, in contrast, the electric motor 26 is in fact reversible; this eliminates the need for any controls for switching between modes and eliminates the need for any calculation of pressure-effort curves or ratios. Instead, by allowing the electric motor 26 to be driven in either of two directions, the regeneration of energy upon recovery from a vehicle turn is automatic. This is an appreciable improvement over the system shown in Provisional Application Ser. No. '560.

The power steering system 10 of the present invention is thus preferably a regenerative system, operable in the three modes indicated above, such that the electronic control means 32 controls the electric motor 26 so as to provide a flow of pressurized fluid from one the first and second ports 78 and 80 of the fluid pump 24 during the powered assist mode of the system 10, and so as to permit the electric motor 26 to generate energy recovered through the fluid pump 24 from a reversed flow of pressurized fluid during the energy regeneration mode of the system 10. (As indicated above, this regeneration occurs automatically in the preferred embodiment of the system 10 as described in detail herein.) Preferably, the fluid pump 24 and the electric motor 26 do not rotate during the straight steering mode of the system 10.

When configured as a regenerative system, the system 10 preferably further comprises an electrical energy means 82 for storing and delivering electrical power, such that electrical energy is delivered from the electrical energy means 82 to the electric motor during the powered assist mode of the system 10, and is stored to the electrical energy means 82 by the electric motor 26 during the energy regeneration mode of the system 10. The electrical energy means 82 most conveniently comprises a conventional alternator (not shown) and storage battery.

Figure 4:
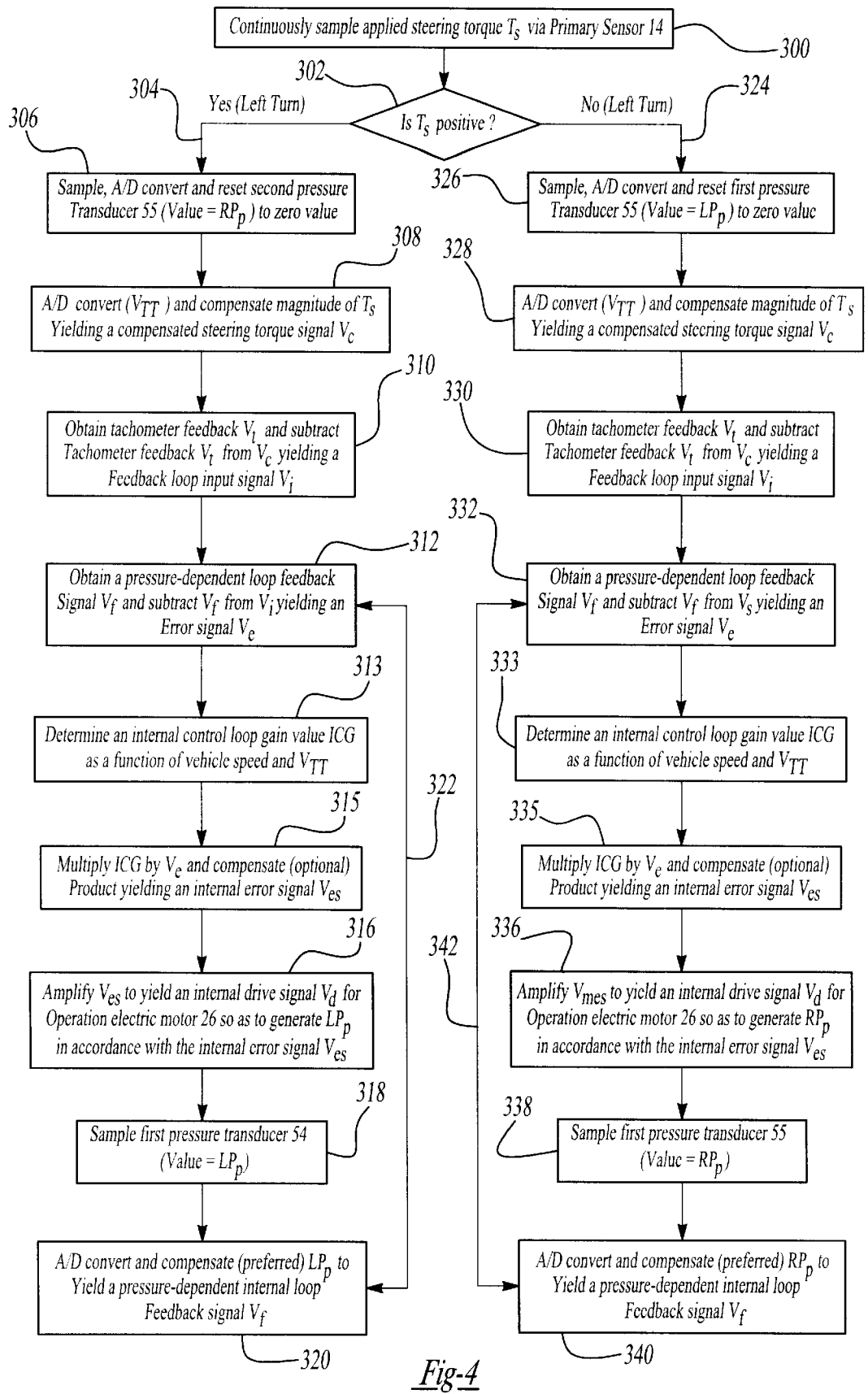
FIG. 4 is a flow chart of the control applied by a portion of the preferred embodiment of the present invention during operation.

A better understanding of the details of the feedback and servo control provided in the system 10 of the present invention may be had with reference to the flow chart shown in FIG. 4. Such feedback and servo control is provided in the path between the application of an applied steering torque $T_s$ to the steering wheel 12 and the powered assist to steering provided by the power cylinder 18, that is, between the applied steering torque $T_s$ and the steering force assist provided to the dirigible wheels 13 by the power cylinder 18. More particularly, the electronic control means 32 employs the fluid pressures $LP_p$ and $RP_p$ measured by the first and second pressure transducers 54 and 55 to establish an internal servo control loop, such as an internal servo control loop 322 for a left turn or 342 for a right turn, over the electric motor 26. This is achieved by establishing such an internal servo control loop 322 or 342 between an input signal $V_i$ derived from the application of the steering torque $T_s$ to the steering wheel 12, and the steering force assist to the dirigible wheels 13. In this manner, the electronic control means 32 can achieve a substantially linear relationship between the applied steering torque $T_s$ and the powered assist to steering supplied by the power cylinder 18.

More particularly, in establishing such feedback and servo control, the applied steering torque $T_s$ is continuously sampled by the primary applied steering torque sensor 14 at block 300 of the flow chart shown in FIG. 4. The generation of a left fluid pressure $LP_p$ at block 316 or a right pressure $RP_p$ at block 336 results in the supply of a pressurized fluid to the left or right port 56 or 58 of the power cylinder 18, respectively, resulting in a powered assist to steering the dirigible wheels 13 of the host vehicle.

The flow chart shows the significant steps performed by the system 10 of the present invention between the application of the steering torque $T_s$ and the powered assist to steering. At block 302, the electronic control means 32 decides whether the applied steering torque $T_s$ is positive or negative, a positive torque $T_s$ indicating a left turn 304, and a negative torque $T_s$ indicating a right turn 324. As shown at block 306 or 326, the electronic control means 32 samples and A/D (analog-to-digital) converts the signal of pressure $RP_p$ or $LP_p$ provided by the opposite pressure transducer 55 or 54.

In a key feature of the system 10, the electronic control means 32 then adaptively calibrates this opposite pressure transducer 55 or 54 by assigning a zero value to the pressure value $RP_p$ or $LP_p$ it measures. More particularly, when the fluid pressure $LP_p$ or $RP_p$ measured by one of the first and second pressure transducers 54 or 55 is greater than the fluid pressure $RP_p$ or $LP_p$ measured by the other transducer 55 or 54, and when that fluid pressure $LP_p$ or $RP_p$ measured by that one transducer 54 or 55 exceeds a predetermined threshold value (as will always be the case during execution of turns by a host vehicle incorporating the system 10), the electronic control means 32 calibrates the other transducer 55 or 54 and assigns a zero value to an internal signal representative of the fluid pressure $RP_p$ or $LP_p$ measured by that other transducer 55 or 54.

This adaptive calibration is highly advantageous in that it avoids a practical problem which might otherwise arise from the use of commonly available pressure transducers. In particular, many available pressure transducers generate a voltage at zero pressure which may be subject to a drift error offset from its nominal zero point (i.e., +0.5 v) by up to about 50 mV or so.

The adaptive calibration employed in the system 10 of the present invention provides calibration of either of the pressure transducers 54 or 55 by holding, in a subtractive register, the A/D converted output signal therefrom when the other of the transducers 55 or 54 generates a voltage above an arbitrary threshold value indicating the presence of an appreciable fluid pressure. The digital value so held is then subtracted from sequentially A/D converted output signals from that one of the pressure transducers 54 or 55 (thus yielding a zero signal for a zero pressure) until the process is repeated during its next calibration. It should be noted that the resetting of $RP_p$ or $LP_p$ shown in blocks 306 and 326 can be performed any time it is known that the other of LP or RP has an appreciable value, not merely at the location of blocks 306 and 326 in FIG. 4.

The electronic control means 32 also A/D converts the applied steering torque $T_s$ (that is, a torque signal $V_{TT}$ from the primarily applied steering torque transducer 14) and provides a compensation of the magnitude of the applied steering torque $T_s$ (that is, a compensation of the signal $V_{TT}$) at block 308 or 328, yielding a compensated steering torque signal $V_c$. The specific nature and purpose of this compensation is described in more detail below.

Next, at block 310 or 330, the electronic control means 32 obtains feedback information regarding the actuation speed of the system 10 and modifies the compensated steering torque signal $V_c$ in dependence upon that feedback information. As described below, the purpose of the feedback information is to provide tactile damping of the system 10 as controlled by the driver.

To this end, the power steering system 10 of the present invention further comprises a means 33 (FIGS. 1, 2 and 3) for measuring an actuation speed of the system 10. The actuation speed measuring means 33 preferably measures a quantity corresponding to the steering movement of the dirigible wheels 13. The actuation speed measuring means 33 can thus comprise a tachometer 62 operatively connected to the electronic control means 32 for measuring at least one of the rotational speed of the electric motor 26 and the rotational speed of the vehicle steering wheel 12. The drawings show the tachometer 62 positioned for measuring the first of these; a second tachometer (not specifically shown) for measuring the second can also be provided. Alternatively, since (as indicated above) the electric motor 26 is preferably an induction motor under vector control, such tachometer information is required for the vector control itself, and preferably, the actuation speed measuring means 33 derives the tachometer information for the electric motor 26 from the voltage and current inputs into it. (Such means for deriving tachometer information from an induction motor are clearly beyond the scope of the instant application, but are believed herein to be well known in that art.) In addition, the tachometer 62 or other source of tachometer information can also be used to provide a redundant signal, which permits monitoring of system safety (but not direct system control) in a similar manner to that permitted by the redundant applied steering torque sensor 15 and the third pressure transducer 113.

Without regard to its source, the tachometer information is provided to the electronic control means 32 at block 310 or 330 of the flow chart shown in FIG. 4 as a tachometer feedback signal $V_t$. The electronic control means 32 then subtracts this tachometer feedback signal $V_t$ from the compensated steering torque signal $V_c$ to yield an input signal $V_i$ for the internal feedback loop 322 or 342. The internal feedback loop 322 or 342 starts at block 312 or 332, respectively, at which the electronic control means 32 obtains a pressure-dependent internal loop feedback signal $V_f$ which is generated later in the loop 322 or 342. Also at block 312 or 332, the electronic control means 32 subtracts this pressure-dependent loop feedback signal $V_f$ from the input signal $V_i$ to yield an error signal $V_e$. The electronic control means 32 then determines an internal control loop gain value ICG (block 313 or 333). The gain value ICG is a function of at least the speed of the host vehicle and the steering torque signal $V_{TT}$ (in a manner to be explained below), and can be obtained from a look-up table or can be made as a real-time calculation according to algorithms presented below. (The electronic control means 32 could, of course, use a series of pressure-effort curves stored in look-up tables for the direct calculation of a desired or target pressure $LP_p$ or $RP_p$, constituting the fourth aspect of the invention mentioned above, but it is believed that this is a less than satisfactory way to implement the principles of the present invention.)

Once the internal control loop gain value ICG is determined, the electronic control means 32 operates the electric motor 26 so as to generate a measured fluid pressure $LP_p$ or $RP_p$ at the appropriate one of the first and second pressure transducers 54 or 55 in accordance with the product of the error signal $V_e$ and the gain value ICG. More particularly, the electronic control means 32 multiplies the gain value ICG by the error signal $V_e$ to yield an internal error signal $V_{es}$ (block 315 or 335). The electronic control means 32 then amplifies the internal error signal $V_{es}$ to yield an internal drive signal $V_d$ for operating the electric motor 26 (block 316 or 336).

As indicated above, such compensated operation of the electric motor 26 drives the fluid pump 24 and results in the supply of a pressurized fluid (at a pressure $LP_p$ or $RP_p$) to the appropriate left or right port 56 or 58 of the power cylinder 18, and a consequent assist to vehicle steering. The electronic control means 32, however, also samples at block 318 or 338, the resulting actual pressure $LP_p$ or $RP_p$, respectively. At block 320 or 340, the electronic control means 32 then AID converts and compensates the resulting pressure $LP_p$ or $RP_p$, respectively, yielding the pressure-dependent internal loop feedback signal $V_f$ mentioned above. (Such compensation is usually performed at this point, but instead, alternate compensation at block 315 or 335 could be utilized.) The pressure-dependent internal loop feedback signal $V_f$ is then fed back via loop 322 or 342 to block 312 or 332, respectively, enabling block 312 or 332 to yield the error signal $V_e$ by subtraction of the feedback signal $V_f$ from the input signal $V_i$ to the internal closed servo control loop 322 or 342, from which the internal drive signal $V_d$ is derived.

As further indicated above, the tachometer feedback information used by the electronic control means in block 310 or 330 for tactile system damping can be obtained in any of several ways. For example, as mentioned before, the electric motor 26 is preferably an induction motor under vector control whereby such tachometer feedback information is required in order to implement the vector control. For both that purpose and its utilization in block 310 or 330, again as mentioned before, the tachometer feedback information can most economically be derived from the voltage and current inputs into the electric motor 26. Alternately, however, the actuation speed measuring means 33, such as the tachometer 62 measuring the rotational speed of the electric motor 26 (or, alternatively, of the steering wheel 12) generates a tachometer feedback signal $V_t$ equal to $q_m$ s/$K_c$ representative of the rotational speed of the electric motor 26 (or, alternatively, of the steering wheel 12), in which $q_m$ is the rotational position of the electric motor 26 (or steering wheel 12), while $K_c$ is a tachometer feedback damping factor, and s is the first-order Laplace variable. The electronic control means 32 subtracts $q_m$ s/$K_c$ (that is, $V_t$) from the compensated signal $V_c$ generated by the primary applied steering torque sensor 14 and the electronic control means 32 and employs the resulting difference as the input signal $V_i$ to the internal closed servo control loop 322 or 342.

The steps outlined in the flow chart shown in FIG. 4 enable the electronic control means 32 to achieve a substantially linear relationship between the applied steering torque $T_s$ and the powered assist to vehicle steering supplied by the system 10, and in particular, by the power cylinder 18. It should also be noted, however, that the system 10 also generates the torque signal $V_{TT}$ in response to inputs at the dirigible wheels 13 of the host vehicle, for example, from jostling from chuckholes or the like. These perturbations could be considered as inputs (not shown) to the flow chart of FIG. 4 at blocks 316 or 336, and as outputs at block 300. As explained in detail below with regard to the block diagram shown in FIGS. 5A–5C, such perturbations are handled well by the system 10 of the present invention.

The primary principle of the present invention, employing pressure or a pressure-dependent error signal for establishing servo control over the drive motor of a power steering system, is decidedly different from and is, because of the adaptive calibration described above, decidedly more accurate and therefore superior to the prior use of the torque output of prior drive motors to measure or estimate actual assistive torque. As described in more detail below, and without regard to where system resonances are believed to arise, the use of pressure or a pressure-dependent error signal for closed loop feedback control decouples operation of the power steering system 10 from the moment of inertia of the motor itself, which, because of the accuracy problem mentioned above, is problematic when motor torque information is used as a primary control.

This principle allows the power steering system 10 of the present invention to counteract a specific resonance present in host vehicles whose existence appears not to have been previously dealt with in the automotive industry: a hydromechanical resonance occurring predominantly between the moment of inertia $J_m$ of the drive motor of a power steering system on the host vehicle (here, the electric motor 26) and a system spring rate presented by the steering load stiffness presented to the power steering system by the host vehicle. The electronic control means 32 employs the fluid pressures $LP_p$ and $RP_p$ measured by the first and second pressure transducers 54 and 55 to counteract this resonance.

More particularly, the electronic control means 32 treats the hydromechanical resonance as a resonance between a mass element predominated by the moment of inertia of the electric motor 26 and a theoretical spring element dominated by tire loading characteristics associated with the tires 21. The electronic control means 32 employs the fluid pressures $LP_p$ and $RP_p$ measured by the first and second pressure transducers 54 and 55 to control the electric motor 26 so that the fluid pump 24 is not driven in harmony with the hydromechanical resonance. The dominant tire characteristics are determined by the tire side walls 23 of the tires 21 of the dirigible wheels 13, and by the tire patches 19 where the tires 21 contact the surface on which the host vehicle is located. At moderate to high vehicle speed, the dominant tire characteristics can be considered as arising from the product of the front end centrifugal force of the host vehicle and the effective caster offset of the dirigible wheels 13.

Also in general, the various compensations mentioned above are intended to counteract other specific resonances which are believed to exist in the host vehicle and which affect steering. The compensations mentioned above and described in more detail below are believed to be dependent upon the specific structural characteristics of the steering gear, chassis, suspension and dirigible wheels of the particular host vehicle on which the system 10 of the present invention is employed. The effect of particular compensation constants can be effectively modeled by a variety of readily available computer programs. While some amount of modeling or experimentation with compensation will be required in order to meet any particular or perceived system resonance, the amount of such modeling or experimentation is believed not to be undue, but is instead believed to be the routine implementation of engineering skills once a person skilled in the art has assimilated the teachings comprised within the description of the block diagram shown in FIGS. 5A–C and has assigned values to all of the above-described structural characteristics of the host vehicle.

Figure 5A:
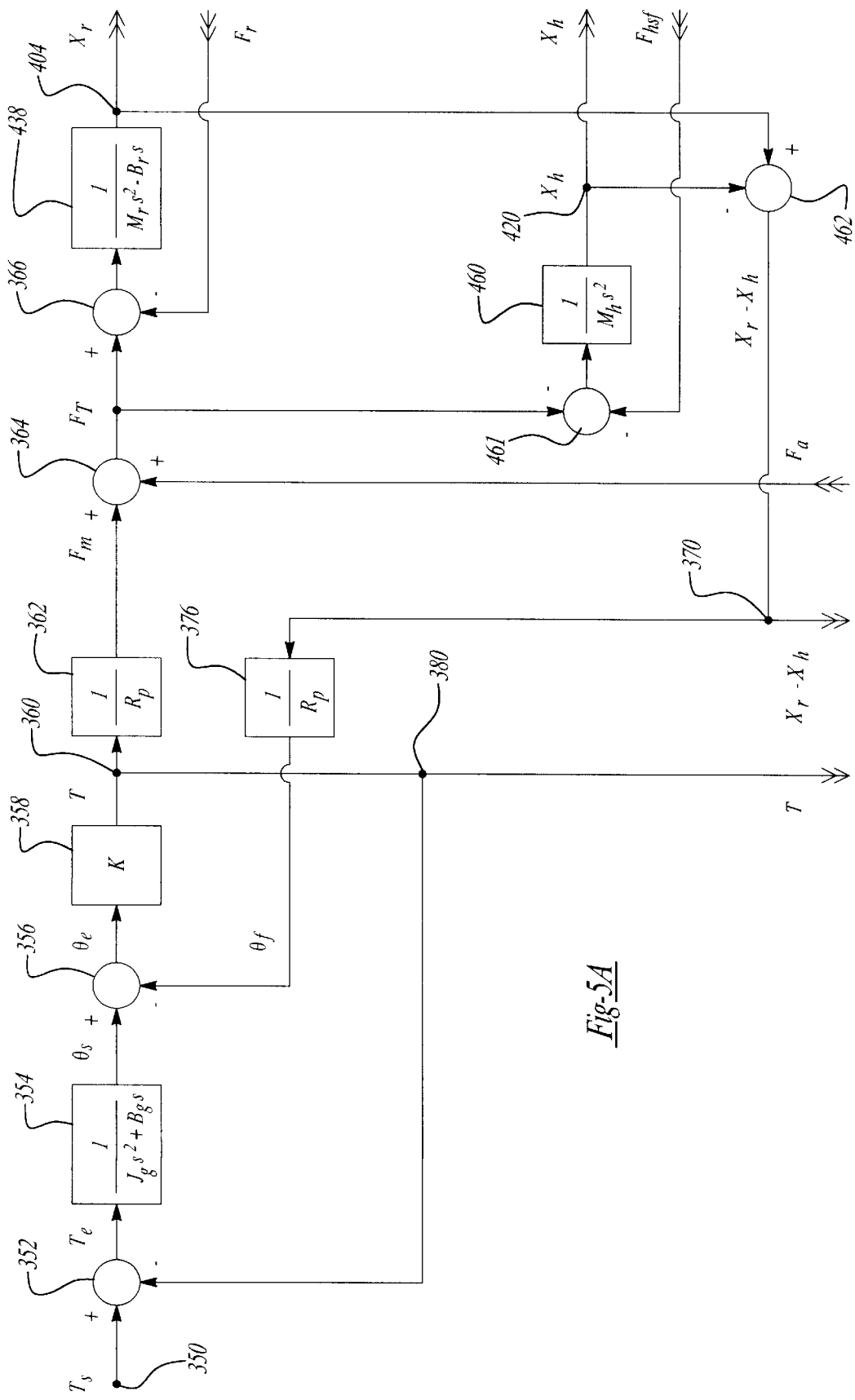
FIGS. 5A–5C constitute a single block diagram representing various mechanical, hydraulic, electrical and electronic connections and relationships existing in a host vehicle which includes in it the preferred embodiment of the present invention.
Figure 5B:
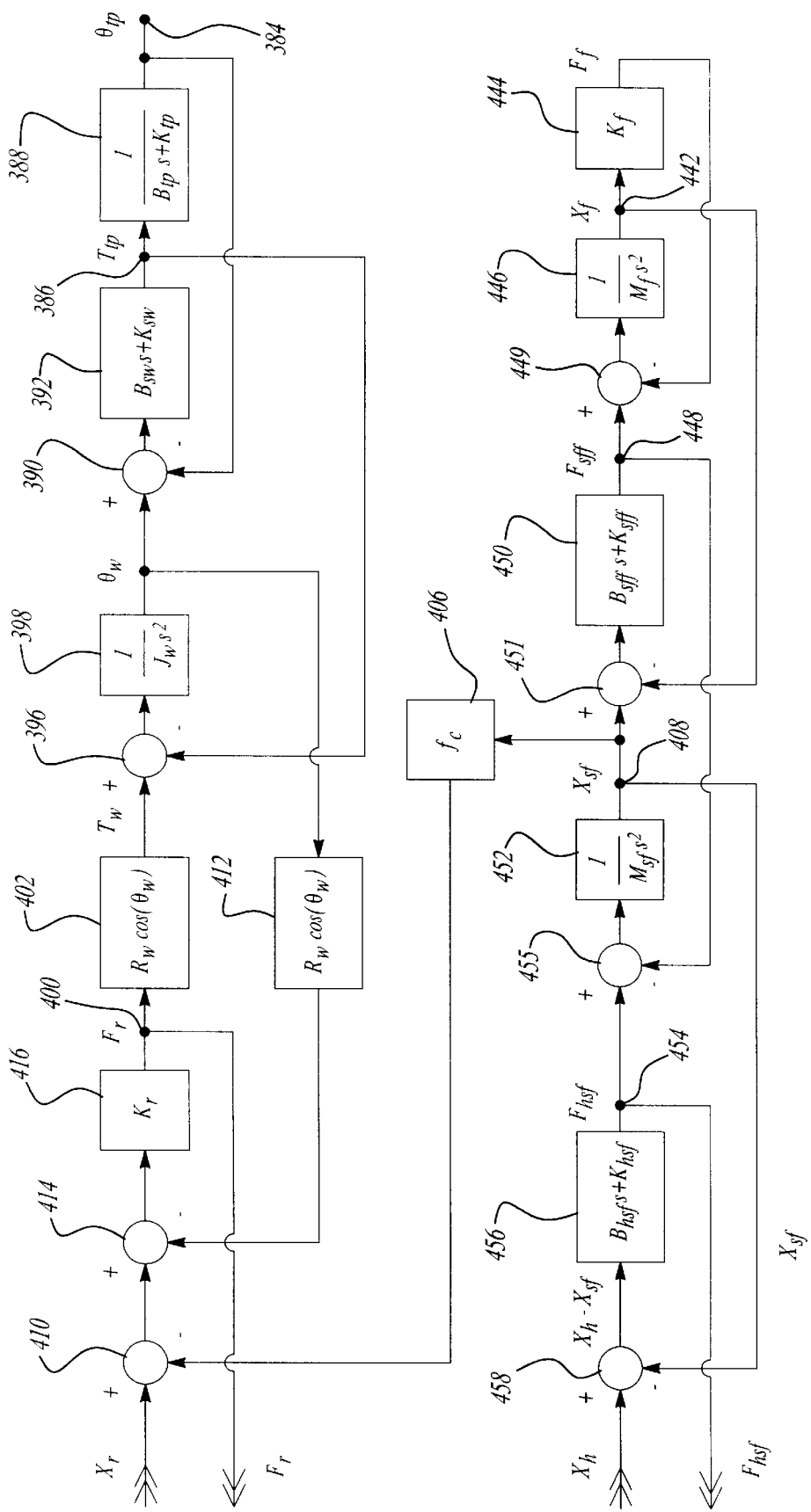
Figure 5C:
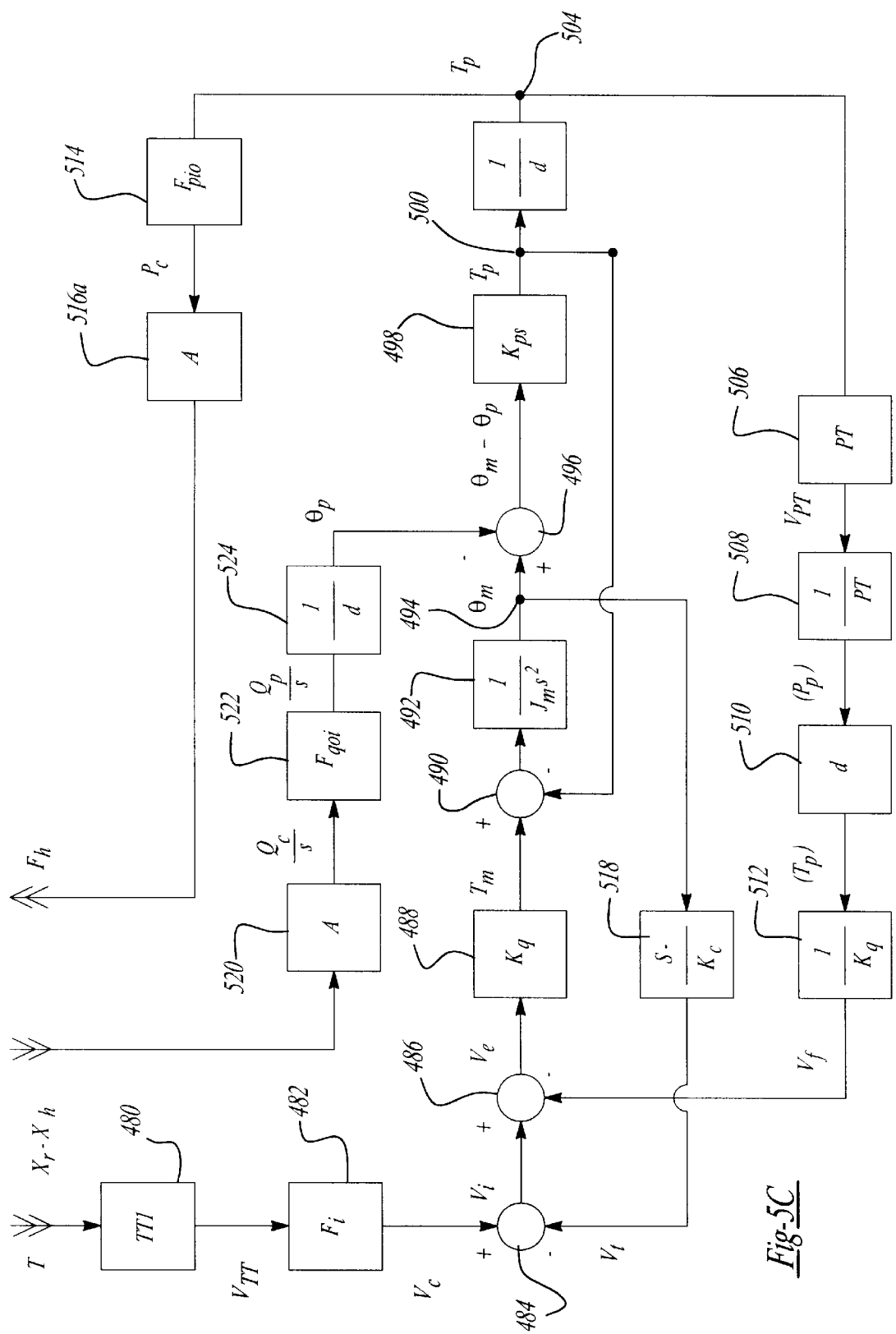

FIGS. 5A–C constitute a single block diagram depicting various mechanical, hydraulic, electrical and electronic connections and relationships existing in a host vehicle which control the dynamic linkage between the actual torque $T_s$ applied by a vehicle operator to the steering wheel 12, and the output tire patch steering angle $q_{tp}$. (This block diagram is comparable to the block diagram 80 disclosed in FIG. 3 of the Phillips '715 patent.) Such a block diagram is useful in that it allows an assessment of the response of any represented system to a perturbation arising anywhere between the system input (here, the steering torque $T_s$) and the tire patches 19 (including jostling of the dirigible wheels 13 by rough pavement, chuckholes or the like). The arrangement of the power steering system 10 according to the present invention isolates the moment of inertia $J_m$ of the electric motor 26 in the internal servo control loop 322 or 342 from the pinion-rack interface, and thus from the steering wheel and the driver of the host vehicle.

The block diagram includes a terminal 350 (FIG. 5A) at which the actual torque $T_s$ applied to the steering wheel 12 by the vehicle operator serves as an input to the block diagram. The block diagram also includes a terminal 384 providing an output corresponding to the output tire patch steering angle qtp.

The designation of terminals 350 and 384 as being respectively associated with an input and an output of the block diagrams is arbitrary, however, since the block diagrams also provide for an analysis of a perturbing force applied to the terminal 384 (for example, from jostling of the dirigible wheels 13 from road roughness or the like) and experienced by the driver at terminal 350. Therefore, while the block diagram of FIGS. 5A–5C will be described in a forward direction from the input terminal 350 to the output terminal 384 (a direction associated with actually steering the vehicle), concomitant relationships in the opposite direction should be assumed to be present. A description of such opposite, concomitant relationships is omitted herein for the sake of brevity.

With particular reference to the portion of the block diagram shown in FIG. 5A, the applied steering torque T measured by the primary applied steering torque sensor 14 is subtracted from $T_s$ at a summing point 352. The algebraic sum ($T_s$–T) is then divided by (or, rather, multiplied by the reciprocal of) the sum of the moment of inertia term $J_s s^2$ of the steering wheel 12 and the front end damping term $B_s$ s at block 354. The block 354 yields a steering wheel angle $q_s$ which serves as the positive input to a summing point 356. The negative input to the summing point 356 is a pinion feedback angle $q_f$ derived in part from the linear motion $X_r$ of the rack 17 at a terminal 370 described below. The summing point 356 yields an error angle $q_e$ equal to ($q_s$–$q_u$), which when multiplied by the stiffness K (block 358) of the whole steering column connecting the steering wheel 12 to the pinion (not shown) gives the applied steering torque T (at terminal 360) which is present anywhere along the steering shaft 172 or is present at the pinion itself. K can be considered as a series gain element in this regard. T is fed back at terminal 380 for subtraction from $T_s$ at the summing point 352 in the manner described above. T is also supplied from terminal 380 to the portion of the block diagram shown in FIG. 5C, for a purpose described in more detail below. Division of T at block 362 by the radius $R_p$ of the pinion (or, rather, multiplication by its reciprocal) gives the mechanical force $F_m$ applied to the rack 17 via the pinion (not shown).

The total steering force $F_T$ applied to the rack 17 is generated at summing point 364 and is the sum of the mechanical force $F_m$ applied to the rack 17 via the pinion and a hydraulic force $F_h$ provided by the hydraulic assist of the particular system modeled by the block diagram. The hydraulic force $F_h$ is derived from the applied steering torque T (again, supplied from terminal 380 to the portion of the block diagram shown in FIG. 5C) in a manner described in more detail below. The hydraulic force $F_h$ is summed with the mechanical force $F_m$ at summing point 364 to yield the total force $F_T$ in the manner indicated above.

The sum of the forces applied to the effective steering linkage radius, $F_r$, is derived at terminal 400 (FIG. 5B) and is subtracted from the total force $F_T$ at a summing point 366. The resulting algebraic sum ($F_T$–$F_r$) from the summing point 366 is divided by (or, rather, multiplied by the reciprocal of) a term $M_r S^2 + B_r s$ at block 438, where $M_r$ relates to the mass of the rack 17 and $B_r$ is a parallel damping coefficient term associated with motion of the rack 17. The resulting product is the longitudinal movement $X_r$ of the rack 17 and is available at terminal 404 for two purposes. $X_r$ is supplied from terminal 404 to a summing point 410 (FIG. 5B) for a purpose described in more detail below. $X_r$ also serves as the positive input to a summing point 462, from which the lateral motion $X_h$ of the steering gear housing 66 is subtracted. The algebraic sum ($X_r$–$X_h$) taken at terminal 370 is divided by (that is, multiplied by the reciprocal of) the pinion radius $R_p$ at block 376 to yield the rotational feedback angle $q_f$, which serves as the negative input to the summing point 356 as described above. The algebraic sum ($X_r$–$X_h$) also relates to an angle $q_p$ associated with rotation of the fluid pump 24, which is described in more detail below with respect to FIG. 5C.

The lateral motion $X_h$ of the steering gear housing 66 depends upon FT. More particularly, $F_T$ is a negative input to a summing point 461, from which a force $F_{hsf}$ applied to the sub-frame as a housing-to-sub-frame force is subtracted. (The force $F_{hsf}$ is derived from terminal 454 (FIG. 5B) in a manner described in more detail below.) The lateral housing motion $X_h$ is then determined by the product of the algebraic sum $(-F_T-F_{hsf})$ and a control element $1/(M_h s^2)$ at block 460, where $M_h$ is the mass of the housing of the power cylinder 18. $X_h$ is taken from terminal 420 as the negative input to summing point 462 to yield the algebraic sum $(X_r-X_h)$ in the manner described above.

With reference then to that portion of the block diagram shown in FIG. 5B, the output tire patch steering angle $q_{tp}$ at terminal 384 is determined by the sum of torques $T_{tp}$ applied to the tire patches 19 (located at terminal 386) multiplied by a control element $1/(B_{tp}s+K_{tp})$ shown at block 388, where $K_{tp}$ and $B_{tp}$ are exemplary tire patch torsional stiffness and damping coefficient terms, respectively, determined in a manner explained in more detail below, and s is the first-order Laplace variable. The sum of tire patch torques $T_{tp}$ at terminal 386 is determined by the difference, achieved via summing point 390, between the average dirigible wheel angle $q_w$ and the average output tire patch angle $q_{tp}$ multiplied by a control element $(B_{sw}s+K_{sw})$ shown at block 392, where $K_{sw}$ and $B_{sw}$ are torsional stiffness and torsional damping coefficients, respectively, associated with torsional deflection of the tire side walls 23 with respect to the dirigible wheels 13. $q_w$ is determined by the difference (achieved via summing point 396) between the sum of the torques $T_w$ applied to the dirigible wheels and the sum of tire patch torques $T_{tp}$, multiplied by a control element $1/(J_w s^2)$ (where $J_w$ is moment of inertia of the dirigible wheels) shown at block 398.

The sum of the torques $T_w$ applied to the dirigible wheels is determined by the sum of the forces $F_r$ applied at the effective steering linkage radius (located at a terminal 400) multiplied by a control element $R_w \cos(q_w)$ (where $R_w$ is the effective steering linkage radius of the steering knuckles) shown at block 402. The sum of forces $F_r$ is determined in three steps. First, a difference is achieved via summing point 410 between $X_r$ taken from terminal 404 (FIG. 5A) and $(f_c X_{sf})$, the latter being obtained by multiplying (at block 406) the lateral motion $X_{sf}$ of the sub-frame at terminal 408 by a coupling factor f, between the sub-frame of the system 10 and the dirigible wheels 13. Second, the product $q_w R_w \cos(q_w)$ (obtained by multiplication at block 412) is subtracted from the algebraic sum $(X_r-f_C X_{sf})$ at summing point 414. Finally, this difference $(X_r-f_c X_{sf})-(q_w R_w \cos(q_w))$ is multiplied by a control element $K_r$ shown at block 416 to yield the sum of rack forces $F_r$, where $K_r$ is the stiffness of the connecting elements between the rack 17 and the dirigible wheels 13. $F_r$ is then returned to summing point 366 and the subsequent derivation of $X_r$ at terminal 404 in the manner described above with respect to FIG. 5A.

The balance of the portion of the block diagram shown in FIG. 5B models the structural elements disposed in the path of reaction forces applied to the cylinder housing of the power cylinder 18, and provides the lateral motion $X_{sf}$ of the sub-frame (terminal 408) and the sub-frame force $F_h S_f$ (terminal 454) mentioned above. Ultimately, these reaction forces are applied to a substantially "stationary" portion of the host vehicle's frame as a frame reaction force $F_f$ derived from block 444. More particularly, $F_f$ is determined by the product of the displacement $X_f$ of a "mobile" portion of the host vehicle's frame (located at terminal 442) and a control element $K_f$ (where $K_f$ is a stiffness factor separating "mobile" and "stationary" portions of the host vehicle's frame) shown at block 444. $X_f$ is determined by the product of a control element $1/(M_f s^2)$ (shown at block 446) and an algebraic sum $(F_{sff}-F_f)$ generated by summing point 449, where $M_f$ is mass of the "mobile" portion of the host vehicle's frame, and $F_{sff}$ is the force applied to the "mobile" portion of the host vehicle's frame as sub-frame to frame force, located at terminal 448. $F_{sff}$ is determined by the product of a control element $(B_{sff}s+K_{sff})$ shown at block 450 and an algebraic sum $(X_{sf}-X_f)$ generated by summing point 451, where $K_{sff}$ and $B_{sff}$ are stiffness and series damping coefficient terms, respectively, associated with the interface between the sub-frame and "mobile" portion of the host vehicle's frame. Xsf at terminal 408 is determined by the product of control element $1/(M_{sf} s^2)$ shown at block 452, where $M_{sf}$ is the mass of the sub-frame, and an algebraic sum $(F_{hsf}-F_{sff})$ generated by summing point 455, where $F_{hsf}$ is a force applied to the sub-frame as a housing-to-sub-frame force located at terminal 454. $F_{hsf}$ is determined by the product of a control element $(B_{hsf}s+K_{hsf})$ (where $K_{hsf}$ and $B_{hsf}$ are stiffness and series damping coefficient terms, respectively, associated with the interface between the power cylinder housing and the sub-frame), shown at block 456, and an algebraic sum $(X_h-X_{sf})$ generated by summing point 458. The positive input to summing point 458, $X_h$, is taken from terminal 420 in FIG. 5A, while the negative input, $X_{sf}$, is taken from terminal 408 in FIG. 5B.

With reference now to that portion of the block diagram shown in FIG. 5C, FIG. 5C completes the block diagram and models the internal servo control loop established by the electronic control means 32, motor 26, fluid pump 24, and pressure sensors 54 and 55. The input $V_i$ to the loop is the positive input to a summing point 486 and is derived in part from the applied steering torque T at terminal 380, less tachometer feedback information such as a subtracted tachometer feedback voltage $V_t$. The output from the loop is a port pressure $P_p$ at terminal 504, equivalent to the left or right fluid pressure $LP_p$ or $RP_p$ sensed by the appropriate one of the pressure sensors 54 and 55, and which yields the hydraulically derived force $F_h$ summed with the mechanically derived force $F_m$ at summing point 364 in the manner disclosed above.

More particularly, the steering torque T at terminal 380 is converted at block 480 by the primary applied steering torque sensor 14 to a torque sensor voltage $V_{TT}$, the sensor conversion constant TT being associated with the sensor 14 and having suitable units such as volts/in.-lb. The torque sensor voltage $V_{TT}$ is multiplied by suitable compensation $f_i$ at block 482 to yield a compensated voltage $V_c$. $V_c$ serves as a positive input to a summing point 484; the negative input to summing point 484 is the tachometer feedback voltage $V_t$, derived in a manner described in more detail below, in conjunction with FIG. 13.

The input voltage $V_i$ to the servo control loop is thus the algebraic sum $(V_c-V_t)$ from summing point 484.

At the summing point 486, a pressure-dependent feedback voltage $V_f$ is subtracted from $V_i$ to yield an error signal voltage $V_e$, $V_f$ being derived in a manner described in more detail below. $V_e$ multiplied by a gain factor $K_q$ in block 488 provides the actual air gap motor torque $T_m$ of the electric motor 26. The gain factor $K_q$ in block 488 is the product of many factors, including the internal control gain value ICG, any compensation, amplification (to drive the electric motor 26) and the torque constant of the electric motor 26.

The actual pump torque $T_p$ of the fluid pump 24, obtained at terminal 500 in a manner described in more detail below, is subtracted from $T_m$ at a summing point 490 to give an algebraic sum $(T_m-T_p)$ representing net torque for accelerating $J_m$, the moment of inertia of the electric motor 26. A motor angle $q_m$ at terminal 494, associated with the rotor (not shown) of the electric motor 26, is the product of the net torque $(T_m-T_p)$ and an inertia term $1/(J_m S^2)$ shown in block 492. The motor angle provides tachometer feedback by being multiplied by a damping factor $s/K_c$ in block 518 (comprising differentiation with respect to time and division by the term $K_c$ described in more detail below in connection with FIG. 13) to yield the tachometer feedback voltage $V_t$ supplied as the negative input to the summing point 484.

The motor angle $q_m$ serves as the positive input to a summing point 496.

The negative input to the summing point 496 is a pump rotation angle qp derived from the algebraic sum $(X_r-X_h)$ at terminal 370. More particularly, the product of the algebraic sum $(X_r-X_h)$ and an area A (associated with the power cylinder 18) identified in block 520 yields the integral with respect to time, $Q_c/s$, of a flow quantity $Q_c$ flowing from the power cylinder 18 to the fluid pump 24. ($Q_c/s$ is a volumetric measure because the reciprocal of the first-order Laplace variable s denotes integration with respect to time while multiplication by s denotes differentiation with respect to time.) The product of $Q_c/s$ and a transfer function $f_{qoi}$ in block 522 in turn yields the resulting volumetric quantity $Q_p/s$ of fluid at the fluid pump 24. More particularly, $f_{qoi}$ is a transfer function comprising the volumetric compliance of the fluid in the power cylinder 18 and the impedance (primarily inductive) of the fluid line(s) from the power cylinder 18 back to the fluid pump 24. The product of $Q_p/s$ and the reciprocal of the displacement d of the fluid pump 24 (block 524) yields the pump rotation angle $q_p$ to be subtracted from $q_m$ at the summing point 496. The resulting algebraic sum $(q_m-q_p)$ from summing point 496 is multiplied by the stiffness $K_p$, shown at block 498 of the shaft and coupling (not shown) which connect the rotor (not shown) of the electric motor 26 to the fluid pump 24, to yield the pump torque Tp at terminal 500. It may be of interest to note that the feedback loop of $T_p$ from terminal 500 to summing point 490 has infinite gain at dc., as the Laplace variable s goes to zero. This is natural, since it implies that the rotor of the electric motor 26 reaches a terminal speed without further acceleration.

The product of $T_p$ and the reciprocal of the pump displacement d at block 502 yields the pump port pressure $P_p$ at terminal 504. ($P_p$ is, of course, equal to the pressure $LP_p$ or $RP_p$ measured by the appropriate one of the first and second pressure transducers 54 and 55.) The product of $P_p$ and a transfer function $f_{pio}$ in block 514 yields the pressure $P_c$ in the power cylinder 18 itself. The transfer function $f_{pio}$ represents a low-pass filter into the power cylinder 18, and nominally comprises the elements of transfer function $f_{qoi}$ in reverse. The further product of the power cylinder pressure $P_c$ with the area A of the power cylinder 18 (block 516) yields the hydraulic force $F_h$ provided by the power cylinder 18. As indicated above with respect to FIG. 5A, $F_h$ is summed with the mechanical force $F_m$ at the summing point 364 to yield the total steering force $F_T$.

The internal servo control feedback loop in the system 10 of the present invention is established between $V_i$ as the positive input to the summing point 486 and the pump port pressure $P_p$ at terminal 504. Upon sampling by the left or right pressure transducer 54 or 55, the pump port pressure $P_p$ is multiplied by an appropriate conversion factor PT at block 506 to yield a pressure transducer voltage $V_{PT}$. The pressure transducer voltage $V_{PT}$ is then divided by (that is, multiplied by the reciprocal of) the conversion factor PT at block 508, multiplied by the pump displacement d at block 510 and divided by (that is, multiplied by the reciprocal of) $K_q'$ at block 512 to yield the feedback voltage $V_f$ supplied as the negative input to summing point 486.

As explained in more detail below, $K_q'$ has differing value and compensation from the value and any compensation associated with $K_q$ in block 488. The parenthetical indications of $P_p$ after block 508 and $T_p$ after block 510 show the relationships that exist at those locations. Unlike the other parameters identified in the block diagram, however, these parameters should be considered as merely virtual at these locations, because they are not separately calculated by the electronic control means 32, and unlike the other parameters they are not subject to actual measurement at those locations.

The reverse analysis of the block diagrams shown in FIGS. 5A–C from $q_{tp}$ at output terminal 384 to $T_s$ at input terminal 350 will, for brevity, be omitted.

The block diagram of the system 10 of the present invention shown in FIGS. 5A–C can alternatively be reduced to a "canonical form" 222block diagram like that shown in FIG. 4 of the Phillips '715 patent. That figure is expressly incorporated by reference herein; the reference numerals in that figure will be referred to in parentheses. Reduction is carried out via computation of suitable forward and feedback transfer functions G and H, respectively, for each of the powered assist and energy regeneration modes. Such computation can be made, for example, via methods described by DiStefano, Stubberud, and Williams in *Schaum's Outline of Theory and Problems of Feedback and Control Systems*. In block diagram (370), an input signal I (equal in this case to $T_s$), is positively applied to a summing point (372) via an input terminal (374). Closed-loop response of block diagram (370) yields an output signal C (equal in this case to $q_{tp}$) at an output terminal (376). C multiplied by a control element feed-back transfer function H shown at block (378) generates a feedback signal B which is negatively applied to the summing point (372) to generate an error signal E. Finally, the error signal E multiplied by a control element forward transfer function G shown at block (380) generates the output signal C. During the powered assist and energy regeneration modes of the present system 10, the expressions for the forward transfer function G and the feedback function H will be very complex. However, in each case the equation $C/I=q_{tp}/T_s=G/(1+(G\ H))$ determines the dynamic relationship between $q_{tp}$ and $T_s$.

In general, the mass of piston-and-rack assembly, the transmissive character of tie-rod linkage assemblies, the mass of the dirigible wheels 13, the transmissive character of the tire side walls and the tire patches, the mass of housing, the transmissive character of the mounting bracket and bolts, the effective mass of the sub-frame, the effective transmissive character of the interface between the sub-frame and the host vehicle's frame, and the effective mass of the host vehicle's frame are comprised in a very complex sub-system. The dynamics associated with this sub-system heavily influence the stability criteria governing the shudder susceptibility of power steering system 10 of the present invention.

It is desirable for any servo system, as represented by block diagram (370), to operate in a stable manner. This will occur if the open-loop transfer function (G H) attains sufficient values of gain margin wherein its absolute value differs sufficiently from a value of 1.0 whenever its argument attains an angular value equal to an odd multiple of 180∞; and attains sufficient values of phase margin wherein its argument differs sufficiently from a value equal to an odd multiple of 180∞ whenever its absolute value attains a value of 1.0. The stability enjoyed by the system 10 of the present invention is described in more detail below, with regard to FIGS. 10A, 10B, 11A and 11B.

Except for the tire patch torsional stiffness $K_{tp}$, and $K_q$ and $K_q'$ (described in detail below in conjunction with FIGS. 8, 12 and 13), the following values and units for the various constants and variables mentioned above can be considered exemplary for the regenerative power steering system 10 of the present invention, and a conventional host vehicle on which it is employed:

$1/(B_{tp} s + K_{tp}) = 1/(5,000 s + K_{tp})$ rad./in.-lb.
$B_{sw} s + K_{sw} = 30 s + 500,000$ in.-lb.
$1/(J_w s^2) = 1/(5 s^2)$ rad./in.-lb.
$1/(J_s s^2 + B_s s) = 1/(0.5 s^2 + 3.5 s)$ rad./in.-lb.
$R_w = 5$ in/rad.
$1/(M_r s^2 + B_r s) = 1/(0.02 s^2 + 3 s)$ in./lb.
$1/R_p = 1/0.315$ in.$^{-1}$
$K = 800$ in.-lb.
$f_c = 0.8$ (dimensionless)
$A = 1.511$ in.$^2$
$1/(M_h s^2) = 1/(0.02 s^2)$ in./lb.
$B_{hsf} s + K_{hsf} = 5.0 s + 150,000$ lb/in.
$1/(M_{sf} s^2) = 1/(0.5 s^2)$ in./lb.
$B_{sff} s + K_{sff} = 25.0 s + 60,000$ lb./in.
$1/(M_f s^2) = 1/(0.2 s^2)$ in./lb.
$K_c = 1,000$ rad./volt-sec.
$K_f = 530,000$ lb./in.
$K_{ps} = 19,300$ in.-lb.
$K_t = 125,000$ lb./in.
$TT = 0.025$ volts/in.-lb.
$1/(J_m s) = 1/(0.00523 s)$ in.$^{-1}$-lb.$^{-1}$sec.$^{-1}$
$d = 0.0207$ in.$^3$/rad.
$1/d = 1/0.0207$ rad./in.$^3$
$PT = 0.00267$ volts/psi.
$1/PT = 1/0.00267$ psi./volt
$P_c, P_p = $ lb./in.$^2$
$X_r, X_f, X_h, X_{sf} = $ in.
$F_{hsf}, F_h, F_{sff}, F_f, F_T, F_r, F_m = $ lb.
$T, T_{tp}, T_m, T_e, T_p, T_s, T_w = $ in.-lb.
$q_s, q_{tp}, q_p, q_e, q_w, q_m, q_f = $ rad.
$Q_c, Q_p = $ in.$^3$/sec.
$V_{TT}, V_t, V_f, V_{PT}, V_c, V_e, V_i = $ volts For each of the combination terms mentioned above, the designated units apply to the entire term, and not merely to the last element of the term. Of course, the particular values given above are merely exemplary of the actual values which may be encountered in any particular, real-world steering system and host vehicle, and the particular values given above may be only rough approximations of those actual values. Many of the terms, particularly the compensation terms, are generally determined in an empirical manner.

The transfer functions $f_{pio}$ and $f_{qoi}$ are dimensionless and have the same numerical value, and are defined by the equation:

$$f_{pio} = f_{qoi} = (1+0.0005\ s)/(1+0.0005\ s+0.0000057\ s^2)$$

The compensation term $f_i$ is also dimensionless, and is defined by the following equation, where v is the host vehicle speed in mph:

$$f_i = (1+0.018\ s)\ (1+s/(63\ e^{-v/30}+19)/(1+s/(63\ e^{-v/30}+19)\ (1+0.0023\ s)(1+0.018\ s)$$

And the compensation $1/K_{qc}'$ applied to $1/K_q'$, also dimensionless, is defined by the following equation:

$$1/K_{qc}' = (1+0.055\ s)/(1+s/(15\ e^{-v/35}+0.1\ v+5)(1+0.0032\ s)\ (1+0.0027\ s)$$

Steering shaft damping means which is believed to be suitable for use as the steering shaft damping element $B_s$ in block 354 of that portion of the block diagram shown in FIG. 5A has already been described, for example, in U.S. patent application Ser. No. 08/630,369, entitled "Yoke Apparatus for Rack and Pinion" (E. H. Phillips, filed Apr. 10, 1996); U.S. patent application Ser. No. 09/026,738, entitled "Yoke Apparatus for Rack and Pinion" (E. H. Phillips, filed Feb. 19, 1998); and U.S. Provisional Patent Application Ser. No. 60/070,732, entitled "Yoke Apparatus for Rack and Pinion" (E. H. Phillips and R. Swartzendruber, filed Feb. 3, 1998); all of which being expressly incorporated by reference herein. The yoke apparatus described in any of the above U.S. Patent Applications provides effective on-center damping because frictional forces increase in value as motion of the supported rack begins. As explained in the above U.S. Patent Applications, this occurs because there is a lack of initial relative motion between a bearing disc member of the yoke apparatus and rack followed by progressive relative motion therebetween. This occurs because the bearing disc member is subject to a force couple which causes a contra-pitch rotation whereby it establishes a hydrodynamic bearing wedge for lubricant. Thus, during a rack motion startup mode there is an initial period of zero friction between the bearing disc member and the rack, followed by modestly increasing friction there-between.

The beneficial effects attendant to the absence or presence of a non-zero value for $B_s$ are shown in FIGS. 6A and 6B, and 7A and 7B, respectively. These figures depict overall system Bode plots and closed loop response plots for on center handling at a vehicle speed of 100 mph, wherein B, has the value of 0.0 in.-lb.-sec. in FIGS. 6A and 6B, and has the value of 12 in.-lb.-sec. in FIGS. 7A and 7B. As will be described in greater detail below, $K_q$ and Kq' (i.e., for $T_s$ values between 0 and 15 in.-lbs.) are both suppressed to zero on center. This causes the internal servo control loop to deliver fluid pressure $P_p$ substantially at a zero value in order to suppress the hydraulic force $F_h$ and provide essentially manual steering conditions on center. Even though the internal servo control loop actively tries to suppress any control abnormalities, setting $B_s$ to a zero value results in a lack of damping together with a mild resonance for tactile inputs applied to the steering wheel 12.

Figure 6A:
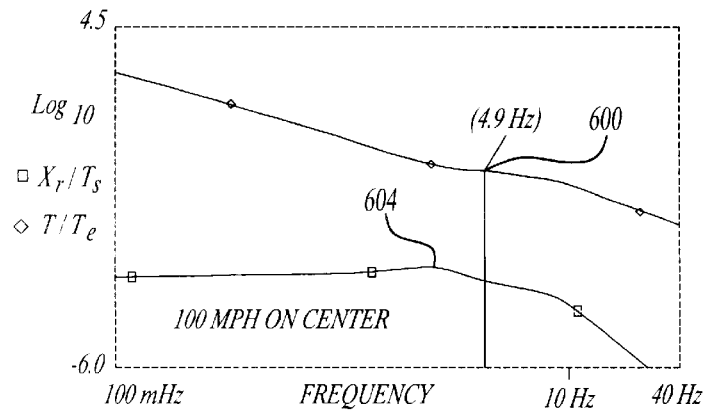
FIGS. 6A, 7A, 10A and 11A are graphic representations of the dependence of the logarithm of the absolute value of the ratios of various parameters at different vehicle speeds.
Figure 6B:
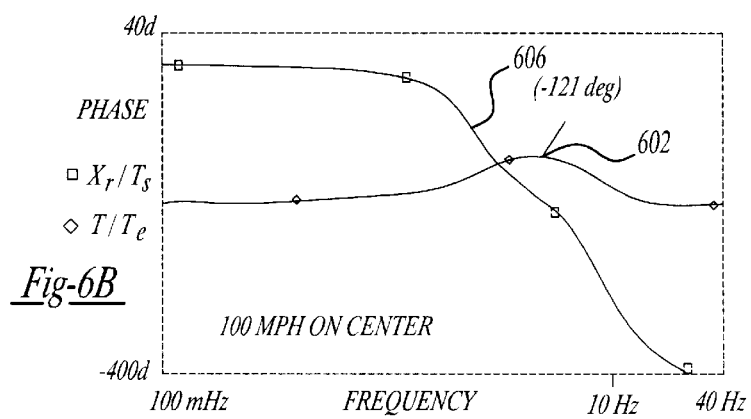
FIGS. 6B, 7B, 10B and 11B are corresponding graphic representations of the phase angle of the absolute value of the parameter ratios shown in FIGS. 6A, 7A, 10A and 11A, respectively.

As shown in FIGS. 6A and 6B, wherein $B_s$ has a value of 0.0 in.-lb.-sec., the open loop gain $T/T_e$ crosses unity at 4.9 Hz with a phase angle of -121 degrees, as indicated by reference numerals 600 and 602, respectively. This results in $X_r/T_s$, the closed loop gain between $T_s$ (the torque applied to the steering wheel) and $X_r$ (the resulting displacement of the rack) having a modest resonance as indicated by reference numeral 604 in FIG. 6A. The amplitude of $X_r/T_s$ increases by a factor of about 2.7 at this resonance. This resonance is also associated with a somewhat abrupt change in phase angle, as indicated by reference numeral 606 in FIG. 6B.

Figure 7A:
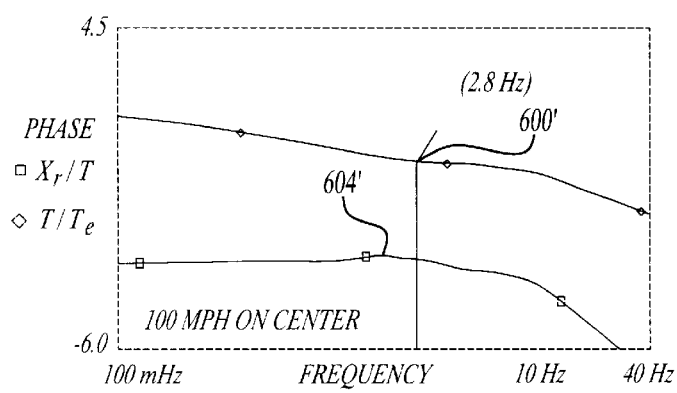
Figure 7B:
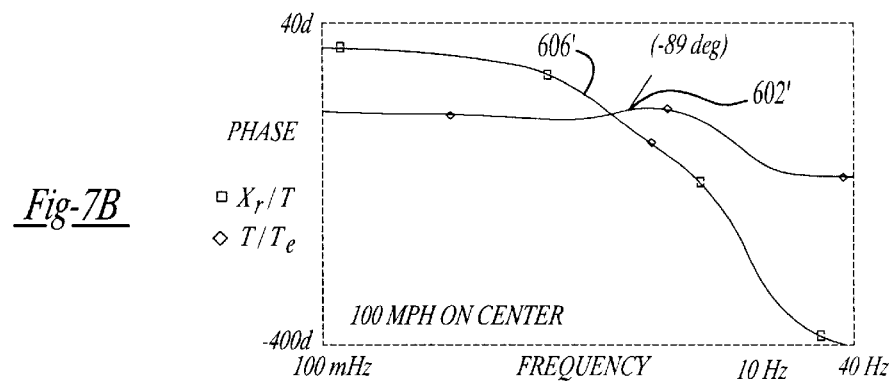

Similar tactile performance curves are presented in FIGS. 7A and 7B, wherein $B_s$ has a value of 12 in.-lb.-sec. and wherein identically numbered reference numerals having primes are utilized to indicate improved tactile performance. The result of providing such damping is a unity gain crossover occurring at 2.8 Hz with a critically damped phase angle of −89∞ and absolutely no resonance at all. In greater detail, the resonance indicated by reference numeral 604 in FIG. 6A is between $J_s$, the moment of inertia of the steering wheel 12, and the reflected spring constant of the system as a whole as observed from the steering wheel 12. Typically in an automotive power steering system, compliance of the tire side walls and tire loading characteristics of the dirigible wheels 13 comprise the most compliant and therefore dominant factors determining the reflected spring constant of the system as a whole. As indicated above, a typical value for the tire side wall stiffness $K_{sw}$, is perhaps 500,000 in.-lb./rad., while tire loading stiffness $K_{tp}$ (in in.-lb./rad.) can be represented by an empirically determined equation as a function of vehicle speed, centrifugal force due to lateral acceleration, and instant tire patch-road interface characteristics.

When the vehicle is stationary, $K_{tp}$ is related to the integrated product of the deflection rate of each tread block of the tire patch and its radial distance from the center of rotation of the tire patch. At high speed it is related to the product of front end centrifugal force and caster offset while at low speeds there is a transition from stationary to high speed conditions. Actually, even the effective value for the caster offset should be determined empirically because it is dependent upon the instant characteristics of a dynamically varying tire patch. As lateral acceleration reaches high values, slippage begins primarily toward the rear of the tire patch-road interface. This serves to reduce the caster offset to the point where it can even achieve a zero value. This, of course, would result in a zero value of steering force. Should such a level of centrifugal force be reached that the caster offset becomes negative, then the direction of the tire loading stiffness $K_{tp}$ reverses and it increases in absolute value in the opposite direction with resulting steering force reversal as well.

Figure 8:
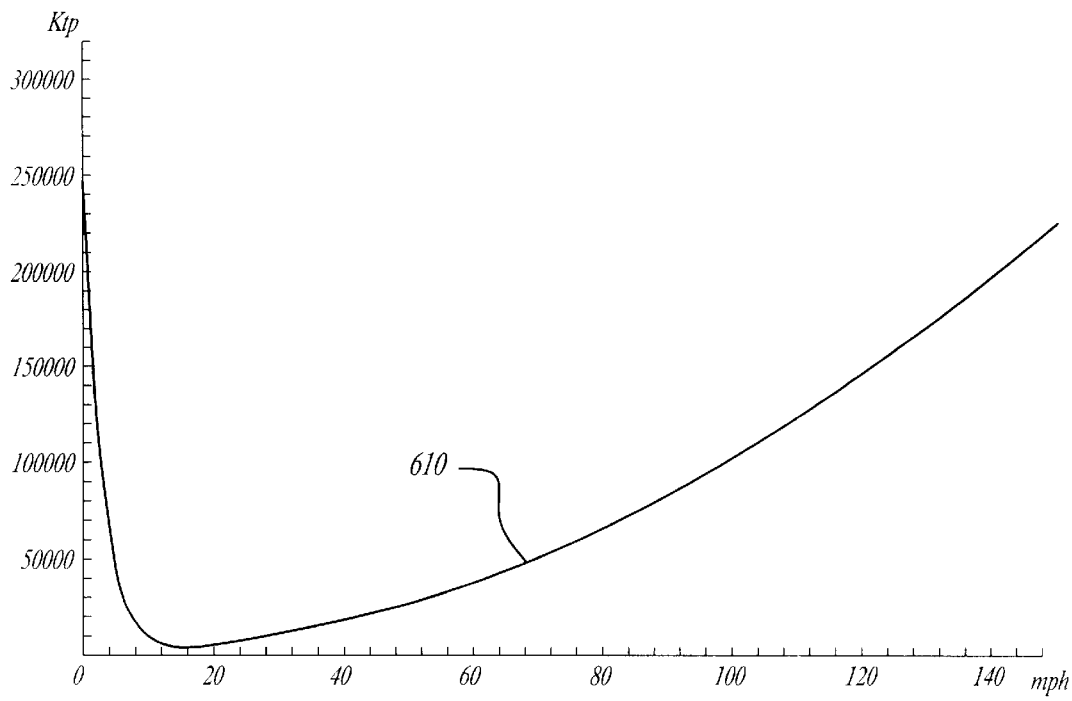
FIGS. 8 and 9 are graphic representations of two pertinent parameters of an exemplary host vehicle incorporating the preferred embodiment of the present invention.

Depicted by curve 610 of FIG. 8 is a representative approximation for $K_{tp}$ values comprising an exponential term plus a square law term (i.e., with respect to vehicle velocity) according to the formula:

$$K_{tp}=250,000/e^{(v/3)}+((17.6)^2 \text{ few co } v^2)/(g \text{ wb})$$

where e is the base of the natural logarithm, v is vehicle velocity in mph, "few" is front end weight in lbs., "co" is caster offset in inches, g is the acceleration of gravity (386.4 in./sec.$^2$), and "wb" is the vehicle's wheel base in inches.

Of lesser impact on the reflected spring constant of the system as a whole is the torsional spring stiffness of the steering column K, which includes the effects of any compliant element in the steering gear itself, such as a torsion bar. This fact of lesser impact is especially significant herein, because one of the goals of the system 10 of the present invention is to enable the use of higher values for K. Use of the block diagram disclosed above and the application of conventional analysis techniques to it comprise values for K on the order of 800 in.-lbs./rad. as indicated above. Thus, the net reflected spring constant $K_{rsc}$ in in.-lbs./rad. relates primarily to $K_{sw}$ and $K_{tp}$, and is substantially determined by the equations:

$$K_{int}=(R_p/(R_w \cos \theta_w))^2 \ (F_m/(F_m+F_h))((K_{sw}K_{tp})/(K_{sw}+K_{tp}))$$

and $$K_{rsc}=(K_{sc} K_{int})/(K_{sc}+K_{int})$$

where $R_p$ is the pinion radius in inches, $R_w$ is the knuckle arm radius in inches, $q_w$ is average knuckle arm angle, $F_m$ is the mechanically derived force in lbs., $F_h$ is the hydraulically derived force in lbs., and $K_{int}$ is an intermediate approximation to the reflected spring constant in in.-lbs./rad. In the equation for determining $K_{rsc}$, the terms on the right hand side of the equation serve to combine $K_{sc}$ and $K_{int}$. In the equation for determining $K_{int}$, the term $(R_p/(R_w \cos q_w))^2$ can be thought of as representing a transformer whose ratio is $(R_p/(R_w \cos q_w))$, the term $(F_m/(F_m+F_h))$ can be thought of as being equivalent to a voltage divider, and the term $((K_{sw}$ $K_{tp})/(K_{sw}+K_{tp}))$ serves to combine $K_{sw}$ and $K_{tp}$. It is the presence of the product of the first two of these terms that results in the reflected compliance of the tire side wall and tire loading characteristics being dominant over that of the steering column. Values for $K_{rsc}$ (utilizing the values for $K_{tp}$ shown in FIG. 8) as a function of vehicular speed (in mph) is depicted by curve 612 in FIG. 9. In calculating the functions depicted in FIGS. 8 and 9, $q_w$ is taken as being equal to zero, while the values used for all of the other terms identified above correspond to those listed with reference to the block diagram shown in FIGS. 5A, 5B and 5C.

Again, by way of summary, in the power steering system 10 of the present invention the electronic control means 32 achieves its objects by employing the fluid pressures measured by the first and second pressure transducers 54 and 55 (and preferably employs an error signal derived in part from those fluid pressures) to counteract a hydromechanical resonance occurring predominantly between the moment of inertia of the electric motor 26 and a system spring rate consisting primarily of the dominant tire loading characteristics of the dirigible wheels 13. More particularly, the electronic control means 32 treats the hydromechanical resonance as a mass element predominated by the moment of inertia of the electric motor 26 and a theoretical spring element dominated by the tire loading characteristics of the tires 21, and employs the fluid pressures measured by the first and second pressure transducers 54 and 55 to control the electric motor 26 so that the fluid pump 24 is not driven in harmony with the hydromechanical resonance.

The electronic control means 32 provides compensation suitable to this end. More particularly, the electronic control means 32 provides compensation of at least one of the magnitude of the applied steering torque in determining the compensated signal $V_c$ (block 308 or 328 of FIG. 4), and the internal servo control loop comprising either, or both of, the operation of the electric motor 26, in particular, by compensation of the internal error signal $V_{es}$, the product of the gain value ICG and the error signal $V_e$ (block 315 or 335), or compensation of the fluid pressure measured by one of the first and second pressure transducers 54 and 55 in determining the feedback signal $V_f$ (block 320 or 340). Most preferably, the compensation (308 or 328) of the magnitude of the applied steering torque predominantly includes at least one pole to suppress the open loop gain $q_f/q_e$ of the overall control loop, while the remaining compensation associated with the internal servo control loop is predominated by a low-frequency zero to advance the phase angle of the motor inertia dominated resonance of the open loop gain $V_f/V_e$, followed by higher frequency poles to suppress the open loop gain $q_f/q_e$ of the overall control loop in order to suppress overall system high frequency resonances. Preferably, this is by compensation (320 or 340) of the fluid pressure measured by one of the first and second pressure transducers. However, it is possible to change the manner in which the remaining compensation is placed or even to concentrate all of the terms in the step 315 or 335 with comparatively little degradation of the total compensation.

The electronic control means 32 also establishes base non-frequency dependent values for both the gain factor $K_q$ (block 488) and the feedback gain factor $1/K_q'$ (block 512) in part as functions of vehicle speed and torque sensor signal $V_{TT}$, and in part according to the ratio $u=K_q/K_q'$. As mentioned above, for values of torque T less than 15 in./lbs., corresponding to $V_{TT}$ values less than 0.375 Volts, both $K_q$ and $K_q'$ are suppressed to zero values in a manner to be explained below. The ratio u may be fixed or may itself vary with vehicle speed. Ideally, the ratio u would have a large value which would make the closed loop gain $P_p/V_i$ of the internal feedback loop equal to the inverse of the overall feedback value, and thus, totally independent of the motor inertia term. However, this would result in a large internal open loop gain $V_f/V_e$ which would be difficult to suppress and successfully bring through unity gain. Thus, the internal open loop gain $V_f/V_e$ must have a rather modest value (i.e., such as that obtained with a value of u=2 which is used herein) so as to achieve stable operation of the internal servo control loop. However, the hydro-mechanical resonance identified herein does result in a high "Q" resonance in the internal open loop gain $V_f/V_e$ at all vehicle speeds. This is shown for both 0 mph and 100 mph by reference numerals 550 and 552 in FIGS. 10A and 11A, respectively, each depicting a significant localized increase in the internal open loop gain $V_f/V_e$ at its resonant frequency.

It is interesting to note that without utilization of the internal servo control loop there would of course be no feedback voltage $V_f$, with the result that $V_e$ would have the same value as $V_i$ and the high "0" resonance would actually be present in the ratio $P_p/V_i$. This would result in the high "0" resonance commingling with all of the nodes depicted in FIGS. 5A and 5B except for the input node 350 where $T_s$ is located. Specifically, it would result in an inversely proportional notch in the node following summing point 356 where $q_e$ is located and the node 360 where T is located. In other words, an "inverse" resonance would be present in the overall servo control loop whereat the steering shaft torque would virtually disappear at the resonant frequency.

Figure 10A:
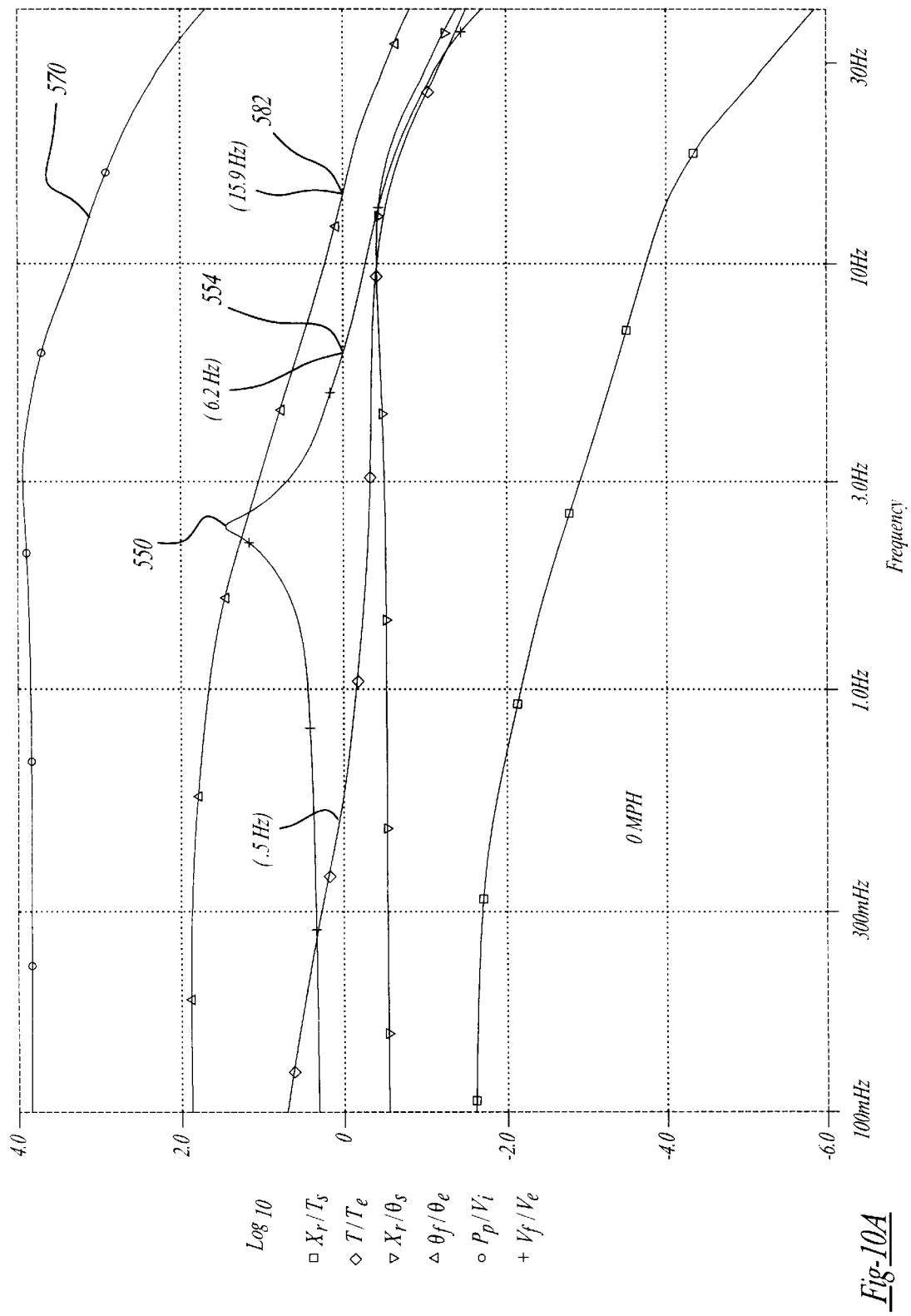
Figure 10B:
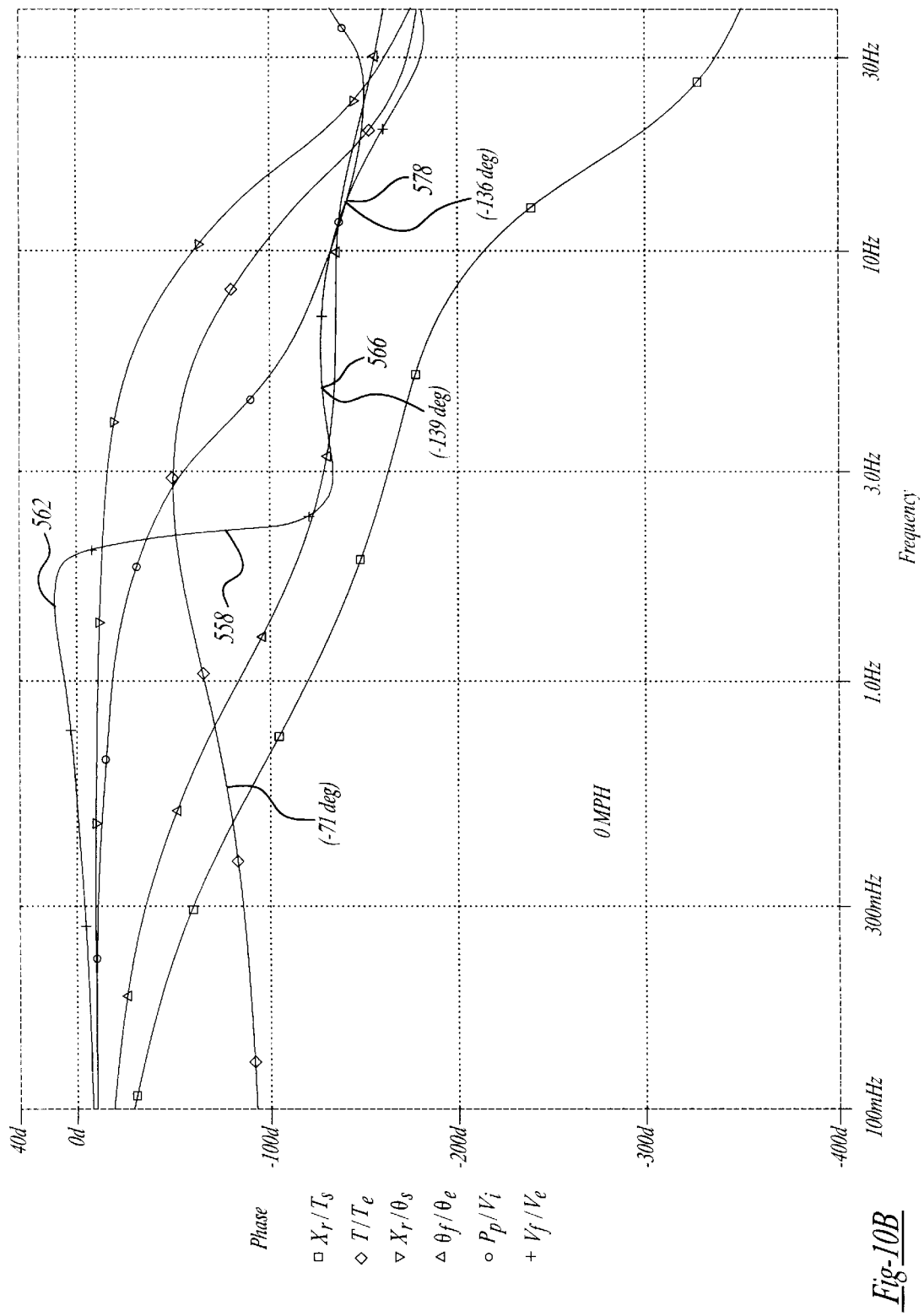
Figure 11A:
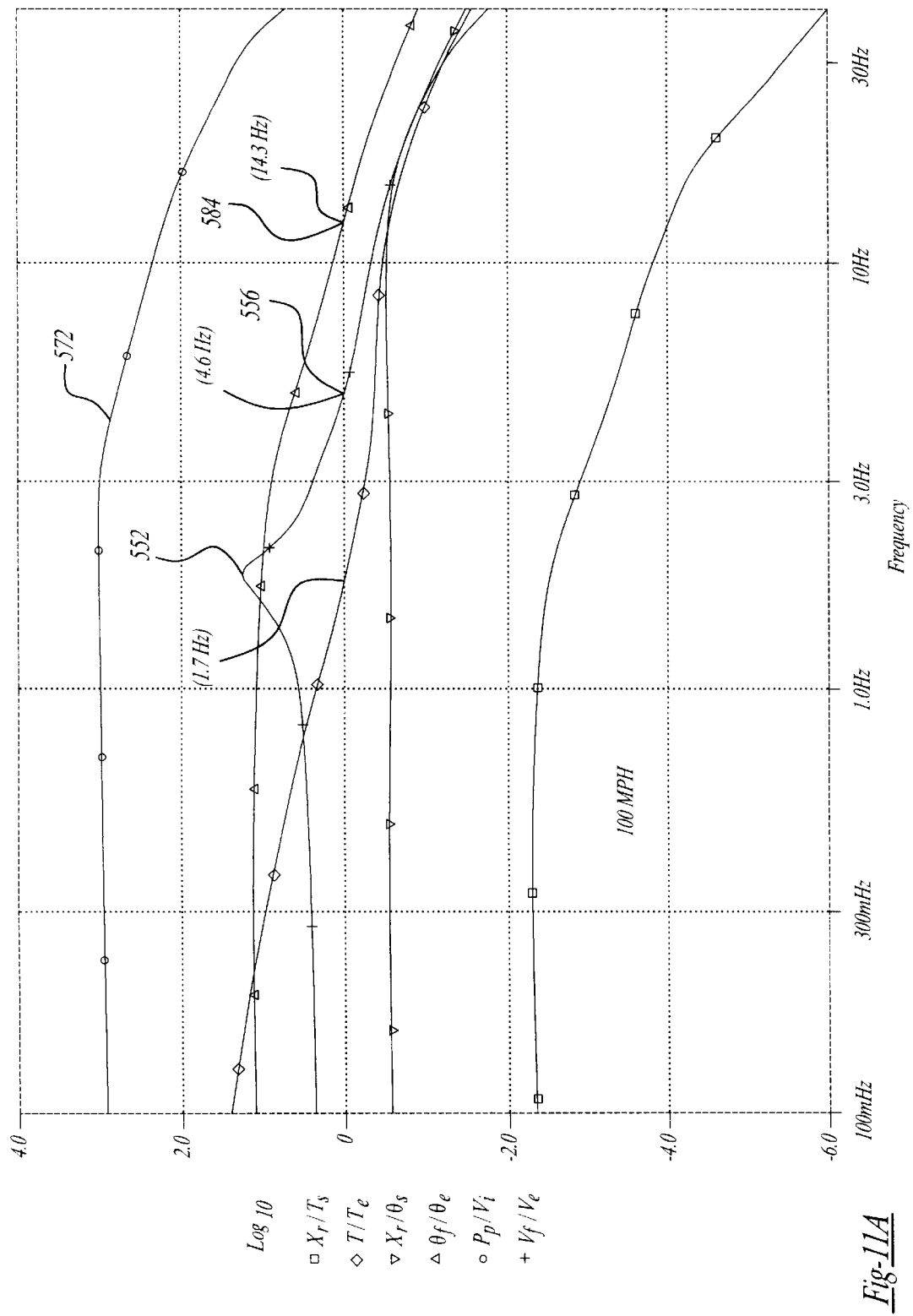

In any case, the preferred modest value for u utilized herein enables a relatively low-frequency unity gain crossover for the internal open loop gain $V_f/V_e$, as indicated by reference numerals 554 and 556 in FIGS. 10A and 11A, respectively. As indicated by reference numerals 558 and 560 in FIGS. 10B and 11B, again at 0 and 100 mph, respectively, this results in a sharp drop in phase angle at the high "Q" resonant frequency. Thus, the preferred compensation utilized in conjunction with the internal feedback gain factor 1/Kq' (block 512) comprises a dominant low-frequency zero. This is needed to advance the phase angle to a positive value before the hydromechanical resonance, thereby maintaining adequate phase margin following that resonance (as indicated by reference numerals 562 and 566 in FIG. 10B and reference numerals 564 and 568 in FIG. 11B, respectively). However, it is necessary to reduce the internal open loop gain following the resonance in order for it to decisively pass through unity gain, as indicated by reference numerals 554 and 556. This is accomplished in a commingled manner by higher frequency zeros and poles comprised in the compensation terms $f_i$, and $K_{qc}'$ utilized herein with the exemplary values given above.

Figure 11B:
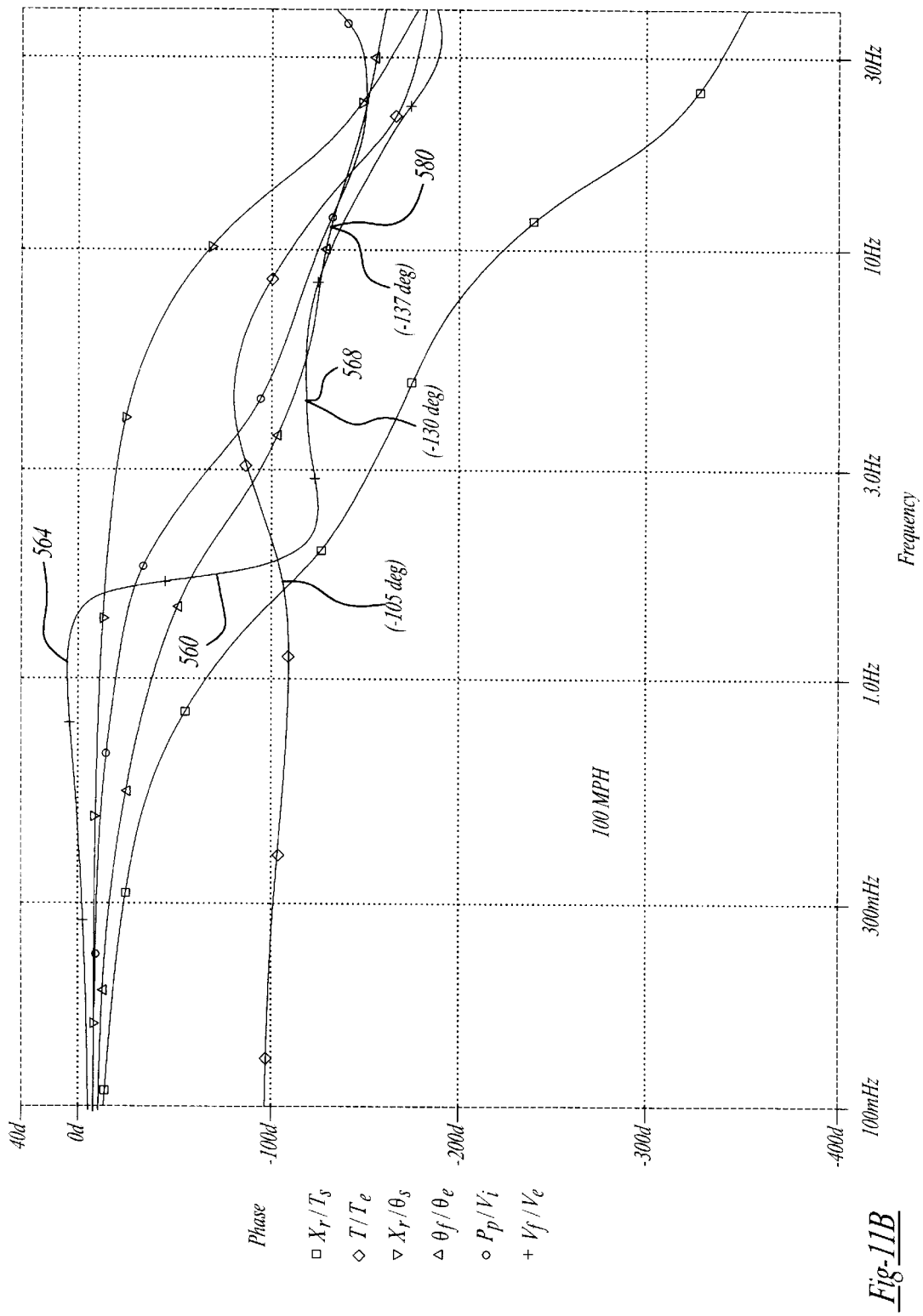

Even with such compensation, only relatively modest phase margins (on the order of 40∞ to 50∞) are achieved at unity gain, as indicated by reference numerals 566 and 568 in FIGS. 10B and 11B, respectively. In conjunction with the modest internal open loop gain $V_f/V_e$, this results in a relatively modest increase in the closed loop gain $P_p/V_i$ of the internal servo control loop, as indicated by reference numerals 570 and 572 in FIGS. 10A and 11A, respectively. Corresponding perturbations in $q_e$ or T are dramatically moderated with reference to those hypothesized above. They are of substantially non-existent "Q" appearing at frequencies of about 6 and 4 Hz (554 and 556).

Thus, the hydromechanical resonance is substantially contained within the internal control loop, and substantially transparent as viewed from the steering wheel 12. More particularly, smooth and stable overall control of the power steering system 10 of the present invention, free of any shudder characteristics, is demonstrated by the large phase margins for the open loop gain $T/T_e$ as described above with reference to FIGS. 6A and B, and 7A and B, and shown again for convenience in FIGS. 10A and B, and 11A and B, along with the closed loop gain $X_r/T$, (Because the curves presented in FIGS. 10A and B, and 11A and B are associated with actual steering assist a lower value for B, of 3.5 in.-lb.-sec. is used.) The fact that no higher frequency resonances are present in the closed loop gain $X_r/T_s$ is due to the acceptable phase margins of a little over 40∞ at about 16 and 14 Hz in the curves depicting open loop gain $q_f/q_e$, as indicated by reference numerals 578 and 580 in FIGS. 10B and 11B, and 582 and 584 in FIGS. 10A and 11A, respectively. In addition to smooth and stable overall control, however, these values indicate that the system 10 of the present invention is also able to withstand external perturbations (for example, such as from chuckhole impacts and the like) in a controlled and stable manner.

Figure 12:
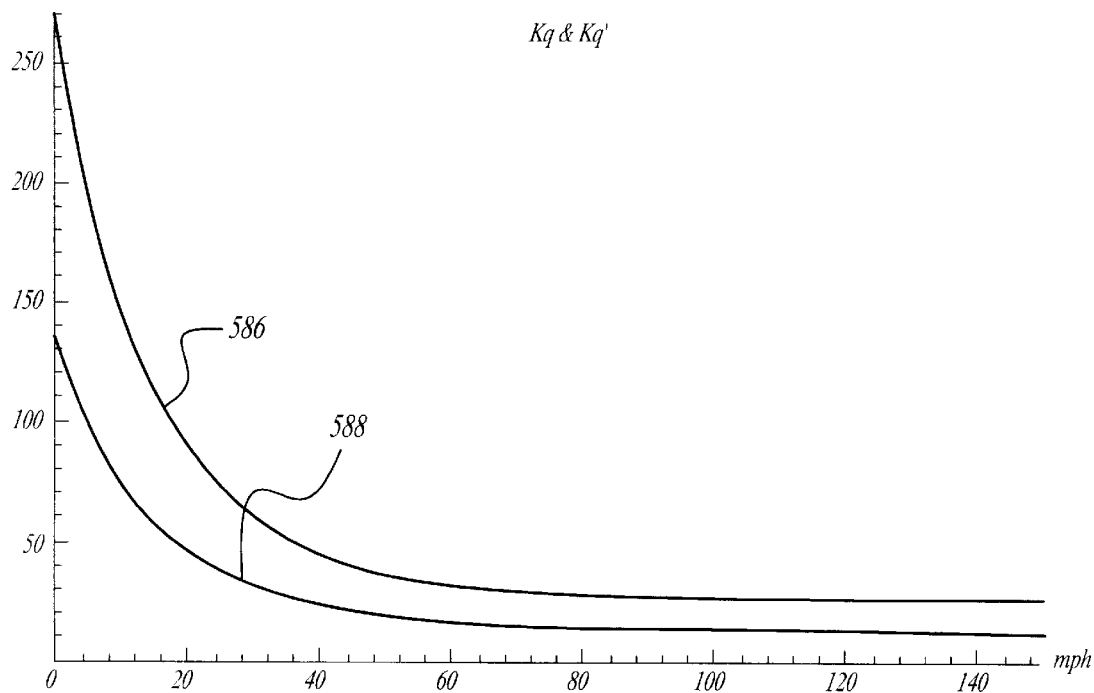
FIG. 12 is a graphic representation of the vehicle speed dependence of two gain factors employed in the preferred embodiment of the present invention.

Actual static values $K_{qs}$ for $K_q$ (that is, values of $K_q$ less any applied compensation) can be determined according to the formula:

$$K_{qs}=(F_h(u+1)d)/(A \ V_i)$$

where, in general, the particular value for the ratio $F_h/V_i$ is dependent upon the individual characteristics of any particular host vehicle model being considered, and the other values being defined above. For instance, that ratio preferably has a zero value on center in order to obtain the on center pressure signal $P_p$ values of zero described above. As a particular example for assisted steering, however, the algorithm $$(F_h/V_i)667+5867/e^{(v/15)}$$

yields typical values for $K_{qs}$, $K_q$ and $K_q'$, wherein e is the base of the natural logarithm, v is the instant vehicle speed in mph, and u=2, d=0.0207 in.$^3$/rad. and A=1.511 in.$^2$ are taken as presumed values. The resulting calculated values for $K_q$ and $K_q'$ are shown in FIG. 12, indicated by the curves 586 and 588, respectively ($K_q'$, of course, equals $K_{qs}/u$.).

Again, the particular compensation required will depend upon characteristics of the specific host vehicle and the perceived resonances which are to be counteracted by the system 10. It is believed that those skilled in this specialized art will be able to derive and employ compensation terms specific to any particular host vehicle by the use of commonly available modeling programs, in light of the present disclosure.

Figure 13:
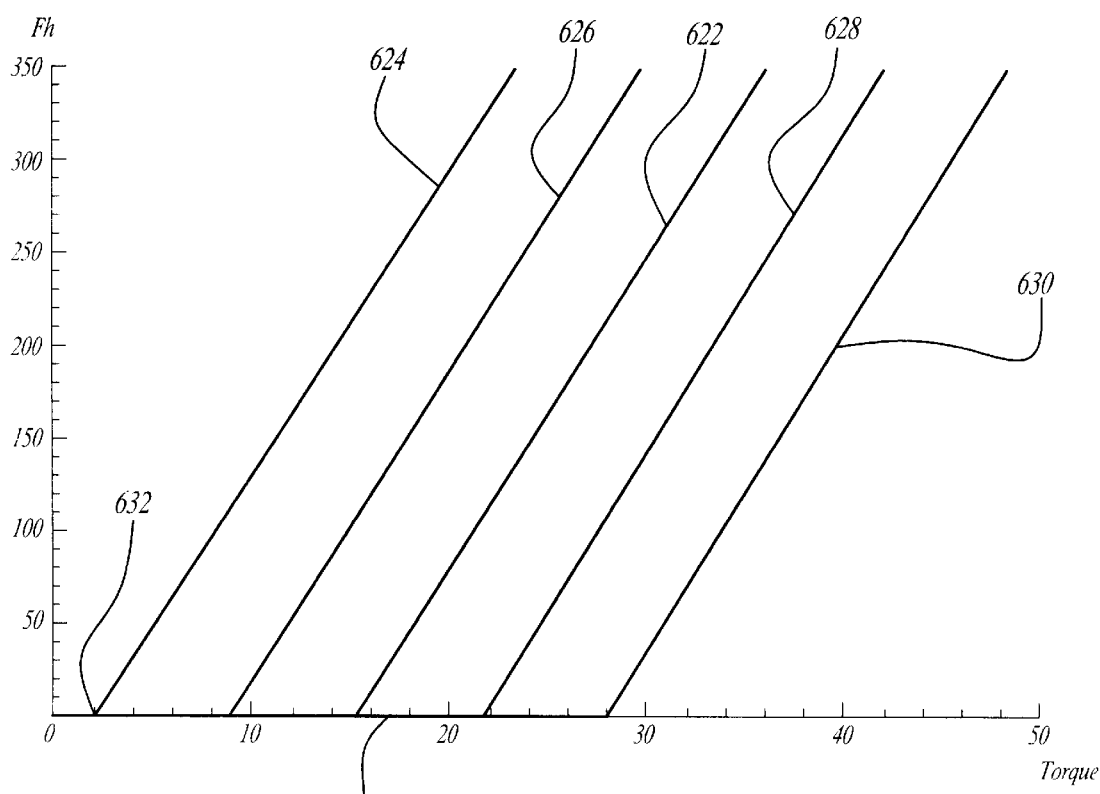
FIG. 13 is a graphic representation of the overall system gain of the preferred embodiment of the present invention, such overall gain in part comprising dependence of a tachometer feedback damping factor employed in the preferred embodiment of the present invention.

FIG. 13 depicts a family of steering assist force-effort curves (where the steering assist force is $F_h$, and the "effort" is the applied steering torque $T_s$) obtained from the values for d, A, u, TT, $R_p$, $K_q$, $K_q'$ and $K_c$ listed or graphically illustrated above. For brevity, only half of the entire field for the curves is shown in FIG. 13, associated with turns in one direction; for turns in the opposite direction, the curves shown in the first quadrant would be again formed as real images in the third quadrant. In dependence upon steering wheel applied torque values and obtained via compensated voltage $V_c$, the family of curves depicted in FIG. 13 is obtained by first suppressing $K_q$ to a nominal zero value associated with on-center steering as called for before. In FIG. 13, the zero value is maintained to a $T_s$ value of about 15 in.-lb., as indicated by reference numeral 620. A linear zone comprising static pressure-effort curve segment 622 is then plotted beginning at 15 in.-lb. This corresponds to the teachings presented above wherein the slope of curve 622 is $F_h/T_s$ given by the equation:

$$(F_h/T_s)=(TT\ K_q\ A)/((1+u)d)$$

where in this case $K_q$ has a particular desired value corresponding to a particular vehicle speed as shown, for instance, in FIG. 12. Alternately, the desired instant value for $K_q$ could be zero for on center conditions, and/or corresponding to an instant position along a smooth blend from zero to that value required for the final desired slope of the curve 622, as a function of $V_{TT}$ values leading up to a 0.375 Volt value (i.e., 15×0.025), as mentioned above.

Concomitant with the subtraction of the tachometer feedback signal Vt from the compensated steering torque signal $V_c$, more "effort" $T_s$ is required to generate the same value of steering assist force $F_h$. Instant values of the rotational speed $q_m$ s of the electric motor 26 are related to the rotational speed $q_s$ s of the steering wheel 12 by the equation:

$$((\theta_m s)/(\theta_s\ s))=(A\ R_p)/d$$

And, the tachometer feedback signal $V_t$ is determined by the equation:

$$V_t=(A\ R_p \theta_s s)/(d\ K_c)$$

Subtracting $V_t$ from the compensated signal $V_c$, in order to form input signal $V_i$, yields the family of curves shown in FIG. 13, wherein curves 624, 626, 628 and 630 depict the values of $F_h$ for steering wheel rotational velocities q, s of −800∞/sec., −400∞/sec., +400∞/sec. and +800∞/sec., respectively. (The polarity associated with the subtraction is, of course, dependent upon the direction of rotation of the motor 26.) It should be apparent that the curve 622 and the curves 624–630 reflect the suppression of the slope internal control loop gain value ICG to zero when the steering wheel 12 is in an on-center position. At such an on-center position, for example, when the input signal $V_i$ (which equals $V_c-V_t$) is below a threshold value associated with a statically applied steering torque $T_s$ of less than about 15 in.-lb., the ratio $F_h/V_i$ is suppressed to zero as mentioned above, resulting in a zero value for $P_p$. When the input signal $V_i$ is above that threshold value, the curve 622 as well as the curves 624–630 are linear in the fashion shown. (The curves 624 and 626 remain linear for values of $T_s$ less than 15 in.-lb. because the input signal $V_i$ still has a value above the threshold value.) Of course, the curves 622–630 could be shaped in any manner desired, thereby altering the handling characteristics of the host vehicle. In fact, the curves 622–630 are somewhat simplistic because in general, as is suggested above, $K_q$ is customized for values of T approaching 15 in.-lb. (or $V_{TT}$ approaching 0.375 Volts) in order to smoothly blend the on center condition into the linear zone static pressure-effort curve 622.

Knowledge of the family of curves 624–630 which result from a non-infinite value for $K_c$ is important because the changes in torque between the curve 622 and the curves 624–630 for the same value of hydraulic force $F_h$ represent values of steering damping actually felt by the vehicle driver. This is equivalent to having a meaningful value for $B_s$ during macro steering maneuvers, in contrast to the incipient rack motion noted above with respect to damping in the steering yoke assembly. For instance, at a vehicle speed of 100 mph, the tachometer feedback damping constant $K_c$ of 1,000 rad./volt-sec. listed above results in damping equivalent to having a value of 0.92 in.-lb.-sec./rad. for $B_s$.

Of course, $K_c$ may be programmed with its value changing as a function of vehicle speed. Alternatively, values of $K_c$ used for negative steering wheel rotational speeds may be defined as selected functions of torque in order to avoid crossing over into the second and fourth quadrants, or even to avoid approaching the second and fourth quadrants as indicated by reference numeral 632, thereby avoiding the need to apply negative steering wheel torque in order to achieve full steering wheel recovery at the higher rotational speeds. This can be especially appropriate for customized $K_q$ curves utilized for blending the on center region into the linear zone as described above.

Thus, the power steering system 10 of the present invention differs from the system disclosed in the Shimizu et al. '539 patent in a variety of ways, and possesses distinct advantages over that system. The system 10 never measures the actual assistive torque and, indeed, never measures the actual motor torque of the electric motor 26 for any purpose related to the direct control of the system 10 at all, except insofar as current or voltage information about the electric motor 26 can incidentally be used in a redundant manner for safety, as described above. The system 10 never uses anything based on motor current for the purpose to which the actual assistive torque detecting means of the Shimizu et al. '539 patent is put. The control means 32 of the system 10 never generates a target value of any system quantity (such as pressure) and never generates an error signal based on the difference between actual and target values of that quantity. Instead, as described above, the system 10 of the present invention generates an error signal $V_e$ (equal to $V_i$ minus $V_f$) in a way that is different from the way in which the error signal is generated in the Shimizu et al. '539 patent (based on the direct feedback of actual pressure, rather than on generating a difference between target and actual assistive torque), and controls the electric motor 26 in a different way (according to the desired gain, for example, and not according to a torque-difference error signal) to give a different result (most likely improved stability).

Figure 9:
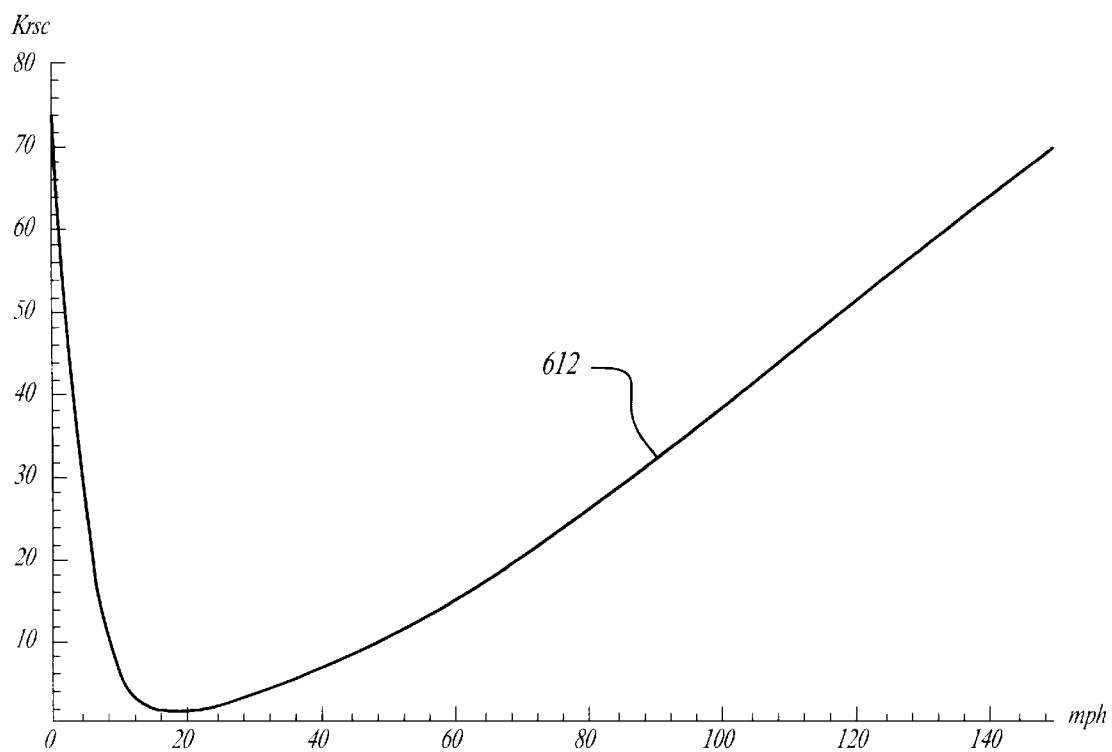

Indeed, it appears that the Shimizu et al. '539 patent may be incorrect in utilizing a dynamic model which expressly ignores the rigidity of the tires and considers the torsion bar spring constant to be the dominant compliant element of the system. FIGS. 8 and 9 herein clearly show the dominant influence of $K_{tp}$ upon the system 10. Moreover, FIGS. 6A–7B and 10A–11B herein clearly show that the steering wheel related resonance can be controlled on solely a mechanical basis, while FIGS. 10A, 10B, 11A and 11B herein clearly show that the motor related resonance can be controlled solely on a servo control basis. It therefore appears clear that the two resonances can each be adequately controlled in completely different ways, strongly suggesting that they are not related as implied in FIG. 11 of the Shimizu et al. '539 patent, but instead arise from independent mechanical and hydromechanical causes, respectively, as identified herein.

Again, the power steering system 10 of the present invention possesses numerous advantages over prior EPS systems. The system 10 provides full time independent verification of the instant values of steering boost, substantially eliminating concerns relating to auto-steer. The system 10 also substantially eliminates low frequency stability control problems previously encountered in such systems. The reversible fluid pump, fluid lines and associated valves provide a completely new arrangement for coupling the drive motor of an EPS system to the balance of the system, such that concerns about mechanical over constraint, Coulomb friction, wear and backlash are eliminated. Advantageously, an optimum tactile relationship between the vehicle, the vehicle driver and the steering system is established by the linear relationship of the steering force output from the system 10 to the applied steering torque. The system 10 possesses high efficiency and recovers a significant portion of the energy returned from the dirigible wheels when the host vehicle exits a turn. The system 10 draws significantly less current during parking maneuvers than is drawn by prior EHPS systems. The system naturally moves between its powered assist and energy regeneration modes in order to permit good steering control during both modes, and during changing between those modes. Such varying between modes is carried out with excellent smoothness. Finally, the system 10 of the present invention allows safe operation of the vehicle during failure of the powered assist provided by the system.

Having described the invention, however, many modifications thereto will become immediately apparent to those skilled in the art to which it pertains, without deviation from the spirit of the invention. Such modifications fall within the scope of the invention.

Industrial Applicability

The instant system is capable of regenerating and recovering a substantial amount of the energy developed in vehicle power steering systems, and accordingly finds industrial application in motor vehicles and other devices having a powered assist generated as a function of applied torque.

What is claimed is:

1. A power steering system (10) for a vehicle having dirigible wheels (13), a power cylinder (18) having left and right ports (56 and 58) and adapted to supply a powered assist to steering the dirigible wheels (13) of the vehicle upon the supply of a pressurized fluid to one of the left and right ports (56 and 58), a reversible fluid pump (24) having first and second ports (78 and 80), an electric motor (26) operatively connected to and capable of reversibly driving the fluid pump (24), a first fluid line (20) connecting the first port (78) of the fluid pump (24) to the left port (56) of the power cylinder (18), a second fluid line (22) connecting the second port (80) of the fluid pump (24) to the right port (58) of the power cylinder (18), a pair of check valves (52) disposed in a suction line (49) connected to a fluid reservoir (50) and connected one each to the first and second fluid lines (20 and 22), and a primary applied steering torque sensor (14) which generates a signal ($V_{TT}$) in response to at least an applied steering torque ($T_s$); the improvement wherein the system (10) further comprises:

a first pressure transducer (54) sensing a left fluid pressure ($LP_p$) in the first fluid line (20);

a second pressure transducer (55) sensing a right fluid pressure ($RP_p$) in the second fluid line (22); and an electronic control means (32) to which the first and second pressure transducers (54 and 55) and the primary applied steering torque sensor (14) are operatively connected, and which controls actuation of the electric motor (26);

wherein the electronic control means (32) establishes servo control (322, 342) over the powered assist to steering supplied by the power cylinder (18) in dependence upon the fluid pressure ($LP_p$ or $RP_p$) sensed by one of the first and second pressure transducers (54 or 55).

2. The power steering system (10) according to claim 1, wherein the electronic control means (32) establishes closed loop servo control (322, 342) over the electric motor (26) in dependence upon the fluid pressure ($LP_p$ or $RP_p$) sensed by the one of the first and second pressure transducers (54 or 55).

3. The power steering system (10) according to claim 1, wherein the electronic control means (32) achieves a substantially linear relationship between the applied steering torque ($T_s$) and the powered assist to steering supplied by the power cylinder (18).

4. The power steering system (10) according to claim 1, wherein the electronic control means (32) generates an error signal ($V_e$) in response to at least the signal ($V_{TT}$) by the primary applied steering torque sensor (14), an error signal ($V_e$) being dependent upon the fluid pressure ($LP_p$ or $RP_p$) sensed by one of the first and second pressure transducers (54 or 55); wherein the electronic control means (32) determines an internal control loop gain value (ICG) as a function of at least vehicle speed, the internal control loop gain value (ICG) being further related to the signal ($V_{TT}$) generated by the primary applied steering torque sensor (14); and wherein the electronic control means multiplies the error signal ($V_e$) by the internal control loop gain value (ICG) and causes the electric motor (26) to drive the fluid pump (24) in a manner which generates the fluid pressure ($LP_p$ or $RP_p$) sensed by the one of the first and second pressure transducers (54 or 55) in accordance with the product of the error signal ($V_e$) and the internal control loop gain value (ICG).

5. The power steering system (10) according to claim 4, wherein the electronic control means (32) generates the error signal ($V_e$) by compensating the signal ($V_{TT}$) generated by the primary applied steering torque sensor to yield a compensated steering torque signal ($V_c$); subtracting from the compensated steering torque signal ($V_c$) a tachometer feedback signal ($V_t$), representative of steering movement of the dirigible wheels (13), to yield an input signal ($V_i$); obtaining a pressure-dependent loop feedback signal ($V_f$) and subtracting the feedback signal ($V_f$) from the input signal ($V_i$) to yield the error signal ($V_e$).

6. The power steering system (10) according to claim 1, further comprising a fluid reservoir (50) and a suction line (49) selectively connecting one of the left and right ports (56 and 58) of the power cylinder (18) to the fluid reservoir (50).

7. The power steering system (10) according to claim 1, further comprising a fluid reservoir (50) and a two-position, three-way valve (39) fluidly connecting the first fluid line (20) and the second fluid line (22) to the fluid reservoir (50), the three-way valve (39) being operable to connect the second fluid line (22) to the fluid reservoir (50) when the fluid pressure in the first fluid line (20) is greater than the fluid pressure in the second fluid line (22), and to connect the first fluid line (20) to the fluid reservoir (50) when the fluid pressure in the second fluid line (22) is greater than the fluid pressure in the first fluid line (20).

8. The power steering system (10) according to claim 7, further comprising the pair of check valves (52) disposed in the suction line (49) being directly connected one each to the left and right ports (56 and 58) of a power cylinder (18), oriented so as to permit the flow of fluid from the fluid reservoir (50) through the suction line (49) and to the connected left or right port (56 or 58) of the power cylinder (18) when the fluid pressure at that left or right port (56 or 58) is less than the pressure in the reservoir (50); wherein the suction line (49) has lesser flow impedance than the first and second fluid lines (20 and 22), thereby causing the flow of fluid from the fluid reservoir (50) through the suction line (49) and one of the check valves (52) to be returned to the fluid reservoir (50) through the power cylinder (18), the one of the first and second fluid lines (20 and 22) having higher pressure, the fluid pump (24), the other of the first and second fluid lines (20 or 22) and the three-way valve (39).

9. The power steering system (10) according to claim 1, further comprising an actuation speed measuring means (33)

operatively connected to the electronic control means (32) for providing a tachometer signal ($V_t$) representative of steering movement of the dirigible wheels (13), and wherein the electronic control means (32) subtracts the tachometer feedback signal ($V_t$) from the steering torque signal ($V_{TT}$) during control of actuation of the electric motor (26).

10. The power steering system (10) according to claim 9, wherein the vehicle includes a steering wheel (12) to which the primary applied steering torque sensor (14) is operatively connected, and wherein the actuation speed measuring means (33) comprises a tachometer (62) for measuring a rotational speed of at least one of the steering wheel (12) and the electric motor (26).

11. The power steering system (10) according to claim 1, further comprising a redundant applied steering torque sensor (15) which generates a redundant signal in response to the applied steering torque ($T_s$) and which is connected to the electronic control means (32); wherein the electronic control means (32) terminates the powered assist provided by the system (10) when the redundant signal from the redundant applied steering torque sensor (15) fails to correlate with the signal ($V_{TT}$) from the primary applied steering torque sensor (14).

12. The power steering system (10) according to claim 11, wherein the electronic control means (32) calculates an expected fluid pressure as a function of the signal ($V_{TT}$) generated by the primary applied steering torque sensor (14); compares the higher of the fluid pressures ($LP_p$ or $RP_p$) in the first and second fluid lines (20 or 22), to the expected fluid pressure, and terminates the powered assist provided by the system (10) when the higher of the fluid pressures ($LP_p$ or $RP_p$) in the first and second fluid lines (20 or 22) fails to correlate with the expected fluid pressure calculated by the electronic control means (32).

13. The power steering system (10) according to claim 11, further comprising means (35) for providing a redundant measure of the higher of the fluid pressures ($LP_p$ and $RP_p$) in the first and second fluid lines (20 and 22); wherein the electronic control means (32) terminates the powered assist provided by the system (10) when the redundant measure of the fluid pressures ($LP_p$ and $RP_p$) provided by the means (35) for providing the same fails to correlate with the higher of the fluid pressures ($LP_p$ or $RP_p$) sensed by one of the first and second pressure transducers (54 or 55).

14. The power steering system (10) according to claim 13, wherein the means (35) for providing a redundant measure of the fluid pressures ($LP_p$ and $RP_p$) in the first and second fluid lines (20 and 22) comprises a third pressure transducer (113) selectively connected to that one of the first and second fluid lines (20 or 22) having a higher pressure than the other.

15. The power steering system (10) according to claim 13, wherein the electronic control means (32) calculates an expected fluid pressure as a function of the redundant signal generated by the redundant applied steering torque sensor (15); compares the redundant measure of the fluid pressures ($LP_p$ and $RP_p$) provided by the means (35) for providing the same, to the expected fluid pressure, and terminates the powered assist provided by the system (10) when the redundant measure of the fluid pressures ($LP_p$ and $RP_p$) fails to correlate with the expected fluid pressure calculated by the electronic control means (32).

16. The power steering system (10) according to claim 1, wherein the electronic control means (32) calculates an expected fluid pressure as a function of the signal ($V_{TT}$) generated by the primary applied steering torque sensor (14); compares the higher of the fluid pressures ($LP_p$ or $RP_p$) in the first and second fluid lines (20 or 22), to the expected fluid pressure, and terminates the powered assist provided by the system (10) when the higher of the fluid pressures ($LP_p$ or $RP_p$) in the first and second fluid lines (20 or 22) fails to correlate with the expected fluid pressure calculated by the electronic control means (32).

17. The power steering system (10) according to claim 1, wherein the vehicle presents a steering load stiffness to the power steering system (10), and wherein the electronic control means (32) employs the fluid pressures measured by the first and second pressure transducers (54 and 55) to counteract a hydromechanical resonance occurring predominantly between a moment of inertia of the electric motor (26) and a system spring rate presented by the steering load stiffness.

18. The power steering system (10) according to claim 17, wherein the electronic control means (32) treats the hydromechanical resonance as a resonance between a mass element predominated by the moment of inertia of the electric motor (26) and a theoretical spring element dominated by tire loading characteristics associated with the tires (21); and wherein the electronic control means (32) employs the fluid pressures $LP_p$ and $RP_p$ measured by the first and second pressure transducers (54 and 55) to control the electric motor (26) so that the fluid pump (24) is not driven in harmony with the hydromechanical resonance.

19. The power steering system according to claim 1, wherein a electronic control means provides compensation of at least one of the magnitude of the applied steering torque (308 or 328), and the operation (315 or 335) of the electric motor (26) or the fluid pressure ($LP_p$ or $RP_p$) measured (320 or 340) by one of the first and second pressure transducers.

20. The power steering system according to claim 19, wherein the compensation (308 or 328) of the magnitude of the applied steering torque predominantly includes at least one pole and a compensation (315 or 335) of the operation of the electric motor (26) or the fluid pressure ($LP_p$ or $RP_p$) is predominated by a low-frequency zero.

21. The power steering system (10) according to claim 1, wherein the vehicle includes a steering wheel (12), such that the application of an applied steering torque (TQ) to the steering wheel (12) results in a application by the system (10) of a steering force assist to the dirigible wheels (13); and wherein the electronic control means (32) employs the fluid pressures ($LP_p$ and $RP_p$) measured by the first and second pressure transducers (54 and 55) to establish an internal closed servo control loop (322 or 342) between an input signal ($V_i$) derived from the application of an applied steering torque ($T_s$) to the steering wheel (12) and the steering force assist to the dirigible wheels (13).

22. The power steering system (10) according to claim 21, further comprising a tachometer (62) operatively connected to the electronic control means (32) which generates a signal ($V_t$) equal to ($q_m$ s/$K_c$), representative of a rotational speed of the electric motor (26), $q_m$ being a rotational position of the electric motor (26), $K_c$ being a tachometer feedback damping factor and s being a Laplace variable; wherein the primary applied steering torque sensor (14) and the electronic control means (32) together generate a compensated signal ($V_c$); and wherein the electronic control means (32) subtracts the signal ($V_t$) representative of the rotational speed of the electric motor (26) from the compensated signal ($V_c$) representative of the applied steering torque and employs a resulting difference in forming an input signal ($V_i$) to the internal closed servo control loop (322 or 342).

23. The power steering system (10) according to claim 22, wherein the electronic control means (32) generates (320 or 340) a signal representative of the fluid pressure ($LP_p$ or $RP_p$) measured by the first or second pressure transducer (54 or 55) so as to give an internal loop feedback signal ($V_f$), and subtracts the internal loop feedback signal ($V^f$) from the input signal ($V_i$) to the internal closed servo control loop (322 or 342) so as to yield an error signal ($V_e$) from which an internal drive signal ($V_d$) for operating the electric motor (26) is derived.

24. The power steering system (10) according to claim 23, wherein the electronic control means (32) determines an internal control loop gain value (ICG) as a function of vehicle speed and the compensated signal ($V_c$) representative of the applied steering torque, and operates the electric motor (26) so as to generate a measured fluid pressure ($LP_p$ or $RP_p$) at the one of a first or second pressure transducers (54 or 55) in accordance with a product of an error signal ($V_e$) and the internal control loop gain value (ICG).

25. The power steering system (10) according to claim 1, wherein when the fluid pressure ($LP_p$ or $RP_p$) measured by one of the first and second pressure transducers (54 or 55) is greater than the fluid pressure ($RP_p$ or $LP_p$) measured by the other of the second and first pressure transducers (55 or 54) and exceeds a predetermined threshold value, the electronic control means (32) calibrates the other of the second and first pressure transducers (55 or 54) by assigning a zero value to an internal signal representative of the fluid pressure ($RP_p$ or $LP_p$) measured by the other of the second and first pressure transducers (55 or 54).

26. The power steering system (10) according to claim 1, further comprising a fluid reservoir (50), wherein both of the first and second fluid lines (20 and 22) are placed in direct fluid communication with the reservoir (50) should the powered assist to steering provided by the system (10) fail.

27. The power steering system (10) according to claim 26, further comprising a two-position, compound two-way relief valve (37) fluidly connected between the first and second fluid lines (20 and 22) and the reservoir (50), disposed in parallel with the power cylinder (18), for placing the first and second fluid lines (20 and 22) in direct fluid communication with the reservoir (50) should the powered assist to steering provided by the system (10) fail.

28. A power steering system (10) for a vehicle having dirigible wheels (13), a power cylinder (18) having left and right ports (56 and 58) and adapted to supply a powered assist to steering the dirigible wheels (13) of the vehicle upon the supply of a pressurized fluid to one of the left and right ports (56 and 58), a reversible fluid pump (24) having first and second ports (78 and 80), an electric motor (26) operatively connected to and capable of reversibly driving the fluid pump (24), a first fluid line (20) connecting the first port (78) of the fluid pump (24) to the left port (56) of the power cylinder (18), a second fluid line (22) connecting the second port (80) of the fluid pump (24) to the right port (58) of the power cylinder (18), a pair of check valves (52) disposed in a suction line (49) connected to a fluid reservoir (50) and connected one each to the first and second fluid lines (20 and 22), and a primary applied steering torque sensor (14) which generates a signal ($V_{TT}$) in response to at least an applied steering torque ($T_s$); the improvements wherein the system (10) further comprises:

a first pressure transducer (54) sensing the fluid pressure ($LP_p$) in the first fluid line (20);

a second pressure transducer (55) sensing the fluid pressure ($RP_p$) in the second fluid line (22);

an electronic control means (32) to which the first and second pressure transducers (54 and 55) and the primary applied steering torque sensor (14) are operatively connected, and which controls actuation of the electric motor (26);

a redundant applied steering torque sensor (15) which generates a redundant signal in response to the applied steering torque ($T_s$) and which is connected to the electronic control means (32);

an actuation speed measuring means (33) operatively connected to the electronic control means (32) for providing a tachometer signal ($V_t$) representative of steering movement of the dirigible wheels (13); and means (35) for providing a redundant measure of the fluid pressures ($LP_p$ and $RP_p$) in the first and second fluid lines (20 and 22), wherein the electronic control means (32) establishes servo control (322, 342) over the powered assist to steering supplied by the power cylinder (18) in dependence upon the fluid pressure ($LP_p$ or $RP_p$) sensed by one of the first and second pressure transducers (54 or 55);

wherein the electronic control means (32) establishes closed loop servo control (322, 342) over the electric motor (26) in dependence upon the fluid pressure ($LP_p$ or $RP_p$) sensed by the one of the first and second pressure transducers (54 or 55) and achieves a substantially linear relationship between the applied steering torque ($T_s$) and the powered assist to steering supplied by the power cylinder (18);

wherein the electronic control means (32) generates an error signal ($V_e$) in response to (at least the generation of the signal ($V_{TT}$) by the primary applied steering torque sensor (14), the error signal ($V_e$) being dependent upon the fluid pressure ($LP_p$ or $RP_p$) sensed by one of the first and second pressure transducers (54 or 55); wherein the electronic control means (32) determines an internal control loop gain value (ICG) as a function of at least vehicle speed, the internal control loop gain value (ICG) being further related to the signal ($V_{TT}$) generated by the primary applied steering torque sensor (14), and wherein the electronic control means multiplies the error signal ($V_e$) by the internal control loop gain value (ICG) and causes the electric motor (26) to drive the fluid pump (24) in a manner which generates the fluid pressure ($LP_p$ or $RP_p$) sensed by the one of the first and second pressure transducers (54 or 55) in accordance with a product of the error signal ($V_e$) and the internal control loop gain value (ICG);

wherein the electronic control means (32) generates the error signal ($V_e$) by compensating the signal ($V_{TT}$) generated by the primary applied steering torque sensor to yield a compensated steering torque signal ($V_c$); subtracting from the compensated steering torque signal ($V_c$) a tachometer feedback signal ($V_t$), representative of steering movement of the dirigible wheels (13), to yield an input signal ($V_i$); obtaining a pressure-dependent loop feedback signal ($V_p$) and subtracting the feedback signal ($V_f$) from the input signal ($V_i$) to yield the error signal ($V_e$);

wherein the electronic control means (32) terminates the powered assist provided by the system (10) when the redundant signal from the redundant applied steering torque sensor (15) fails to correlate with the signal ($V_{TT}$) from the primary applied steering torque sensor (14);

wherein the vehicle includes a steering wheel (12) to which the primary applied steering torque sensor (14) is operatively connected, and wherein the actuation speed measuring means (33) comprises a tachometer

(62) for measuring the rotational speed of at least one of a steering wheel (12) and the electric motor (26);

wherein the electronic control means (32) terminates the powered assist provided by the system (10) when the redundant measure of the fluid pressures ($LP_p$ and $RP_p$) provided by the means (35) for providing the same fails to correlate with the fluid pressure ($LP_p$ or $RP_p$) sensed by one of the first and second pressure transducers (54 or 55);

wherein the means (35) for providing a redundant measure of the fluid pressures ($LP_p$ and $RP_p$) in the first and second fluid lines (20 and 22) comprises a third pressure transducer (113) selectively connected to that one of the first and second fluid lines (20 or 22) having a higher pressure than the other;

wherein the vehicle presents a steering load stiffness to the power steering system (10); wherein the electronic control means (32) employs the fluid pressures measured by the first and second pressure transducers (54 and 55) to counteract a hydromechanical resonance occurring predominantly between a moment of inertia of the electric motor (26) and a system spring rate presented by the steering load stiffness; wherein the electronic control means (32) treats a hydromechanical resonance as a resonance between a mass element predominated by the moment of inertia of the electric motor (26) and a theoretical spring element dominated by tire loading characteristics associated with the tires (21); and wherein the electronic control means (32) employs the fluid pressures measured by the first and second pressure transducers (54 and 55) to control the electric motor (26) so that the fluid pump (24) is not driven in harmony with the hydromechanical resonance;

wherein the electronic control means provides compensation of at least one of a magnitude of an applied steering torque (308 or 328), and operation (315 or 335) of the electric motor (26) or the fluid pressure ($LP_p$ or $RP_p$) measured (320 or 340) by one of the first and second pressure transducers (54 or 55), and wherein the compensation (308 or 328) of the magnitude of the applied steering torque predominantly includes at least one pole and compensation (315 or 335) of operation of the electric motor (26) or the fluid pressure ($LP_p$ or $RP_p$) is predominated by a low-frequency zero;

wherein the vehicle includes a steering wheel (12), such that the application of an applied steering torque ($T_s$) to the steering wheel (12) results in application by the system (10) of a steering force assist to the dirigible wheels (13); and wherein the electronic control means (32) employs the fluid pressures ($LP_p$ and $RP_p$) measured by the first and second pressure transducers (54 and 55) to establish an internal servo control loop (322 or 342) between an input signal ($V_i$) derived from application of an applied steering torque ($T_s$) to the steering wheel (12) and the steering force assist to the dirigible wheels (13);

wherein when the fluid pressure ($LP_p$ or $RP_p$) measured by one of the first and second pressure transducers (54 or 55) is greater than the fluid pressure ($RP_p$ or $LP_p$) measured by the other of the second and first pressure transducers (55 or 54) and exceeds a predetermined threshold value, the electronic control means (32) calibrates the other of the second and first pressure transducers (55 or 54) by assigning a zero value to an internal signal representative of the fluid pressure ($RP_p$ or $LP_p$) measured by the other of the second and first pressure transducers (55 or 54); and wherein both of the first and second fluid lines (20 and 22) are placed in direct fluid communication with the reservoir (50) should the powered assist to steering provided by the system (10) fail.

29. A power steering system (10) for a vehicle having dirigible wheels (13), a power cylinder (18) having left and right ports (56 and 58) and adapted to supply a powered assist to steering the dirigible wheels (13) of the vehicle upon the supply of a pressurized fluid to one of the left and right ports (56 and 58), a reversible fluid pump (24) having first and second ports (78 and 80), an electric motor (26) operatively connected to and capable of reversibly driving the fluid pump (24), a first fluid line (20) connecting the first port (78) of the fluid pump (24) to the left port (56) of the power cylinder (18), a second fluid line (22) connecting the second port (80) of the fluid pump (24) to the right port (58) of the power cylinder (18), a pair of check valves (52) disposed in a suction line (49) connected to a fluid reservoir (50) and connected one each to the first and second fluid lines (20 and 22), and a primary applied steering torque sensor (14) which generates a signal ($V_{TT}$) in response to at least an applied steering torque ($T_s$); the improvement wherein the system (10) further comprises, a two-position, three-way valve (39) fluidly connecting the first fluid line (20) and the second fluid line (22) to the fluid reservoir (50), the three-way valve (39) being operable to connect the second fluid line (22) to the fluid reservoir (50) when a fluid pressure ($LP_p$) in the first fluid line (20) is greater than a fluid pressure ($RP_p$) in the second fluid line (22), and to connect the first fluid line (20) to the fluid reservoir (50) when the fluid pressure ($RP_p$) in the second fluid line (22) is greater than the fluid pressure ($LP_p$) in the first fluid line (20); and the pair of check valves (52) disposed in the suction line (49) being directly connected one each to the left and right ports (56 and 58) of the power cylinder (18), oriented so as to permit a flow of fluid from the fluid reservoir (50) through the suction line (49) and to the connected left or right port (56 or 58) of the power cylinder (18) when a pressure ($LP_p$ or $RP_p$) at that left or right port (56 or 58) is less than a pressure in the reservoir (50);

wherein the suction line (49) has a lesser flow impedance than the first and second fluid lines (20 and 22), thereby causing a flow of fluid from the fluid reservoir (50) through the suction line (49) to be returned to the fluid reservoir (50) through the power cylinder (18), the one of the first and second fluid lines (20 and 22) having higher pressure, the fluid pump (24), the other of the first and second fluid lines (20 or 22) and the three-way valve (39).

30. A power steering system (10) for a vehicle having dirigible wheels (13), a power cylinder (18) having left and right ports (56 and 58) and adapted to supply a powered assist to steering the dirigible wheels (13) of the vehicle upon a supply of a pressurized fluid to one of the left and right ports (56 and 58), a reversible fluid pump (24) having first and second ports (78 and 80), an electric motor (26) operatively connected to and capable of reversibly driving the fluid pump (24), a first fluid line (20) connecting the first port (78) of the fluid pump (24) to the left port (56) of the power cylinder (18), a second fluid line (22) connecting the second port (80) of the fluid pump (24) to the right port (58) of the power cylinder (18), a pair of check valves (52) disposed in a suction line (49) connected to a fluid reservoir (50) and connected one each to the first and second fluid lines (20 and 22), and a primary applied steering torque sensor (14) which generates a signal ($V_{TT}$) in response to at least an applied steering torque ($T_s$); the improvement wherein the system (10) further comprises:

- electronic control means (32) establishing a desired fluid pressure for one of the first fluid line (20) and the second fluid line (22) in response to at least the generation by the primary applied steering torque sensor (14) of the signal ($V_{TT}$) corresponding to an applied steering torque ($T_s$);
- a first pressure transducer (54) operatively connected to the electronic control means (32) and sensing a fluid pressure ($LP_p$) in the first fluid line (20);
- a second pressure transducer (55) operatively connected to the electronic control means (32) and sensing a fluid pressure ($RP_p$) in the second fluid line (22); and
- the electric motor (26) being controlled by the electronic control means (32) so as to drive the fluid pump (24) in a manner which urges the fluid pressure ($LP_p$ or $RP_p$) in one of the first and second fluid lines (20 and 22) towards the desired fluid pressure established by the electronic control means (32).

31. In a power steering system (10) for a vehicle having dirigible wheels (13), a primary applied steering torque sensor (14) which generates a signal ($V_{TT}$) in response to an applied steering torque ($T_s$), an electric motor (26) for developing a powered assist to steering the dirigible wheels (13) and an electronic control means (32) to which the primary applied steering torque sensor (14) and the electric motor (26) are operatively connected, the electronic control means (32) controlling actuation of the electric motor (26) in dependence upon at least the signal ($V_{TT}$) from the primary applied steering torque sensor; the improvement wherein the system (10) further comprises a redundant applied steering torque sensor (15) which generates a redundant signal in response to the applied steering torque ($T_s$) and which is connected to the electronic control means (32), and wherein the electronic control means (32) terminates the powered assist provided by the system (10) when the redundant signal from the redundant applied steering torque sensor (15) fails to correlate with the signal ($V_{TT}$) from the primary applied steering torque sensor (14) or with any other parameter of the system (10), but does not use the redundant signal from the redundant applied steering torque sensor (15) for otherwise controlling any other element or parameter of the system (10).

* * * * *

UNITED STATES PATENT AND TRADEMARK OFFICE
CERTIFICATE OF CORRECTION

PATENT NO. : 6,152,254
DATED : November 28, 2000
INVENTOR(S) : Edward H. Phillips It is certified that error appears in the above-identified patent and that said Letters Patent is hereby corrected as shown below:

Column 12,
Line 5, replace "$q_m$" with -- $\theta_m$ --. (both occurrences)

Column 26,
Lines 13, 15, 19, replace "$q_m$" with -- $\theta_m$ --.

Column 27,
Line 40, replace "$q_{tp}$" with -- $\theta_{tp}$ --.
Line 58, replace "qtp" with -- $\theta_{tp}$ --.

Column 28,
Line 13, replace "$q_s$" with -- $\theta_S$ --.
Line 16, replace "$q_f$" with -- $\theta_f$ --.
Line 18, replace "$q_c$" with -- $\theta_c$ --.
Line 18, replace "$(q_s\bar{\ }q_u)$" with -- $(\theta_s\bar{\ }\theta_u)$ --.
Line 60, replace "$q_f$" with -- $\theta_f$ --.
Line 62, replace "$q_p$" with -- $\theta_p$ --.

Column 29,
Lines 11 and 21, replace "$q_{tp}$" with -- $\theta_{tp}$ --.
Lines 21, 26, and 43, replace "$q_w$" with -- $\theta_w$ --.
Lines 35 and 44, replace "$(q_w)$" with -- $(\theta_w)$ --.
Line 46, replace "$(q_w\ R_w\ \cos(q_w))$" with -- $(\theta_w\ R_w\ \cos(\theta_w))$ --

Column 31,
Lines 1 and 31, replace "$q_m$" with -- $\theta_m$ --.
Line 13, "qp" with -- $\theta_p$ --.
Line 30, replace "q$p$" with -- $\theta_p$ --.
Line 31, replace "$q_m$" with -- $\theta_m$ --.
Line 32, replace "$(q_m\bar{\ }q_p)$" with -- $(\theta_m\bar{\ }\theta_p)$ --.

Column 32,
Lines 15 and 44, replace "$q_{tp}$" with -- $\theta_{tp}$ --.
Line 33, replace "$q_{tp})$" with -- $\theta_{tp})$ --.
Line 43, replace "$C/I=q_{tp}/T_s=G/(1+(G\ H))$" with -- $C/I=\theta_{tp}/T_s=G/(1+(G\ H))$ --.

UNITED STATES PATENT AND TRADEMARK OFFICE
CERTIFICATE OF CORRECTION

PATENT NO.     : 6,152,254
DATED          : November 28, 2000
INVENTOR(S)    : Edward H. Phillips It is certified that error appears in the above-identified patent and that said Letters Patent is hereby corrected as shown below:

Column 33,
Within Table, 3$^{rd}$ line from the last replace "$q_s$, $q_{tp}$, $q_p$, $q_e$, $q_w$, $q_m$, $q_f$=rad." with -- $\theta_s$, $\theta_{tp}$, $\theta_p$, $\theta_e$, $\theta_w$, $\theta_m$, $\theta_f$=rad. --.

Column 35,
Line 58, replace "$q_w$" with -- $\theta_w$ --.
Lines 64 and 66, replace "$q_w$))" with -- $\theta_w$)) --.

Column 36,
Line 8, replace "$q_w$" with -- $\theta_w$ --.
Line 44, replace "$q_f/q_e$" with -- $\theta_f/\theta_e$ --.

Column 37,
Line 26 and 60, replace "$q_e$" with -- $\theta_e$ --.

Column 38,
Line 12, replace "$q_f/q_e$" with -- $\theta_f/\theta_e$ --.

Column 39,
Line 14, replace "$q_m$" with -- $\theta_m$--.
Line 27, replace "q" with -- $\theta$ --.

Column 44,
Line 54, replace "($q_m$" with -- ($\theta_m$--.
Line 55, replace "$q_m$" with -- $\theta_m$--.

Signed and Sealed this

Twenty-third Day of September, 2003

JAMES E. ROGAN
*Director of the United States Patent and Trademark Office*